(12) United States Patent
Kurata et al.

(10) Patent No.: US 8,438,127 B2
(45) Date of Patent: May 7, 2013

(54) BEHAVIOUR PATTERN ANALYSIS SYSTEM, MOBILE TERMINAL, BEHAVIOUR PATTERN ANALYSIS METHOD, AND PROGRAM

(75) Inventors: Masatomo Kurata, Tokyo (JP); Makoto Murata, Tokyo (JP); Takashi Ogata, Tokyo (JP); Yasutaka Fukumoto, Tokyo (JP); Masanori Katsu, Tokyo (JP)

(73) Assignee: Sony Corporation, Tokyo (JP)

( * ) Notice: Subject to any disclaimer, the term of this patent is extended or adjusted under 35 U.S.C. 154(b) by 359 days.

(21) Appl. No.: 12/868,302

(22) Filed: Aug. 25, 2010

(65) Prior Publication Data

US 2011/0081634 A1 Apr. 7, 2011

(30) Foreign Application Priority Data

Oct. 2, 2009 (JP) ................................ P2009-230579

(51) Int. Cl.
| *G06F 17/00* | (2006.01) |
| *G06N 5/02* | (2006.01) |
| *G01C 21/00* | (2006.01) |
| *G08G 1/123* | (2006.01) |
| *G06F 19/00* | (2006.01) |
| *G01P 5/00* | (2006.01) |
| *G01F 1/00* | (2006.01) |
| *G01G 5/00* | (2006.01) |

(52) U.S. Cl.
USPC .............. 706/48; 700/93; 701/408; 701/445; 701/516; 702/142; 702/176

(58) Field of Classification Search .................... 706/48; 700/93; 701/408, 445, 516; 702/142, 176
See application file for complete search history.

(56) References Cited

U.S. PATENT DOCUMENTS 7,119,831 B2 * 10/2006 Ohto et al. ..................... 348/135
2004/0230452 A1 * 11/2004 Abe et al. ........................... 705/1

(Continued)

FOREIGN PATENT DOCUMENTS

JP 2008-3655 1/2008

OTHER PUBLICATIONS

Bellotti et al.; "Activity-Based Serendipitous Recommendations with the Magitti Mobile Leisure Guide"; CHI '08 Proceedings of the SIGCHI Conference on Human Factors in Computing Systems; pp. 1157-1166; ACM New York, NY, USA 2008; ISBN: 978-1-60558-011-1.*
Ashbrook et al.; "Using GPS to learn significant locations and predict movement across multiple users"; Personal and Ubiquitous Computing; vol. 7, No. 5 (2003); pp. 275-286; DOI: 10.1007/s00779-003-0240-0.*

(Continued)

*Primary Examiner* — Jeffrey A Gaffin
*Assistant Examiner* — James F Sugent
(74) *Attorney, Agent, or Firm* — Finnegan, Henderson, Farabow, Garrett & Dunner, LLP

(57) ABSTRACT

Provided is a mobile terminal including a movement sensor that detects a movement of a user and outputs movement information, acquires information on a building existing at a current location or information on buildings existing in a vicinity of the current location, analyses the movement information output from the movement sensor, and detects a first behavior pattern corresponding to the movement information from multiple first behavior patterns obtained by classifying behaviors performed by the user over a relatively short period of time, and analyses the information on a building or buildings and the first behavior pattern, and detects a second behavior pattern corresponding to the information on a building or buildings and the first behavior pattern from multiple second behavior patterns obtained by classifying behaviors performed by the user over a relatively long period of time.

12 Claims, 53 Drawing Sheets

U.S. PATENT DOCUMENTS

| | | | |
|---|---|---|---|
| 2006/0156209 A1* | 7/2006 | Matsuura et al. | 714/798 |
| 2007/0005363 A1* | 1/2007 | Cucerzan et al. | 704/256 |
| 2007/0233631 A1* | 10/2007 | Kobayashi et al. | 706/52 |
| 2008/0120025 A1* | 5/2008 | Naitou et al. | 701/207 |
| 2009/0077000 A1* | 3/2009 | Begole et al. | 706/54 |
| 2010/0299615 A1* | 11/2010 | Miluzzo et al. | 715/752 |

OTHER PUBLICATIONS

Takeuchi et al.; "CityVoyager: An Outdoor Recommendation System Based on User Location History"; Ubiquitous Intelligence and Computing Lecture Notes in Computer Science, 2006, vol. 4159/2006, 625-636, DOI: 10.1007/11833529_64.*

* cited by examiner

FIG.8

EXAMPLES OF MOVEMENT/ STATE PATTERN

| | MOVEMENT PATTERN (INCLUDING POSTURE) | | STATE PATTERN (VEHICLE) |
|---|---|---|---|
| 1 | Walking | 1 | Train |
| 2 | Running | 2 | Elevator |
| 3 | Still | 3 | Car |
| 4 | Pausing | 4 | Bicycle |
| 5 | Jumping | | ... |
| 6 | Posture Changing | | |
| 7 | Turning | | |
| | ... | | |

FIG.17

| GEO CATEGORY ||||
|---|---|---|---|
| MAJOR CATEGORY | NAME | MIDDLE CATEGORY | NAME |
| 1000000 | ROAD/ VEHICLE-RELATED | 1001000 | EXPRESSWAY/ URBAN EXPRESSWAY |
|  |  | 1002000 | PUBLIC ROAD |
|  |  | 1003000 | GAS STATION |
|  |  | 1004000 | DRIVE-IN |
|  |  | 1005000 | PARKING LOT |
| 1100000 | RAILWAY-RELATED | 1101000 | RAILWAY |
|  |  | 1102000 | SUBWAY |
|  |  | 1103000 | MONORAIL |
|  |  | 1104000 | CABLE CAR |
|  |  | 1105000 | ROPEWAY |
|  |  | 1106000 | LAND TRANSPORTATION- RELATED SERVICE |
| 1200000 | AIRPORT-RELATED | 1201000 | AIRPORT/ AIRFIELD |
| 1300000 | SPORTS FACILITIES | 1301000 | GOLF COURSE |
|  |  | 1302000 | SKI RESORT |
|  |  | 1303000 | CAMPGROUND |
|  |  | 1304000 | BASEBALL FIELD |
|  |  | 1305000 | BATTING CENTRE |
| 1400000 | RECREATIONAL FACILITIES | 1401000 | MOVIE THEATER |
|  |  | 1402000 | THEATER/ MUSIC HALL |
|  |  | 1403000 | GAME ARCADE |
|  |  | 1404000 | POOL HALL |
|  |  | 1405000 | CHESS ROOM |
| ... | ... | ... | ... |

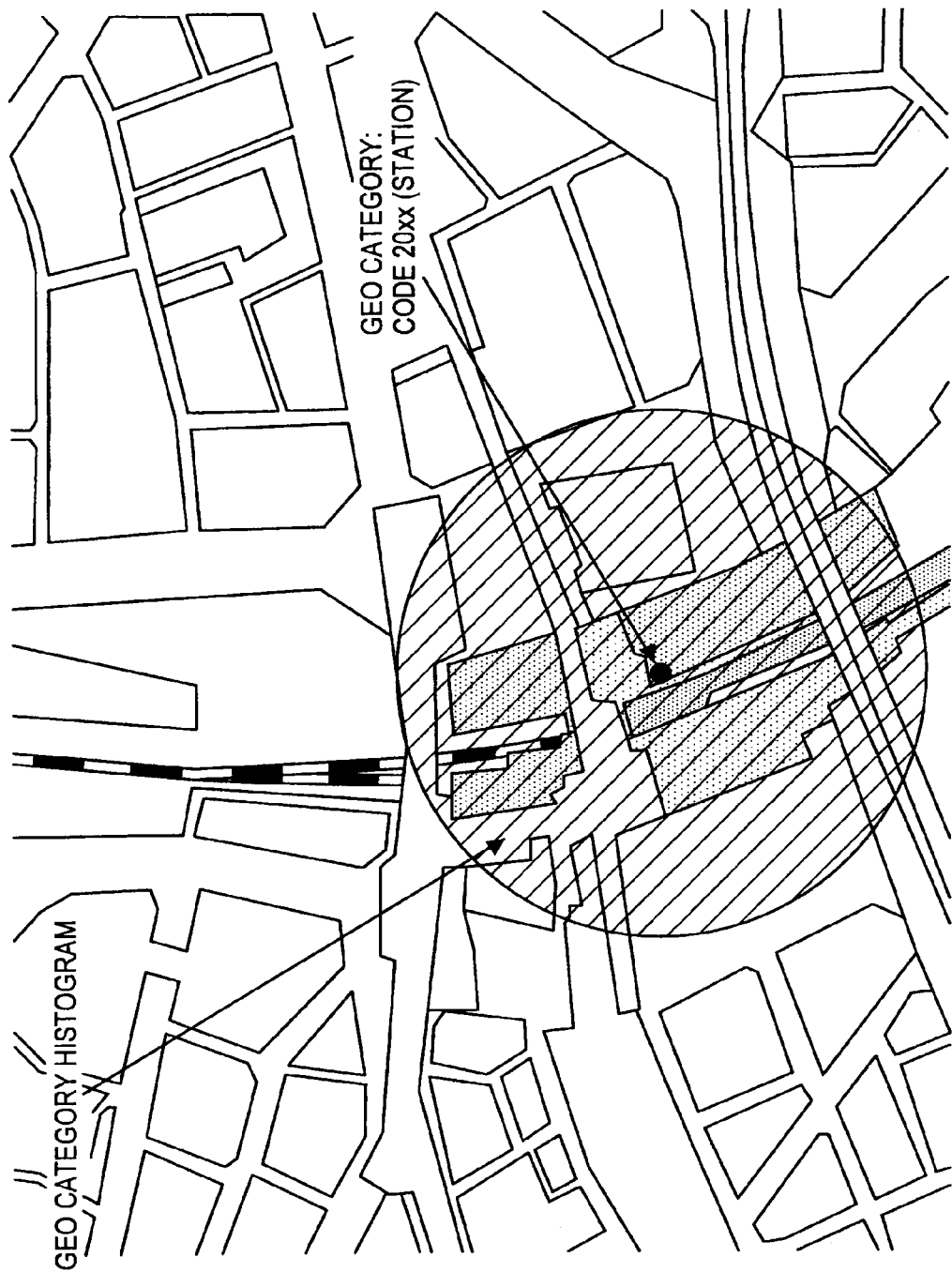

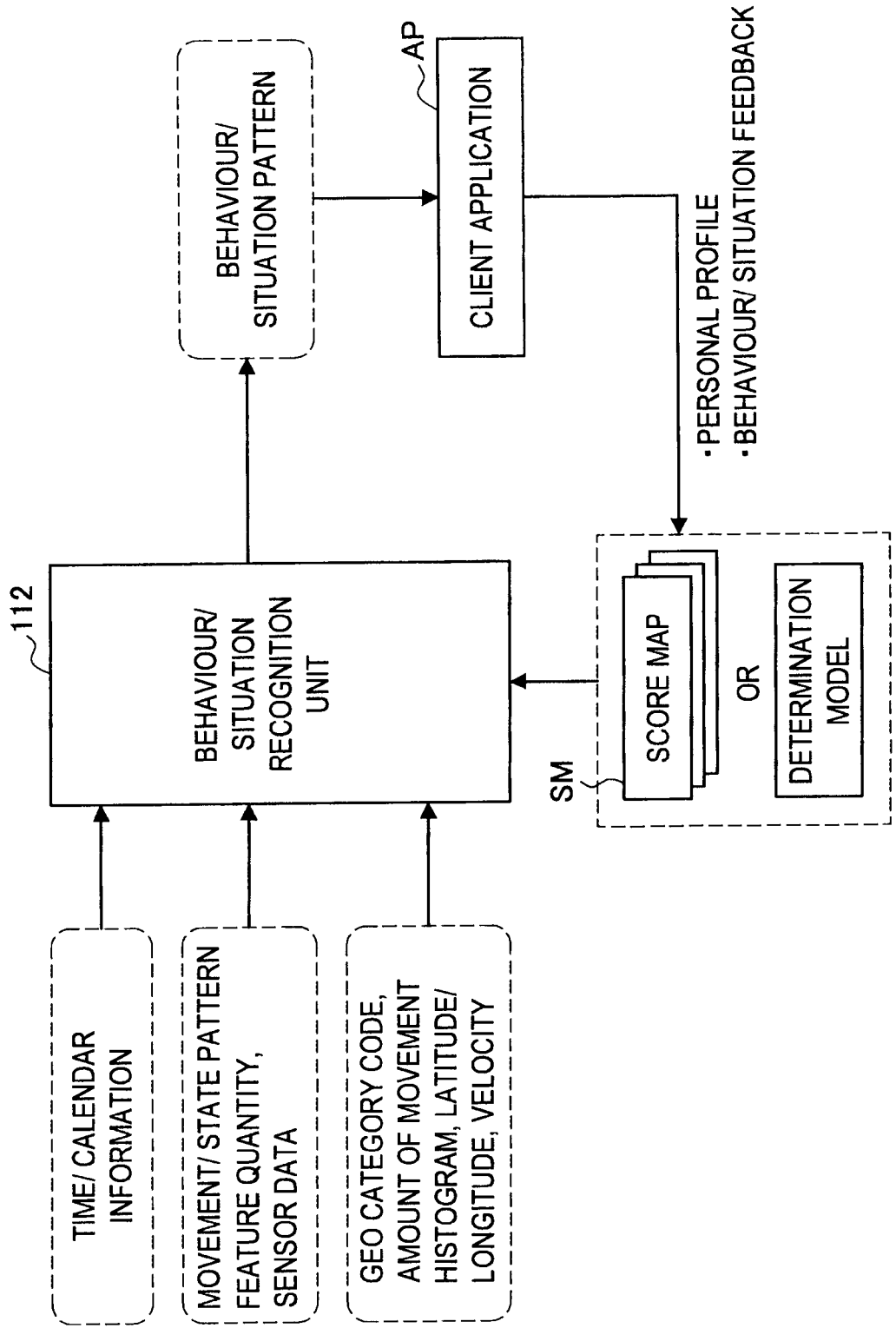

FIG.21

| MIDDLE CATEGORY | NAME | SPORT | WALK | RECREATION | SHOPPING | MUSICAL PERFORMANCE | OTHERS | HOUSEHOLD CHORE | MEAL | STUDY | WORK | VIEWING | SLEEPING |
|---|---|---|---|---|---|---|---|---|---|---|---|---|---|
| 1501000 | MUSEUM, ART GALLERY, SCIENCE MUSEUM | | 2 | | 2 | | | | 1 | 3 | | 1 | |
| 1901000 | MEDICAL FACILITIES (GENERAL HOSPITAL) | | 1 | | 2 | | 1 | 3 | 1 | 1 | | | |
| 1902000 | MEDICAL CENTRE | | 1 | | 2 | | 1 | 3 | | 3 | | | |
| 2301000 | PRIVATE TUTORING SCHOOL, PREPARATORY SCHOOL | | | | 1 | | | | 1 | 3 | | 1 | |
| 2302000 | KINDERGARTEN, NURSERY SCHOOL | 3 | | 1 | | 1 | | 2 | 1 | 3 | | 1 | |
| 2303000 | ELEMENTARY SCHOOL | 3 | | 1 | | 1 | | 2 | 1 | 3 | | 1 | |
| 2304000 | SCHOOL FOR DISABLED | 3 | | 1 | | 1 | | 2 | 1 | 3 | | 1 | |
| 2305000 | TERTIARY COLLEGE | 3 | | 1 | | 1 | 1 | 2 | 1 | 3 | | | |
| 1905000 | WORKPLACE | | | | | | | | 1 | 2 | 4 | 1 | |
| 1801000 | HOTEL/INN | | 2 | | 1 | | | 2 | 1 | 3 | | | |
| 8888888 | HOME | | | 1 | | | | 4 | 1 | 2 | | 1 | |
| 1502000 | LIBRARY | | | | 1 | | | 1 | 1 | 3 | | | |
| 1503000 | HALL/ASSEMBLY HALL | | | 1 | 1 | 1 | | 2 | 2 | 3 | | | |
| 1601000 | GREEN BELT | | 2 | 1 | | 1 | | 2 | 1 | 1 | | | |
| 1602000 | NATURAL AREA | | 2 | 1 | | 1 | | 2 | 1 | 1 | | | |

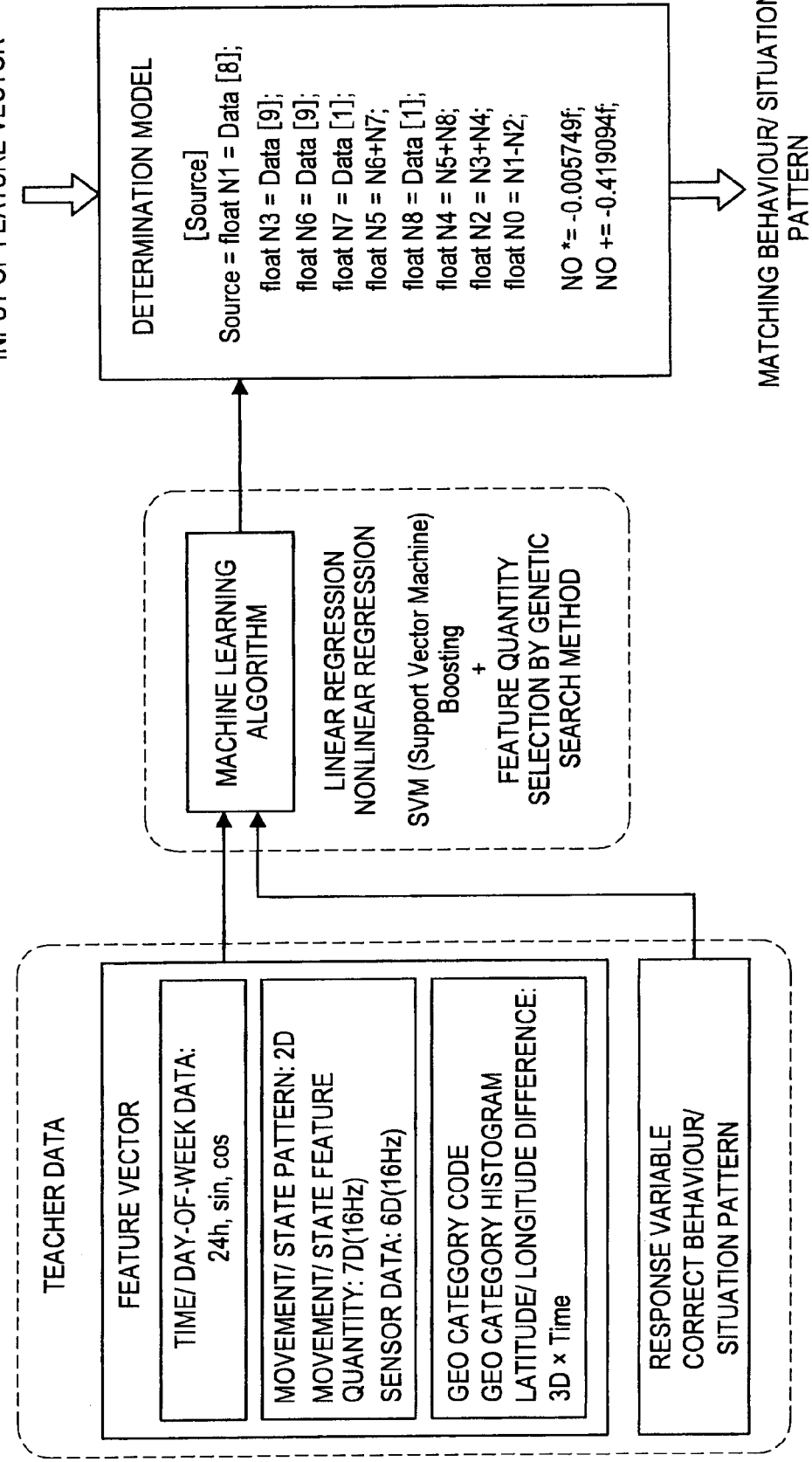

FIG.26

| 1 | SHOPPING |
|---|---|
| 101 | CONVENIENCE STORE |
| 102 | CD/ BOOKSTORE |
| 103 | CLOTHING SHOP |
| 104 | DEPARTMENT STORE |
| 105 | MEGA STORE |
| 106 | VENDING MACHINE |
| ... | ... |
| 199 | OTHERS |

| 2 | WORK |
|---|---|
| 201 | HARD WORK |
| 202 | DESK WORK |
| ... | ... |
| 299 | OTHERS |

| 3 | WALK |
|---|---|
| 301 | WALK WITH PET |
| 399 | OTHERS |

| 4 | MEAL |
|---|---|

| 5 | HOUSEHOLD CHORES |
|---|---|
| 501 | CLEANING |
| ... | ... |
| 599 | OTHERS |

| 6 | STUDY |
|---|---|
| 601 | LECTURE/ SEMINAR |
| ... | ... |
| 699 | OTHERS |

| 7 | MOVEMENT |
|---|---|
| 701 | ON FOOT |
| 702 | TRAIN |
| 703 | BICYCLE |
| 704 | CAR |
| 705 | ELEVATOR |
| 706 | SHIP |
| 707 | MOVING PAVEMENT |
| 708 | MOVING STAIRCASE |
| 709 | AIRPLANE |
| 710 | BUS |
| ... | ... |
| 799 | OTHERS |

| 8 | VIEWING |
|---|---|
| 801 | MOVIE |
| 802 | MUSIC |
| 803 | TELEVISION |
| ... | ... |
| 899 | OTHERS |

| 9 | SPORTS |
|---|---|
| 901 | MARATHON |
| 902 | GOLF |
| 903 | BASEBALL |
| 904 | SKI |
| ... | ... |
| 999 | OTHERS |

| ... | ... |
|---|---|
| 99 | OTHERS |

FIG.37

| ToDo DISPLAY CONTENTS | BEHAVIOUR/ SITUATION PATTERN |
|---|---|
| SHOPPING LIST | MOVING (TRAIN, BUS, CAR, BICYCLE), ON WAY HOME, SHOPPING |
| MESSAGE LIST | MOVING (NON FOOT), WALKING |
| HOUSEHOLD ACCOUNTS | SHOPPING, AFTER SHOPPING |
| CALORIE CHECK | MEAL, AFTER MEAL |
| ENGLISH LISTENING | MOVING (TRAIN, BUS) |
| RECORDED PROGRAM VIEWING | HOUSEHOLD CHORES, TV VIEWING |

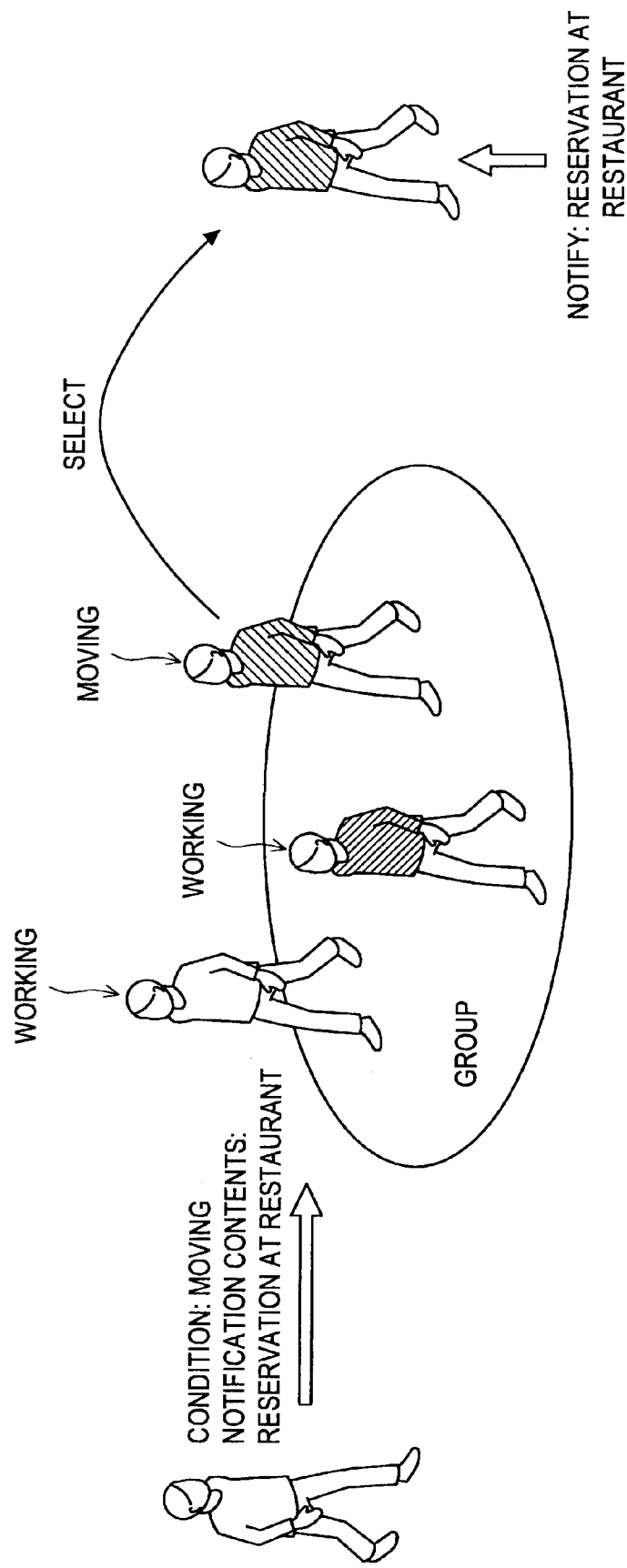

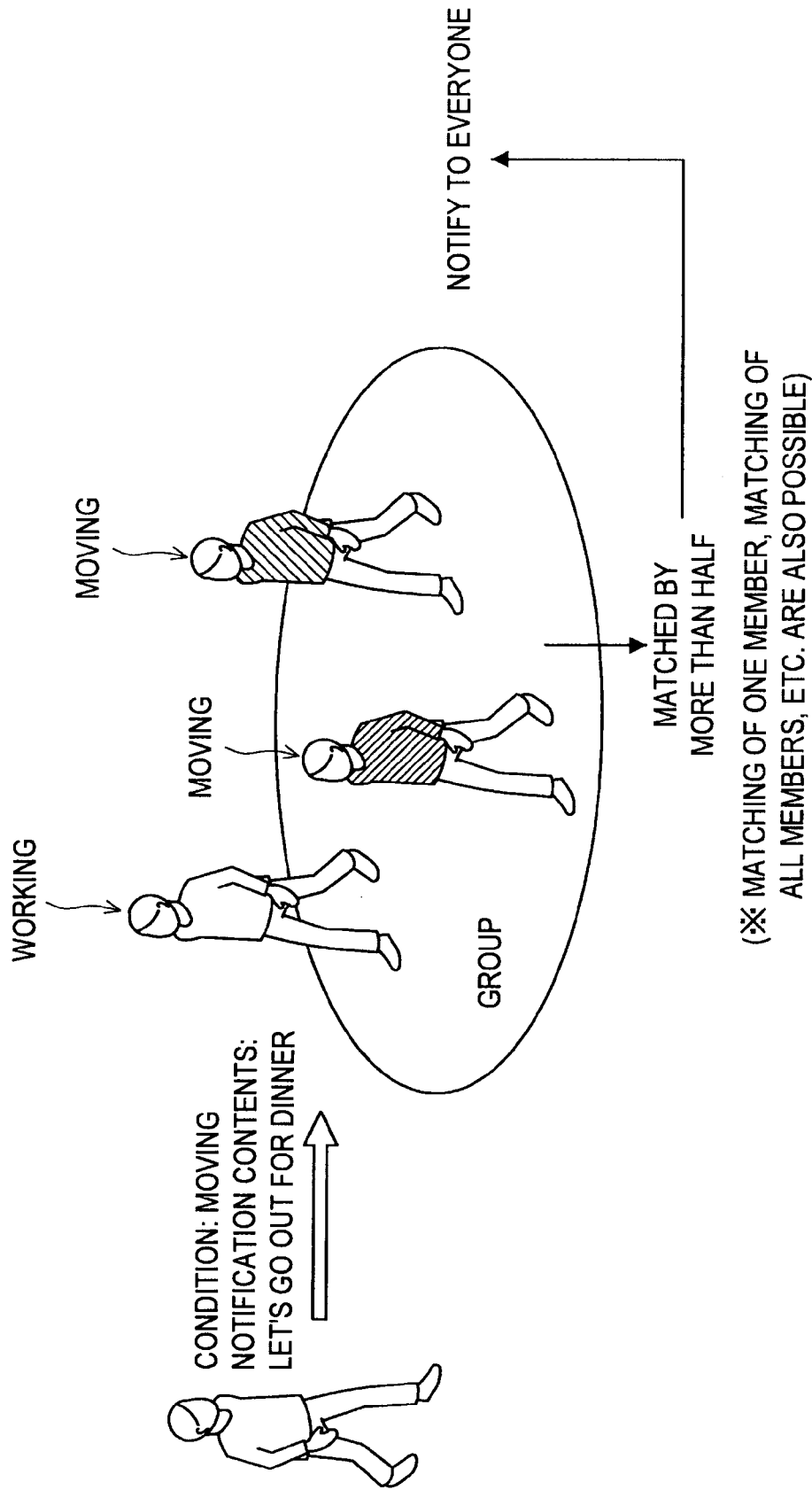

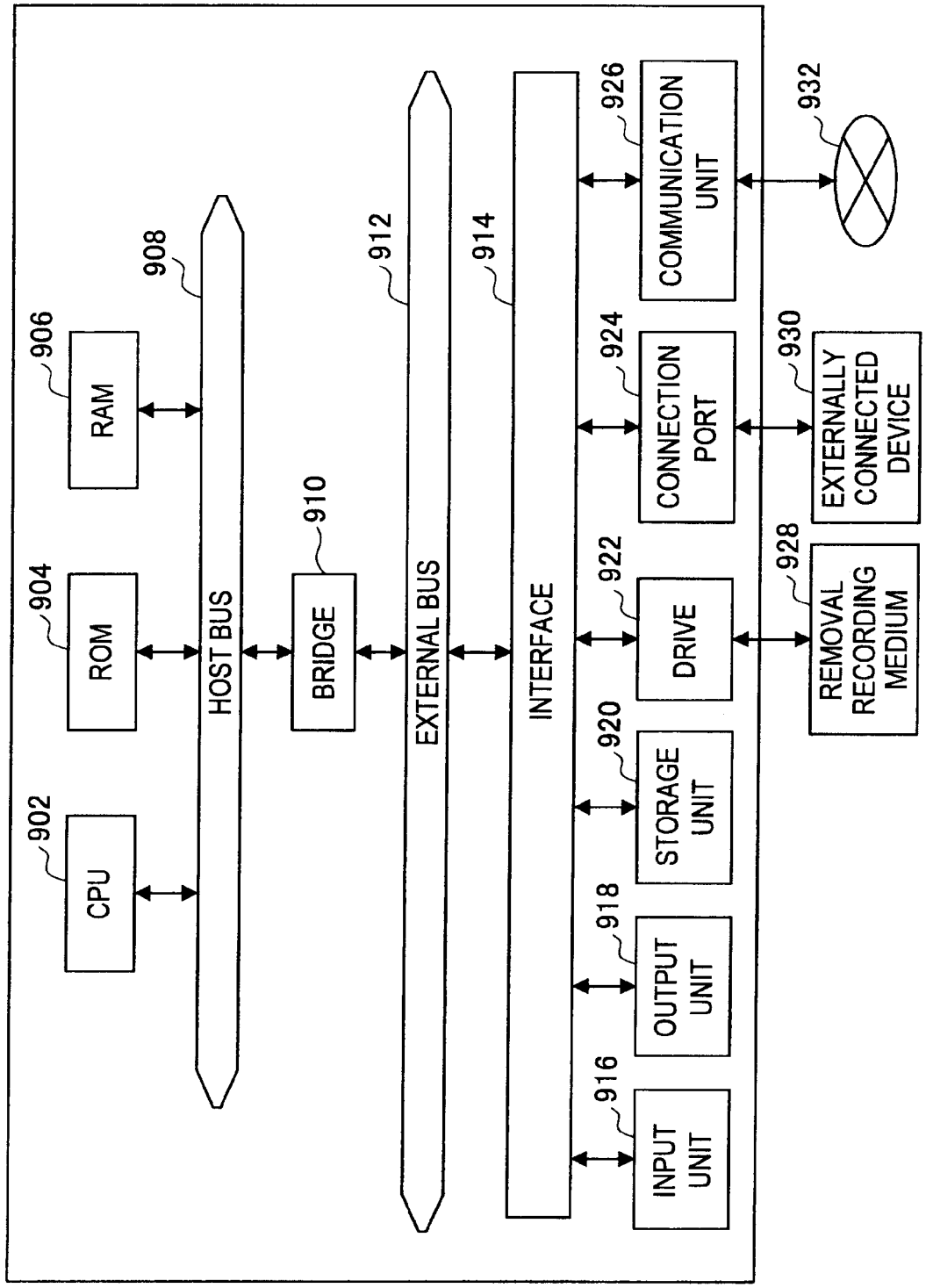

BEHAVIOUR PATTERN ANALYSIS SYSTEM, MOBILE TERMINAL, BEHAVIOUR PATTERN ANALYSIS METHOD, AND PROGRAM

BACKGROUND OF THE INVENTION

1. Field of the Invention

The present invention relates to a behaviour pattern analysis system, a mobile terminal, a behaviour pattern analysis method, and a program.

2. Description of the Related Art

A technology for installing a motion sensor on a mobile terminal such as a mobile phone and for enabling automatic detection and recording of a user's behaviour history is gaining attention. For example, JP-A-2008-3655 discloses a technology for detecting a walking movement, a running movement, a movement of turning left or right and a still state by using a motion sensor such as an acceleration sensor and a gyro sensor. This patent document describes a method of calculating a walking speed, a walking power and a rotation angle around a gravity axis from output data of the motion sensor, and detecting the walking movement, the running movement, the movement of turning left or right and the still state by using the calculation result. Furthermore, this patent document describes a method of detecting a user's behaviour pattern by statistical processing which has, as inputs, the pattern of the movement or the state such as the type of the movement or the state, the duration of the movement or the state and the number of times of the movement.

SUMMARY OF THE INVENTION

Using the method described above, a behaviour pattern such as "slow walking" and "busy movement" can be obtained as time series data. However, the behaviour pattern obtained by this method mainly expresses a relatively short-term movement or state of a user. Accordingly, it is difficult to estimate, from a behaviour pattern history, a specific content of a behaviour such as "today, went shopping at a department store" or "yesterday, had a meal at a restaurant in a hotel." The behaviour pattern obtained by using the method described in the patent document described above is an accumulation of behaviours performed in a relatively short period of time. Also, each of the behaviours constituting the behaviour pattern is not purposefully performed by a user. On the other hand, a specific content of a behaviour is, in many cases, that of a behaviour that is purposefully performed by a user and that is performed for entertainment over a relatively long period of time. Accordingly, it is difficult to know such specific content of a behaviour from an accumulation of behaviours performed in a short period of time.

In light of the foregoing, it is desirable to provide a behaviour pattern analysis system, a mobile terminal, a behaviour pattern analysis method, and a program, which are new and improved, and which are capable of detecting, from a relatively short-term behaviour pattern obtained by using a motion sensor, a relatively long-term highly-entertaining behaviour pattern.

According to an embodiment of the present invention, there is provided a behaviour pattern analysis system which includes a mobile terminal including a movement sensor that detects a movement of a user and outputs movement information, a current location information acquisition unit that acquires information on a current location, a building information acquisition unit that acquires information on a building existing at a location indicated by the information acquired by the current location information acquisition unit or information on buildings existing at the current location and in a vicinity of the current location, a first behaviour pattern detection unit that analyses the movement information output from the movement sensor, and detects a first behaviour pattern corresponding to the movement information from multiple first behaviour patterns obtained by classifying behaviours performed by the user over a relatively short period of time, and a transmission unit that transmits, to a server, the information on a building or buildings acquired by the building information acquisition unit and the first behaviour pattern detected by the first behaviour pattern detection unit, and a server including a reception unit that receives, from the mobile terminal, the information on a building or buildings and the first behaviour pattern, and a second behaviour pattern detection unit that analyses the information on a building or buildings and the first behaviour pattern received by the reception unit, and detects a second behaviour pattern corresponding to the information on a building or buildings and the first behaviour pattern from multiple second behaviour patterns obtained by classifying behaviours performed by the user over a relatively long period of time.

The second behaviour pattern detection unit may create, by using a specific machine learning algorithm, a detection model for detecting the second behaviour pattern from the information on a building or buildings and the first behaviour pattern, and may detect, by using the created detection model, the second behaviour pattern corresponding to the information on a building or buildings and the first behaviour pattern received by the reception unit.

The mobile terminal may further include a time information acquisition unit that acquires information on a time of a time point of acquisition of the information on a current location by the current location information acquisition unit.

The transmission unit may transmit, to the server, the information on a building or buildings acquired by the building information acquisition unit, the first behaviour pattern detected by the first behaviour pattern detection unit and the information on a time acquired by the time information acquisition unit. The server may hold, for each combination of the first behaviour pattern and the information on a time, a score map assigning a score to each combination of the information on a building or buildings and the second behaviour pattern. In a case the score map is selected based on the first behaviour pattern detected by the first behaviour pattern detection unit and the information on a time acquired by the time information acquisition unit, a combination of scores corresponding to the information on a building existing at the current location acquired by the building information acquisition unit is extracted from the selected score map and a highest score in the extracted combination of scores is a specific value or less, the second behaviour pattern detection unit may create, by using a specific machine learning algorithm, a detection model for detecting the second behaviour pattern from the information on a building or buildings and the first behaviour pattern, and may detect, by using the created detection model, the second behaviour pattern corresponding to the information on a building or buildings and the first behaviour pattern received by the reception unit.

The mobile terminal may further include a storage unit in which schedule information recording, in a time-series manner, a behaviour of a user capable of being expressed by a combination of the second behaviour patterns is stored, a matching determination unit that reads the schedule information stored in the storage unit, and determines whether a present behaviour, a past behaviour and a future behaviour of the user recorded in the schedule information and the second behaviour pattern detected by the second behaviour pattern detection unit match or not, and a display unit that displays, according to a result of determination by the matching determination unit, whether an actual behaviour matches a schedule recorded in the schedule information, is behind the schedule, or is ahead of the schedule.

The server may further include a behaviour prediction unit that predicts, by using a history of the second behaviour patterns detected by the second behaviour pattern detection unit, a second behaviour pattern to be performed by the user next.

In a case of determining that a behaviour of the user matching the second behaviour pattern is not recorded in the schedule information, the matching determination unit may acquire, from the server, the second behaviour pattern predicted by the behaviour prediction unit and may extract, from the schedule information, a behaviour of the user matching the acquired second behaviour pattern. The display unit may display information relating to the behaviour of the user extracted by the matching determination unit.

The server may include a location information accumulation unit that receives, by the reception unit, the information on a current location acquired by the current location information acquisition unit and the first behaviour pattern detected by the first behaviour pattern detection unit, and stores the information on a current location and a history of the first behaviour patterns in the storage unit, and a clustering unit that clusters places where the user stays for a long time, by using the information on a current location and the history of the first behaviour patterns accumulated in the storage unit by the location information accumulation unit, and calculates a staying probability of staying at each of the places and a movement probability of moving between the places. The behaviour prediction unit may predict the second behaviour pattern to be performed by the user next, based on the staying probability and the movement probability calculated by the clustering unit.

The behaviour pattern analysis system may include multiple mobile terminals. The server may further include a notification information storage unit that stores, in association with each other, notification information to be notified at a specific time and a specific second behaviour pattern, and an information notification unit that, at the specific time, refers to the second behaviour pattern detected by the second behaviour pattern detection unit based on the information on a building or buildings and the first behaviour pattern received by the reception unit from each of the mobile terminals, and notifies a mobile terminal corresponding to a second behaviour pattern same as the specific second behaviour pattern of the notification information.

The information notification unit may count the number of mobile terminals corresponding to a second behaviour pattern same as the specific second behaviour pattern, and in a case the number of the mobile terminals is a specific number or more, may notify all of the multiple mobile terminals of the notification information.

According to another embodiment of the present invention, there is provided a mobile terminal which includes a movement sensor that detects a movement of a user and outputs movement information, a current location information acquisition unit that acquires information on a current location, a building information acquisition unit that acquires information on a building existing at a location indicated by the information acquired by the current location information acquisition unit or information on buildings existing at the current location and in a vicinity of the current location, a first behaviour pattern detection unit that analyses the movement information output from the movement sensor, and detects a first behaviour pattern corresponding to the movement information from multiple first behaviour patterns obtained by classifying behaviours performed by the user over a relatively short period of time, and a second behaviour pattern detection unit that analyses the information on a building or buildings acquired by the building information acquisition unit and the first behaviour pattern detected by the first behaviour pattern detection unit, and detects a second behaviour pattern corresponding to the information on a building or buildings and the first behaviour pattern from multiple second behaviour patterns obtained by classifying behaviours performed by the user over a relatively long period of time.

The mobile terminal may further include a time information acquisition unit that acquires information on a time of a time point of acquisition of the information of a current location by the current location information acquisition unit. A score map assigning a score to each combination of the information on a building or buildings and the second behaviour pattern may be provided for each combination of the first behaviour pattern and the information on a time. The second behaviour pattern detection unit may select the score map based on the first behaviour pattern detected by the first behaviour pattern detection unit and the information on a time acquired by the time information acquisition unit, may extract, from the selected score map, a combination of scores corresponding to the information on a building existing at the current location acquired by the building information acquisition unit, and may detect the second behaviour pattern corresponding to a highest score in the extracted combination of scores.

The mobile terminal may further include a time information acquisition unit that acquires information on a time of a time point of acquisition of the information of a current location by the current location information acquisition unit. A score map assigning a score to each combination of the information on a building or buildings and the second behaviour pattern may be provided for each combination of the first behaviour pattern and the information on a time. The building information acquisition unit may acquire, as the information on buildings existing at the current location and in a vicinity of the current location, category types of the buildings and the number of buildings for each category type. The second behaviour pattern detection unit may select the score map based on the first behaviour pattern detected by the first behaviour pattern detection unit and the information on a time acquired by the time information acquisition unit, may extract, from the selected score map, combinations of scores corresponding to respective category types acquired by the building information acquisition unit, may normalise, by respective highest scores, each score included in the combinations of scores corresponding to respective category types, may performs weighting on the normalised combinations of scores corresponding to respective category types according to the number of buildings for each category type acquired by the building information acquisition unit, and may add, for each second behaviour pattern, the weighted scores corresponding to the respective category types, and detects the second behaviour pattern for which a result of addition is greatest.

The mobile terminal may further include a display unit on which a display object for starting an application associated with the second behaviour pattern is displayed, and a display control unit that makes the display unit preferentially display, according to the second behaviour pattern detected by the second behaviour pattern detection unit, the display object associated with the second behaviour pattern.

According to another embodiment of the present invention, there is provided a behaviour pattern analysis server which includes a reception unit that receives, from a mobile terminal including a movement sensor that detects a movement of a user and outputs movement information and a current location information acquisition unit that acquires information on a current location, the movement information and the information on a current location, a building information acquisition unit that acquires information on a building existing at a location indicated by the information on a current location received by the reception unit or information on buildings existing at the current location and in a vicinity of the current location, a first behaviour pattern detection unit that analyses the movement information received by the reception unit, and detects a first behaviour pattern corresponding to the movement information from multiple first behaviour patterns obtained by classifying behaviours performed by the user over a relatively short period of time, and a second behaviour pattern detection unit that analyses the information on a building or buildings acquired by the building information acquisition unit and the first behaviour pattern detected by the first behaviour pattern detection unit, and detects a second behaviour pattern corresponding to the information on a building or buildings and the first behaviour pattern from multiple second behaviour patterns obtained by classifying behaviours performed by the user over a relatively long period of time.

According to another embodiment of the present invention, there is provided a behaviour pattern analysis method which includes the steps of acquiring movement information indicating a result of detection by a movement sensor for detecting a movement of a user, acquiring information on a current location, acquiring information on a building existing at a location indicated by the information on a current location acquired in the step of acquiring information on a current location or information on buildings existing at the current location and in a vicinity of the current location, analysing the movement information acquired in the step of acquiring movement information, and detecting a first behaviour pattern corresponding to the movement information from multiple first behaviour patterns obtained by classifying behaviours performed by the user over a relatively short period of time, and analysing the information on a building or buildings acquired in the step of acquiring information on a building or buildings and the first behaviour pattern detected in the step of analysing the movement information and detecting a first behaviour pattern, and detecting a second behaviour pattern corresponding to the information on a building or buildings and the first behaviour pattern from multiple second behaviour patterns obtained by classifying behaviours performed by the user over a relatively long period of time.

According to another embodiment of the present invention, there is provided a program for causing a computer to realise a movement information acquisition function of acquiring movement information indicating a result of detection by a movement sensor for detecting a movement of a user, a current location information acquisition function of acquiring information on a current location, a building information acquisition function of acquiring information on a building existing at the current location indicated by the information acquired by the current location information acquisition function or information on buildings existing at the current location and in a vicinity of the current location, a first behaviour pattern detection function of analysing the movement information acquired by the movement information acquisition function, and detecting a first behaviour pattern corresponding to the movement information from multiple first behaviour patterns obtained by classifying behaviours performed by the user over a relatively short period of time, and a second behaviour pattern detection function of analysing the information on a building or buildings acquired by the building information acquisition function and the first behaviour pattern detected by the first behaviour pattern detection function, and detecting a second behaviour pattern corresponding to the information on a building or buildings and the first behaviour pattern from multiple second behaviour patterns obtained by classifying behaviours performed by the user over a relatively long period of time.

According to another embodiment of the present invention, there is provided a recording medium in which the program is recorded, the recording medium being able to be read by a computer.

According to the embodiments of the present invention described above, a relatively long-term highly-entertaining behaviour pattern can be detected from a relatively short-term behaviour pattern obtained by using a motion sensor.

BRIEF DESCRIPTION OF THE DRAWINGS

FIG. 8 is an explanatory diagram for explaining a function of the movement/state recognition unit according to the embodiment;

FIG. 17 is an explanatory diagram for explaining a function of the geo-categorisation unit according to the embodiment;

FIG. 19 is an explanatory diagram for explaining a function of the geo-categorisation unit according to the embodiment;

FIG. 20 is an explanatory diagram for explaining a function of a behaviour/situation recognition unit according to the embodiment;

FIG. 21 is an explanatory diagram for explaining a function of the behaviour/situation recognition unit according to the embodiment;

FIG. 25 is an explanatory diagram for explaining a function of the behaviour/situation recognition unit according to the embodiment;

FIG. 26 is an explanatory diagram for explaining a function of the behaviour/situation recognition unit according to the embodiment;

FIG. 37 is an explanatory diagram showing an overview of a function of the behaviour/situation analysis system according to the embodiment;

FIG. 43 is an explanatory diagram for explaining a function of the ToDo management unit according to the embodiment;

FIG. 44 is an explanatory diagram for explaining a function of the ToDo management unit according to the embodiment;

FIG. 47 is an explanatory diagram showing an example of the hardware configuration of an information processing apparatus capable of realising functions of a server and a client configuring the behaviour/situation analysis systems according to the first to fourth embodiments of the present invention.

DETAILED DESCRIPTION OF THE EMBODIMENT(S)

Figure 1:
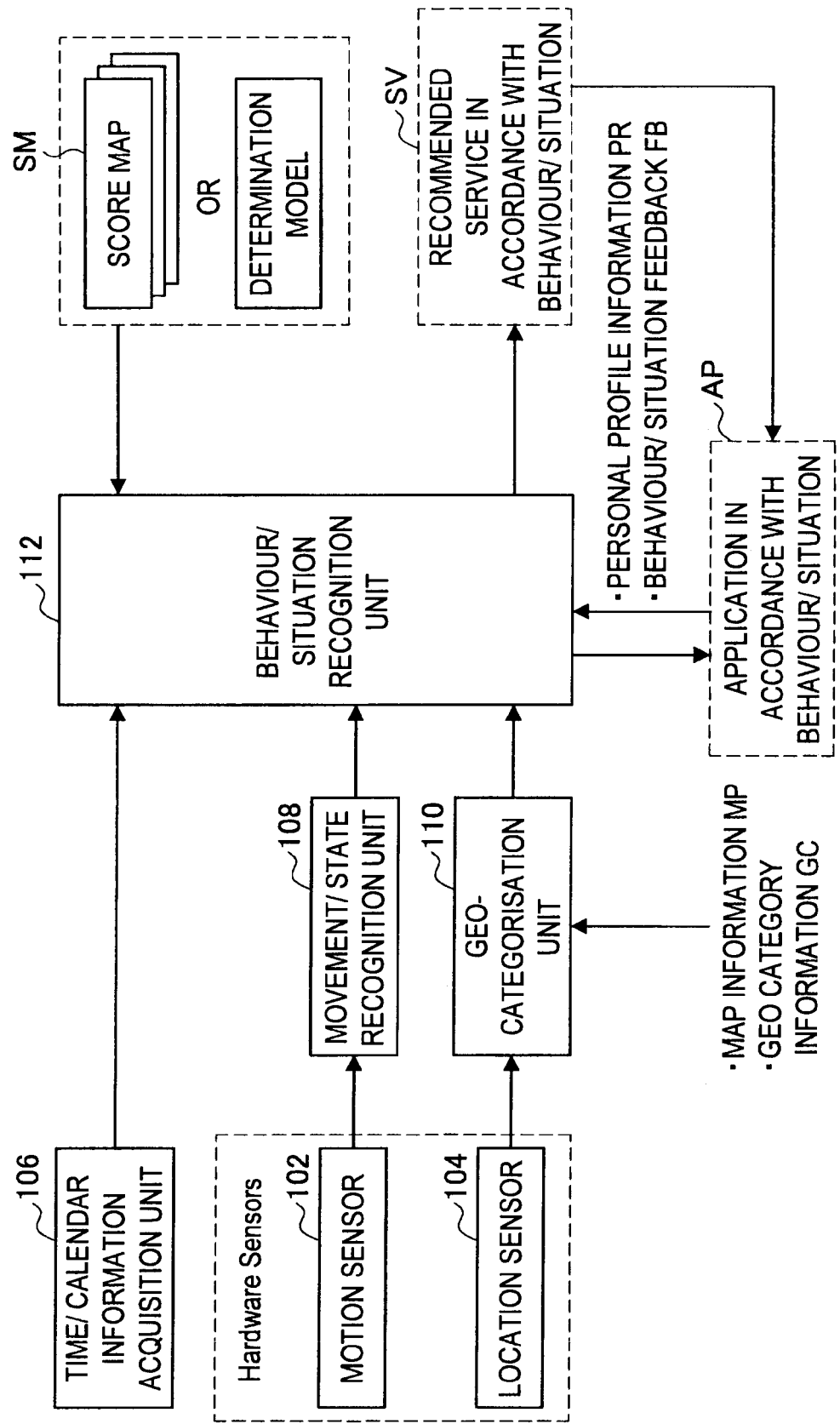
FIG. 1 is an explanatory diagram showing an example of the system configuration of a behaviour/situation analysis system according to the first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

<Flow of Description>

The flow of description of embodiments of the present invention described below will be briefly mentioned here. First, a configuration of a behaviour/situation analysis system according to the first embodiment of the present invention will be described with reference to FIGS. 1 to 30B. Then, a configuration of a behaviour/situation analysis system according to the second embodiment of the present invention will be described with reference to FIGS. 31 to 35C. Then, a configuration of a behaviour/situation analysis system according to the third embodiment of the present invention will be described with reference to FIGS. 36 to 44. Then, a configuration of a behaviour/situation analysis system according to the fourth embodiment of the present invention will be described with reference to FIGS. 45 and 46. Then, an example of the hardware configuration of an information processing apparatus capable of realising functions of a server and a client configuring the behaviour/situation analysis systems according to the first to fourth embodiments of the present invention will be described with reference to FIG. 47.

(Description Items)
1: First Embodiment
  1-1: System Configuration
  1-2: Function of Movement/State Recognition Unit 108
  1-3: Function of Geo-Categorisation Unit 110
  1-4: Function of Behaviour/Situation Recognition Unit 112
2: Second Embodiment
  2-1: Overview of System
  2-2: Overall Configuration of System
  2-3: Function of Behaviour Prediction Unit 208
  2-4: Function of Behaviour Verification Unit 206
3: Third Embodiment
  3-1: Overview of System
  3-2: Overall Configuration of System
  3-3: Function of ToDo Management Unit 304
4: Fourth Embodiment
  4-1: Overview of System
  4-2: Overall Configuration of System
5: Hardware Configuration <1: First Embodiment>

The first embodiment of the present invention will be described. The present embodiment relates to a technology of detecting a behaviour and a situation of a user by using information on the user's movement and state detected by using a motion sensor and location information detected by a location sensor. Additionally, as the motion sensor, a three-axis acceleration sensor (including an acceleration sensor, a gravity detection sensor, a fall detection sensor, and the like), a three-axis gyro sensor (including an angular velocity sensor, a hand-blur compensation sensor, a geomagnetic sensor, and the like), and the like, are used, for example. Also, as the location sensor, a GPS (Global Positioning System) is used, for example. However, since the latitude and longitude of the current location can be detected from an RFID) (Radio Frequency Identification), a Wi-Fi access point, information on a wireless base station, and the like, and such detection means can also be used as the location sensor.

<1-1: System Configuration>

First, a system configuration of a behaviour/situation analysis system 10 according to the present embodiment will be described with reference to FIG. 1. FIG. 1 is an explanatory diagram showing an example of an overall system configuration of the behaviour/situation analysis system 10 according to the present embodiment. Additionally, in this specification, expressions "movement, state" and "behaviour, situation" will be used differently with respect to the following meanings.

(1) The expression "movement, state" means a behaviour performed by a user which is relatively short-term, lasting several seconds to several minutes, and indicates an action such as "walking," "running," "jumping" or "still," for example. Furthermore, these actions will be collectively expressed as "movement/state pattern" or "LC (Low-Context) behaviour." On the other hand, (2) the expression "behaviour, situation" is a daily behaviour performed by a user over a longer period of time than with "movement, state," and indicates an action such as "meal," "shopping" or "work," for example. Furthermore, these actions will be collectively expressed as "behaviour/situation pattern" or "HC (High-Context) behaviour."

Now, as shown in FIG. 1, the behaviour/situation analysis system 10 is mainly configured from a motion sensor 102, a location sensor 104, a time/calendar information acquisition unit 106, a movement/state recognition unit 108, a geo-categorisation unit 110, and a behaviour/situation recognition unit 112. Furthermore, an application AP and a service SV that use a behaviour/situation pattern that is detected by the behaviour/state recognition unit 112 are prepared for the behaviour/situation analysis system 10. Furthermore, a result of usage of the behaviour/situation pattern by the application AP and profile information of a user may be input to the behaviour/situation recognition unit 112.

When a user performs a behaviour, first, a change in acceleration, rotation around a gravity axis and the like (hereinafter, sensor data) are detected by the motion sensor 102. The sensor data detected by the motion sensor 102 is input to the movement/state recognition unit 108. Furthermore, location information indicating the whereabouts (hereinafter, current location) of a user is acquired by the location sensor 104. The current location is expressed by latitude and longitude, for example. Furthermore, the location information on the current location acquired by the location sensor 104 is input to the geo-categorisation unit 110.

The movement/state recognition unit 108 is means for detecting a movement/state pattern by using the sensor data. Accordingly, when the sensor data is input from the motion sensor 102, the movement/state recognition unit 108 detects a behaviour/state pattern based on the input sensor data. A movement/state pattern that can be detected by the movement/state recognition unit 108 is "walking," "running," "still," "jumping," "train (aboard/not aboard)" and "elevator (aboard/not aboard/ascending/descending)," for example. Additionally, a movement/state pattern detection method of the movement/state recognition unit 108 will be described later in detail (with reference to FIGS. 7 to 15). However, the movement/state pattern detection method is not limited to the example described later, and a method that uses machine learning can also be adopted. Moreover, the movement/state pattern detected by the movement/detection recognition unit 108 is input to the behaviour/situation recognition unit 112.

The geo-categorisation unit 110 is means for acquiring map information MP, and detecting an attribute of the current location indicated in the input location information by using the acquires map information MP Note that the geo-categorisation unit 110 uses a geo category code as means for expressing the attribute of the current location. The geo category code is a classification code for classifying types of pieces of information relating to a place (see FIG. 17). Also, this geo category is set according to the type of a building, the shape of a landscape, geographical characteristics or regional characteristics, for example. Accordingly, by specifying the geo category code of the current location, the environment a user is in can be recognised to a certain degree.

Accordingly, the geo categorisation unit 110 refers to the acquired map information MP, specifies a building or the like existing at the current location based on the location information input from the location sensor 104, and selects a geo category code corresponding to the building or the like. The geo category code selected by the geo-categorisation unit 110 is input to the behaviour/situation recognition unit 112. Additionally, when using the environment surrounding the current location for the detection of the behaviour/situation pattern, the geo-categorisation unit 110 selects geo category codes corresponding to multiple buildings or the like existing in the vicinity of the current location, and inputs the selected geo category codes or pieces of information based thereon (see FIG. 18) to the behaviour/situation recognition unit 112.

As described above, the movement/state pattern and the geo category code are input to the behaviour/situation recognition unit 112 respectively from the movement/state recognition unit 108 and the geo-categorisation unit 110. Furthermore, the sensor data is also input to the behaviour/situation recognition unit 112 via the movement/state recognition unit 108. Furthermore, the location information on the current location is also input to the behaviour/situation recognition unit 112 via the geo-categorisation unit 110. Furthermore, time/calendar information is input to the behaviour/situation recognition unit 112 via the time/calendar information acquisition unit 106. This time/calendar information is information indicating the time the sensor data is acquired by the motion sensor 102 and the time the location information is acquired by the location sensor 104. For example, time/calendar information includes information on the time the sensor data or the location information is acquired, information on the day of the week, information on a holiday, information on the date, or the like.

Accordingly, the behaviour/situation recognition unit 112 detects the behaviour/situation pattern based on the movement/state pattern, the geo category code (or information based thereon) and the time/calendar information that have been input. The behaviour/situation pattern is detected by using (1) determination processing based on a rule (hereinafter, rule-based determination) or (2) determination processing based on a learning model (hereinafter, learning model determination).

(1) Rule-Based Determination

The rule-based determination is a method of assigning a score to each combination of a geo category code and a behaviour/situation pattern and determining an appropriate behaviour/situation pattern corresponding to input data based on the score. A rule for assigning a score is as expressed by a score map SM (see FIG. 21). The score map SM is prepared for each piece of the time/calendar information, such as the date, the time or the day of the week. For example, a score map SM corresponding to Monday of the first week of March is prepared. Furthermore, the score map SM is prepared for each movement/state pattern, such as walking, running or train. For example, a score map SM for walking is prepared. Therefore, the score map is prepared for each combination of the time/calendar information and the movement/state pattern. Accordingly, multiple score maps SM are prepared.

Accordingly, the behaviour/situation recognition unit 112 selects, from the multiple score maps SM that have been prepared, a score map SM matching the time/calendar information and the movement/state pattern. Then, the behaviour/situation recognition unit 112 extracts a score corresponding to the geo category code from the selected score map SM. Additionally, the order of processing can be changed as appropriate with respect to the process of selecting a score map SM based on the time/calendar information and the movement/state pattern and the process of extracting a score based on the geo category code. By these processes, the behaviour/situation recognition unit 112 can extract the score of each behaviour/situation pattern existing in the score map SM while taking into consideration the situation of the current location at the time point of acquisition of the sensor data.

Furthermore, the behaviour/situation recognition unit 112 specifies the highest score from the extracted scores, and extracts the behaviour/situation pattern corresponding to the highest score. This method of detecting the behaviour/situation pattern in this manner is the rule-based determination. Additionally, the score in the score map SM shows a probability of a user being presumed to act according to the behaviour/situation pattern corresponding to the score. That is, the score map SM shows a score distribution of the behaviour/situation patterns according to which a user is presumed to act under the situation of the current location indicated by the geo category code.

For example, the probability of a user in a department store at three o'clock on Sunday doing "shopping" is presumed to be high. However, the probability of a user in the same department store at around seven o'clock in the evening "having a meal" is also presumed to be high. As described, the score map SM (to be more precise, a score map SM group) shows the score distribution of a user's behaviour/situation patterns at certain times at certain locations. For example, the score map SM may be input in advance by the user or a third party, may be obtained by using machine learning, or may be built by using other statistical method. Also, the score map SM may be optimised by personal profile information PR or a behaviour/situation feedback FB obtained from the user. The profile information PR includes age, sex, occupation, information on home, and information on workplace, for example. Furthermore, the behaviour/situation feedback FB includes information indicating whether a behaviour/situation pattern that is output is correct or not.

(2) Learning Model Determination

The learning model determination is a method of creating a determination model for determination of the behaviour/situation pattern using a machine learning algorithm and of determining the behaviour/situation pattern corresponding to input data by using the created determination model (see FIG. 25). Additionally, as the machine learning algorithm, the k-means method, the Nearest Neighbor method, the SVM method, the HMM method or the Boosting method can be used, for example. The SVM is an abbreviation for Support Vector Machine. Also, the HMM is an abbreviation for Hidden Markov Model. In addition to these methods, there is also a method of creating the determination model by using an algorithm-building method based on a genetic search described in JP-A-2009-48266.

Additionally, as a feature quantity vector, the time/calendar information, the movement/state pattern, the geo category code (or information based thereon), the sensor data or the location information on the current location is used, for example. However, in the case of using the algorithm-building method based on the genetic search, a genetic search algorithm is used at a stage of selecting, in the process of learning, a feature quantity vector. The behaviour/situation recognition unit 112 first inputs to the machine learning algorithm a feature quantity vector for which the correct behaviour/situation pattern is known, as learning data, and creates a determination model for determining a reliability of each behaviour/situation pattern or the optimal behaviour/situation pattern.

Then, the behaviour/situation recognition unit 112 inputs input data to the created determination model, and determines a behaviour/situation pattern that is presumed to match the input data. Note that, in a case a feedback of true or false for a result of determination performed by using the created determination model is obtained, the determination model is rebuilt by using the feedback. Then, the behaviour/situation recognition unit 112 determines the behaviour/situation pattern that is presumed to match the input data, by using the determination model that has been rebuilt. This method of detecting a behaviour/situation pattern that matches input data in this manner is the learning model determination. Additionally, the amount of computation is larger for the learning model determination than for the rule-based determination.

The behaviour/situation recognition unit 112 detects, by the methods described above, the behaviour/situation pattern that matches the input data input from the time/calendar information acquisition unit 106, the movement/state recognition unit 108 and the geo-categorisation unit 110. The behaviour/situation pattern detected by the behaviour/situation recognition unit 112 is used for providing a recommended service SV corresponding to the behaviour/situation pattern or is used by the application AP that performs processing according to the behaviour/situation pattern. Concrete examples of the configuration of the recommended service SV and the application AP will be described in greater detail in relation to the second to fourth embodiments described later.

Heretofore, an overall system configuration of the behaviour/situation analysis system 10 according to the present embodiment has been described with reference to FIG. 1. Next, a server/client configuration of the behaviour/situation system 10 will be described.

(Server/Client Configuration)

Each of the functions of the behaviour/situation analysis system 10 shown in FIG. 1 is actually realised by a server or a client device (a mobile terminal or the like). However, how to decide between a function to be assigned to the server and a function to be assigned to the client device is a matter that should be changed as appropriate according to the arithmetic processing capability or the like of the server or the client device. Here, an example of a server/client configuration will be introduced (see FIGS. 2 to 6).

(System Configuration Example (1))

Figure 2:
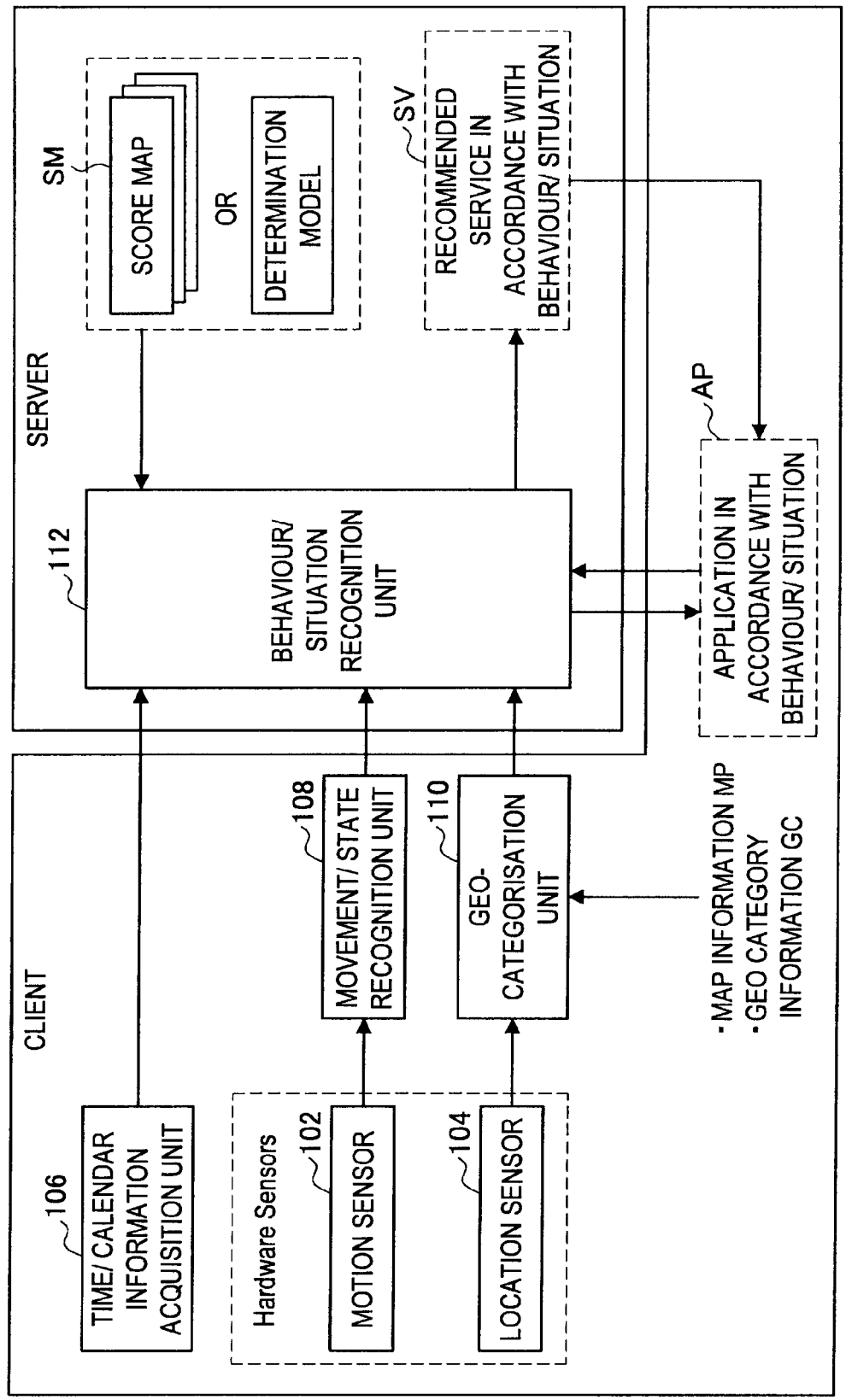
FIG. 2 is an explanatory diagram showing an example of the system configuration of the behaviour/situation analysis system according to the embodiment.

First, the system configuration example illustrated in FIG. 2 will be introduced. In the example of FIG. 2, the motion sensor 102, the location sensor 104, the time/calendar information acquisition unit 106, the movement/state recognition unit 108 and the geo-categorisation unit 110 are provided in the client device. Furthermore, the application AP is installed in the client. On the other hand, the behaviour/situation recognition unit 112 is provided in the server. Furthermore, the score map SM is held by the server.

The most important factor at the time of determining the server/client configuration in the behaviour/situation analysis system 10 is the amount of computation of the behaviour/situation recognition unit 112. Particularly, realisation of the function of the behaviour/situation recognition unit 112 by using the learning model determination is not possible with the current computation capability of the client device such as a mobile phone or portable game machine. Therefore, as shown in the example of FIG. 2, in the case of using the learning model determination, it is preferable that the behaviour/situation recognition unit 112 is provided in the server and that the behaviour/situation pattern is acquired from the server and be used. Furthermore, in the case the amount of data of the score map SM is large, the storage capacity of the client device might be taken up, and thus the score map SM is desirably held by the server.

Moreover, the motion sensor 102, the location sensor 104 and the time/calendar information acquisition unit 106 are means for acquiring raw data that directly reflects the behaviour of a user. Furthermore, the application AP is means for providing, to a user, a function and information generated based on a detected behaviour/situation pattern. Accordingly, as shown in the example of FIG. 2, the motion sensor 102, the location sensor 104, the time/calendar information acquisition unit 106 and the application AP have to be provided in the client server.

Furthermore, the map information MP and geo category information GC may be held internally by the client device or may be acquired from the outside. Particularly, the amount of data of the map information MP will be extremely large in a case it is highly accurate. Therefore, a design should be appropriately modified according to the storage capacity of the client device with regard to whether the map information MP is to be internally held or is to be acquired from outside. Furthermore, in a case the latest map information MP is desired to be used at all times, it is preferable that map information MP existing outside the client device can be used.

(System Configuration Example (2))

Figure 3:
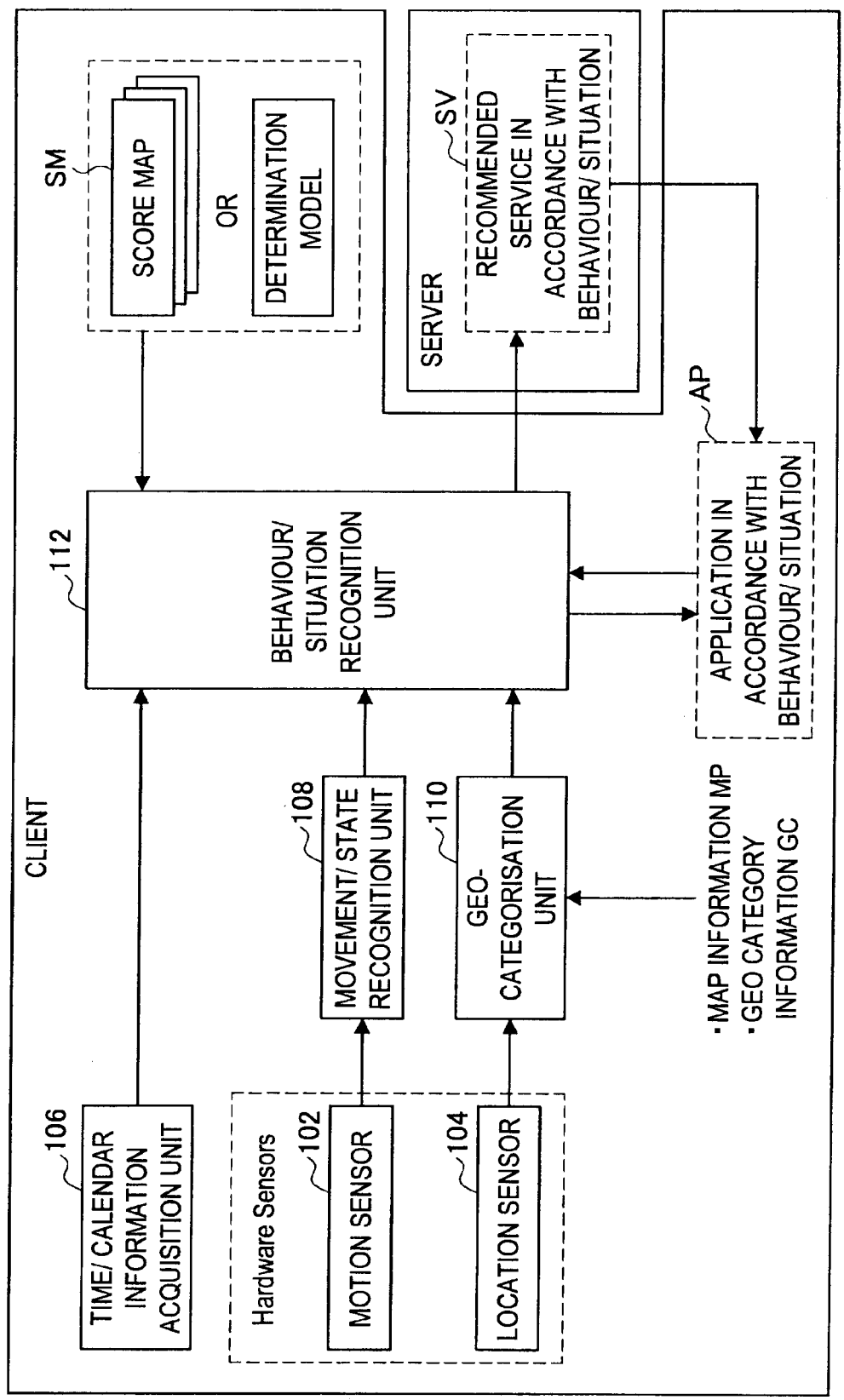
FIG. 3 is an explanatory diagram showing an example of the system configuration of the behaviour/situation analysis system according to the embodiment.

Next, the system configuration example illustrated in FIG. 3 will be introduced. In the example of FIG. 3, the motion sensor 102, the location sensor 104, the time/calendar information acquisition unit 106, the movement/state recognition unit 108, the geo-categorisation unit 110, the behaviour/situation recognition unit 112 and the application AP are provided in the client device. Furthermore, the score map SM is held by the client device.

As described above, when using the learning model determination, the amount of computation of the behaviour/situation recognition unit 112 becomes extremely large, and realisation becomes difficult with the computation capability of an existing client device. However, in the case of using the rule-based determination, the amount of computation of the behaviour/situation recognition unit 112 is relatively small, and thus the behaviour/situation recognition unit 112 can be provided in the client device. Furthermore, in a case the computation capability of the client device improves in the future or in a case a high-end PC (Personal Computer), a high-end game machine or the like is used as the client device, it becomes possible to perform the learning model determination by the client device. In this case, the server only provides the recommended service SV according to the behaviour/situation pattern.

According to such configuration, communication between the client device and the server can be made less frequent, and the application AP that performs processing according to the behaviour/situation pattern can be comfortably used even in a poor communication environment. Furthermore, by exchanging feedbacks relating to the behaviour/situation patterns between the client devices, the behaviour/situation pattern of another user living in a similar environment, such as a friend, a family member or a co-worker, can be used as learning data. Accordingly, a determination model for a behaviour/situation pattern or a score map SM matching the living environment of a user is created, and the accuracy of the behaviour/situation pattern is improved.

(System Configuration Example (3))

Figure 4:
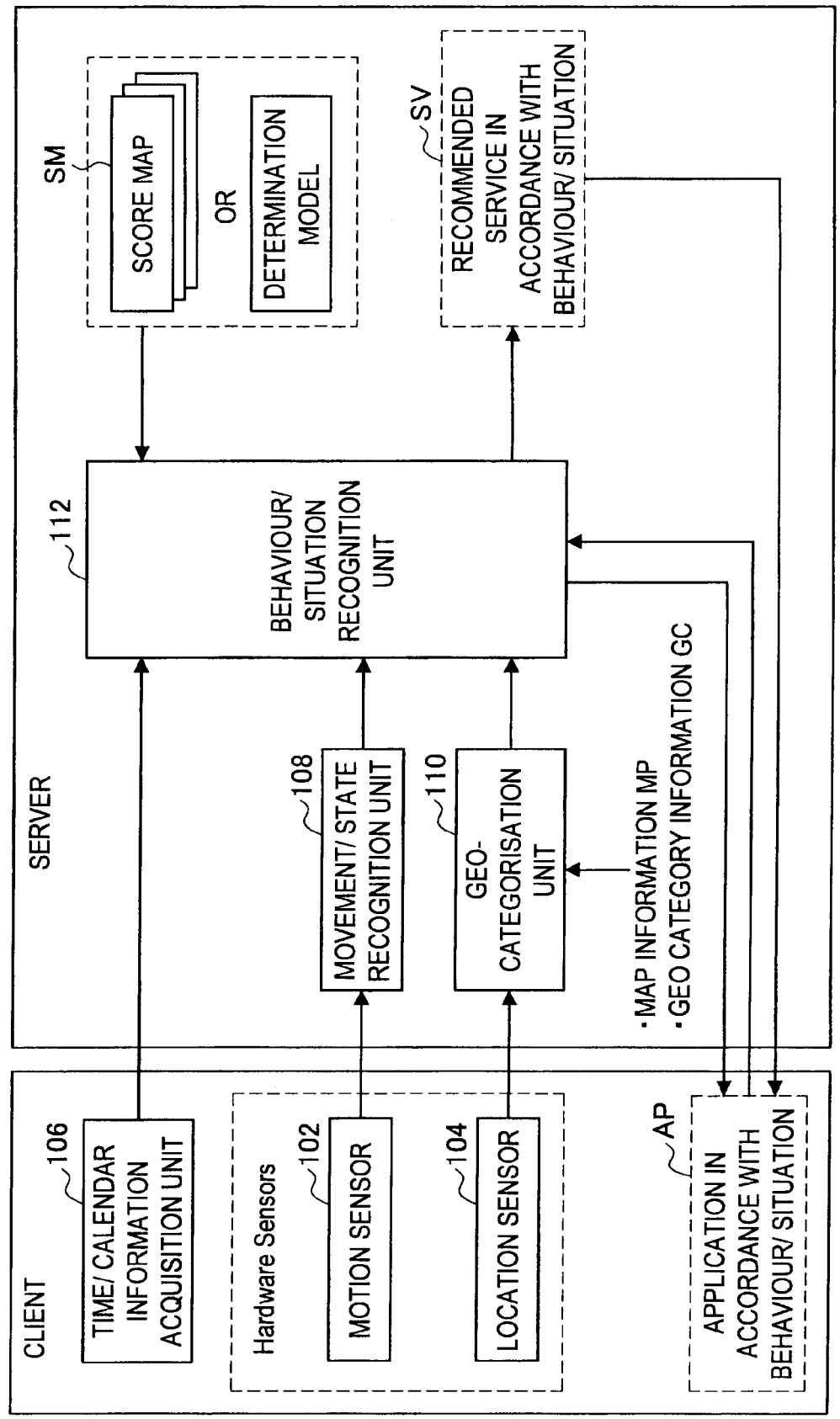
FIG. 4 is an explanatory diagram showing an example of the system configuration of the behaviour/situation analysis system according to the embodiment.

Next, the system configuration example illustrated in FIG. 4 will be introduced. In the example of FIG. 4, the motion sensor 102, the location sensor 104, the time/calendar information acquisition unit 106 and the application AP are provided in the client device. Furthermore, the movement/state recognition unit 108, the geo-categorisation unit 110 and the behaviour/situation recognition unit 112 are provided in the server. Also, the score map SM is held by the server.

As described above, the amount of computation of the behaviour/situation recognition unit 112 is relatively large. Particularly, in the case of using the learning model determination, it is difficult to realise the function of the behaviour/situation recognition unit 112 with the computation capability of an existing client device. On the other hand, the amount of computation of the movement/state recognition unit 108 and the amount of computation of the geo-categorisation unit 110 are relatively small. However, in a case of reducing the size of the client device, a processor with small amount of heat generation and with small die size is sometimes installed at the expense of computation capability. In such case, the movement/state recognition unit 108 and the geo-categorisation unit 110 are preferably provided in the server as shown in the example of FIG. 4.

According to such configuration, the client device can allocate computation resources to the application AP or other functions. Furthermore, since the geo-categorisation unit 110 is not provided in the client device, operations of holding or acquiring the map information MP and the geo category information GC become unnecessary. Accordingly, a storage area that is temporarily or perpetually occupied by the map information MP or the geo category information GC can be released.

(System Configuration Example (4))

Figure 5:
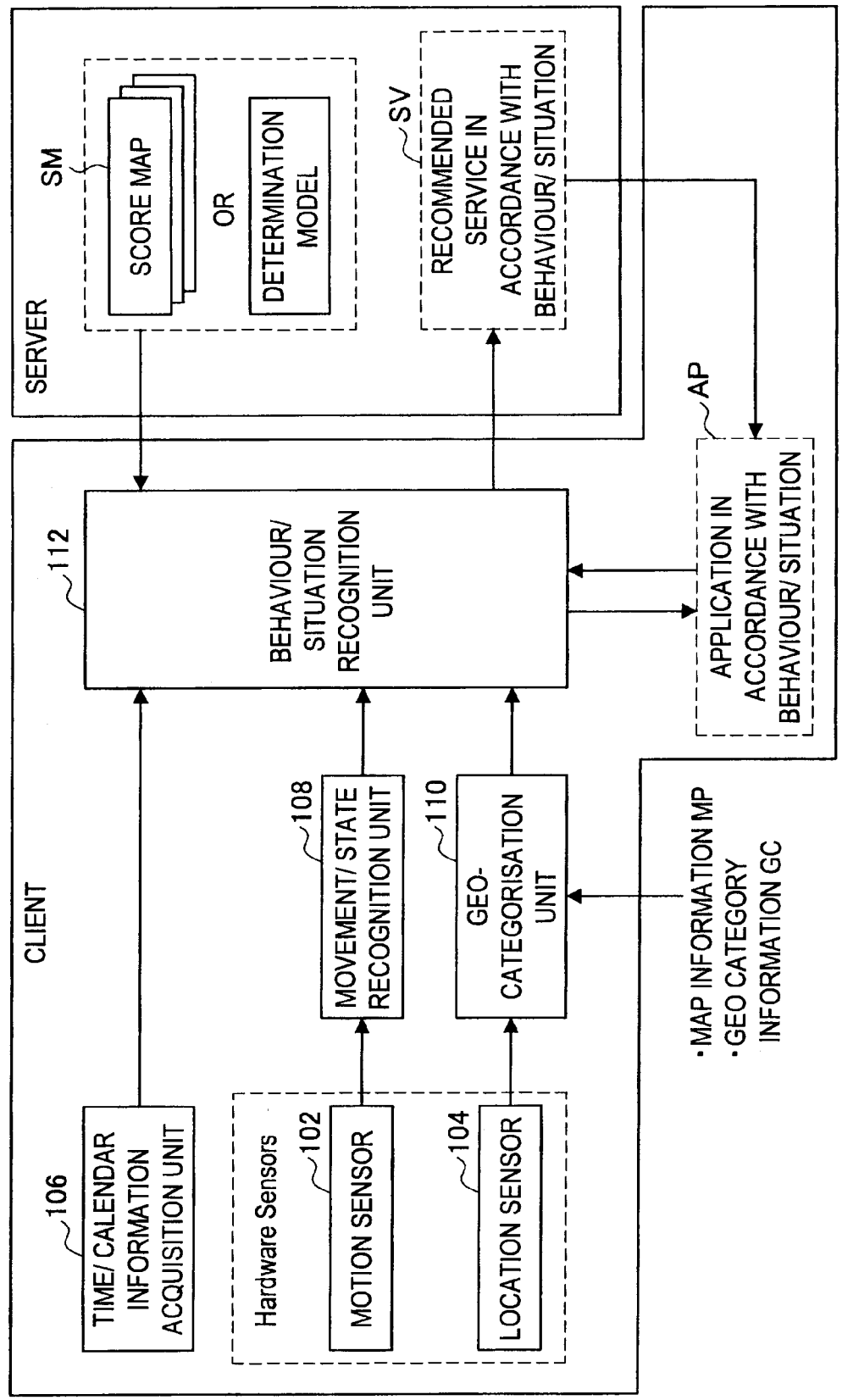
FIG. 5 is an explanatory diagram showing an example of the system configuration of the behaviour/situation analysis system according to the embodiment.

Next, the system configuration example illustrated in FIG. 5 will be introduced. In the example of FIG. 5, the motion sensor 102, the location sensor 104, the time/calendar information acquisition unit 106, the movement/state recognition unit 108, the geo-categorisation unit 110, the behaviour/situation recognition unit 112 and the application AP are provided in the client device. Furthermore, the score map SM or information on the determination model is held by the server.

As described above, the amount of computation of the behaviour/situation recognition unit 112 is relatively large. Particularly, in the case of using the learning model determination, it is difficult to realise the function of the behaviour/situation recognition unit 112 with the computation capability of an existing client device. Accordingly, as shown in the example of FIG. 5, a method can be conceived of calculating the determination model in advance by the server and providing the client device with the determination model. In this case, the behaviour/situation recognition unit 112 provided in the client device detects the behaviour/situation pattern by using the determination model provided from the server as it is, or the behaviour/situation recognition unit 112 modifies the determination model based on a feedback from a user and uses the modified determination model. According to such configuration, even a client device with relatively low computation capability is enabled to realise the function of the behaviour/situation recognition unit 112.

Also in a case of using the rule-based determination, the amount of data of the score map SM sometimes takes up the storage area of the client device. Accordingly, it is sometimes preferable that the score map SM is held by the server. Furthermore, a process of optimising the score map SM is also a process that calls for a relatively large amount of computation. Accordingly, by optimising the score map SM by the server and by using the optimised score map SM by the behaviour/situation recognition unit 112 of the client device, highly accurate detection of the behaviour/situation pattern can be realised by the client device.

(System Configuration Example (5))

Figure 6:
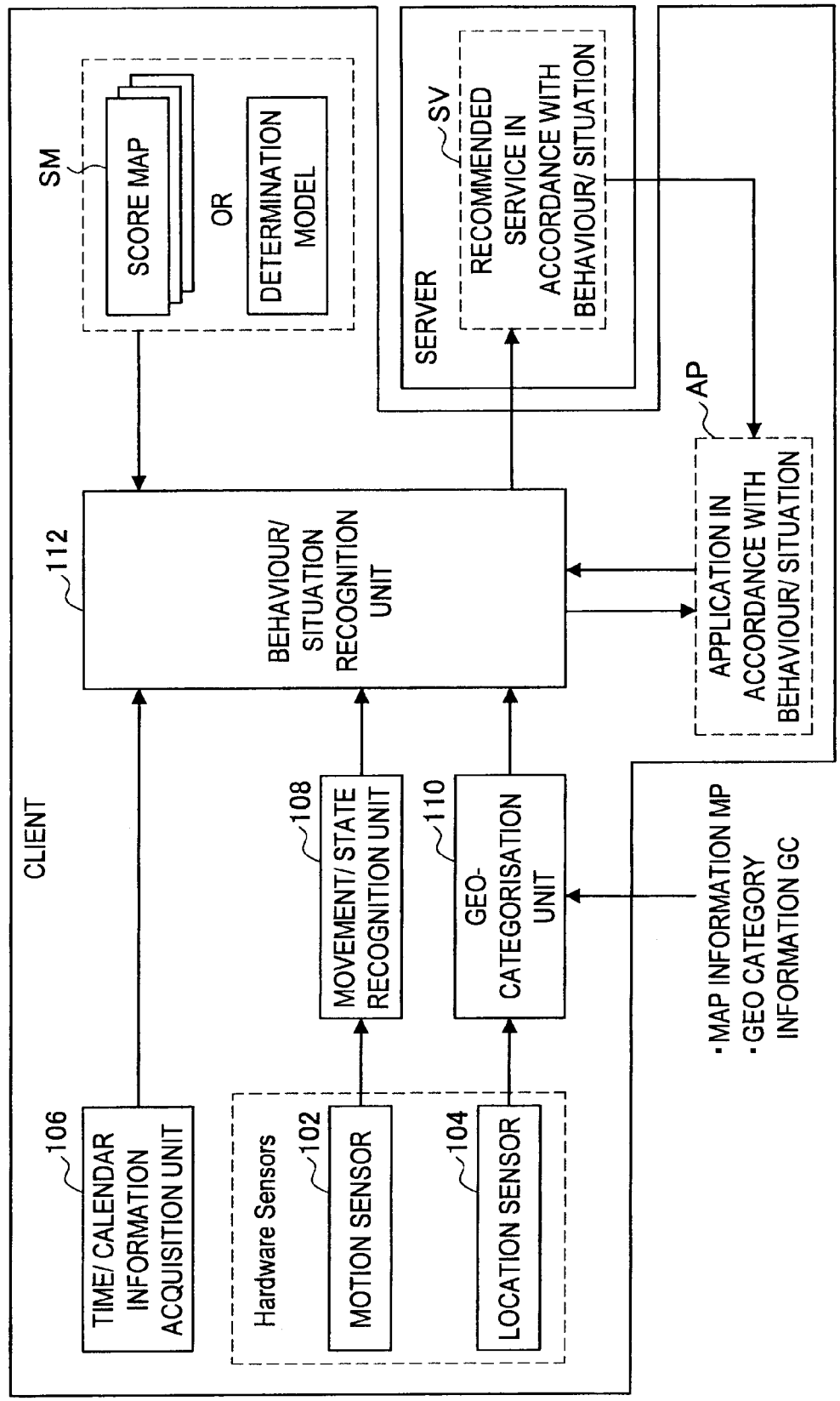
FIG. 6 is an explanatory diagram showing an example of the system configuration of the behaviour/situation analysis system according to the embodiment.

Next, the system configuration example illustrated in FIG. 6 will be introduced. In the example of FIG. 6, the motion sensor 102, the location sensor 104, the time/calendar information acquisition unit 106, the movement/state recognition unit 108, the geo-categorisation unit 110, the behaviour/situation recognition unit 112 and the application AP are provided in the client device. Furthermore, the score map SM is held by the client device. The system configuration illustrated in FIG. 6 is mostly the same with the system configuration example (2) described above. However, although the map information MP and the geo category information GC were held by the client device according to the system configuration example (2), the map information MP and the geo category information GC are acquired from outside according to the system configuration example (5) illustrated in FIG. 6. According to such configuration, a usable storage area can be expanded. Also, since it becomes possible to use the latest map information MP and geo category information GC, the behaviour/situation pattern can be detected with further improved accuracy.

Heretofore, examples of the server/client configuration of the behaviour/situation analysis system 10 have been introduced. Additionally, the system configurations illustrated in FIGS. 2 to 6 can be similarly applied to the server/client configurations of the second to fourth embodiments described later. In the following, the function of each structural element configuring the behaviour/situation analysis system 10 will be described in greater detail.

<1-2: Function of Movement/State Recognition Unit 108>

First, a function of the movement/state recognition unit 108 will be descried in detail with reference to FIGS. 7 to 15. FIGS. 7 to 15 are explanatory diagrams for explaining a function and an operation of the movement/state recognition unit 108.

(Structure of Input-Output Data)

Figure 7:
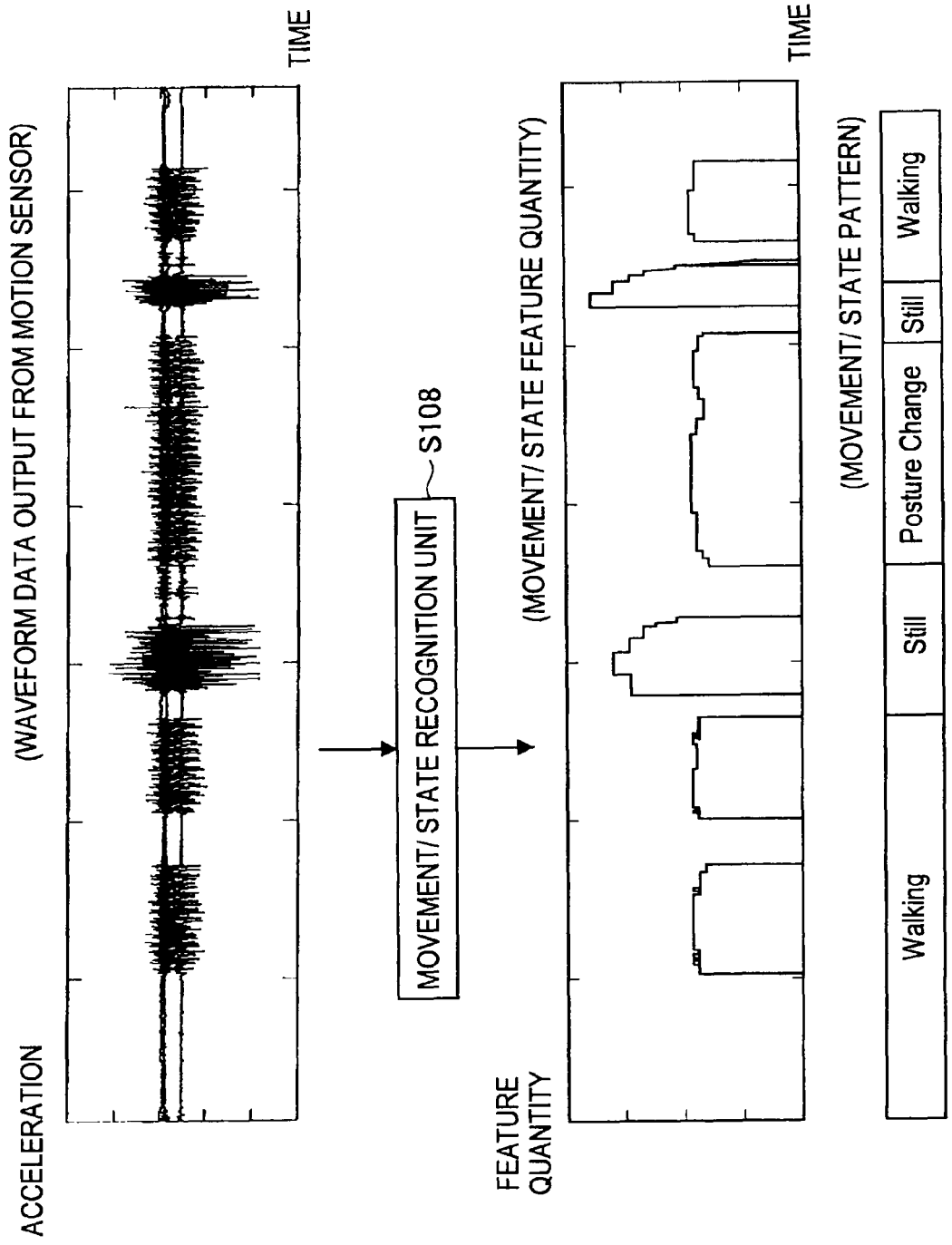
FIG. 7 is an explanatory diagram for explaining a function of a movement/state recognition unit according to the embodiment.

Reference will be made to FIG. 7. As described above, sensor data is input from the motion sensor 102 to the movement/state recognition unit 108. For example, waveform data of acceleration (hereinafter, acceleration data) is input as the sensor data, as shown in FIG. 7. Additionally, although it may not be clear from the example of FIG. 7, the acceleration data in x direction (x-acc), the acceleration data in y direction (y-acc) and the acceleration data in z direction (z-acc) are input to the movement/state recognition unit 108. Additionally, x, y and z are directions mutually orthogonal to each other. Furthermore, in a case a gyro sensor is installed, three-dimensional gyro data (x-gyro, y-gyro, z-gyro) is input as the sensor data. Additionally, since the sensitivity of the sensor changes due to the temperature, atmospheric pressure or the like, these pieces of sensor data are preferably calibrated.

When the sensor data is input, the movement/state recognition unit 108 detects a movement/state pattern based on the input sensor data. The movement/state pattern that can be detected by the movement/state recognition unit 108 may be, for example, "walking," "running," "still," pausing," "jumping," "posture changing," "turning," "train (aboard)," "elevator (ascending/descending)," "car (aboard)" or "bicycle (riding)" (see FIG. 8).

For example, an algorithm for detecting a walking state will be considered. Normally, the frequency of the acceleration data detected at the time of a person walking is about 2 Hz (two steps per second). Accordingly, the movement/state recognition unit 108 analyses the frequency of acceleration data, and detects a portion at which the frequency is about 2 Hz. The portion detected by the process corresponds to the movement/state "walking." The movement/state recognition unit 108 can also detect, from the acceleration data, the time of occurrence of the "walking" movement/state pattern, the duration thereof, or the like. Furthermore, the movement/state recognition unit 108 can detect the intensity of "walking" from the amplitude of the acceleration data.

As described, a feature quantity of each movement/state pattern (hereinafter, movement/state feature quantity) can be detected based on data such as frequency or intensity obtained by analysing the sensor data. Additionally, only the acceleration data is used in the example of the "walking" movement/state, but gyro data is also used depending on the type of the movement/state pattern. When a change over time in the movement/state feature quantity is obtained, the movement/state recognition unit 108 sequentially determines the movement/state patterns from the movement/state feature quantity, and outputs a movement/state pattern that changes time-serially (see FIG. 7). However, it should be noted that the movement/state pattern obtained here is only a collection of actions of a user performed in a short period of time, and does not indicate a specific daily behaviour of the user.

The movement/state pattern obtained by the movement/state recognition unit 108 in this manner is input to the behaviour/situation recognition unit 112. Now, a more detailed detection algorithm will be described below in relation to a part of the movement/state patterns shown in FIG. 8.

(Pause/Stillness Recognition Method)

Figure 9:
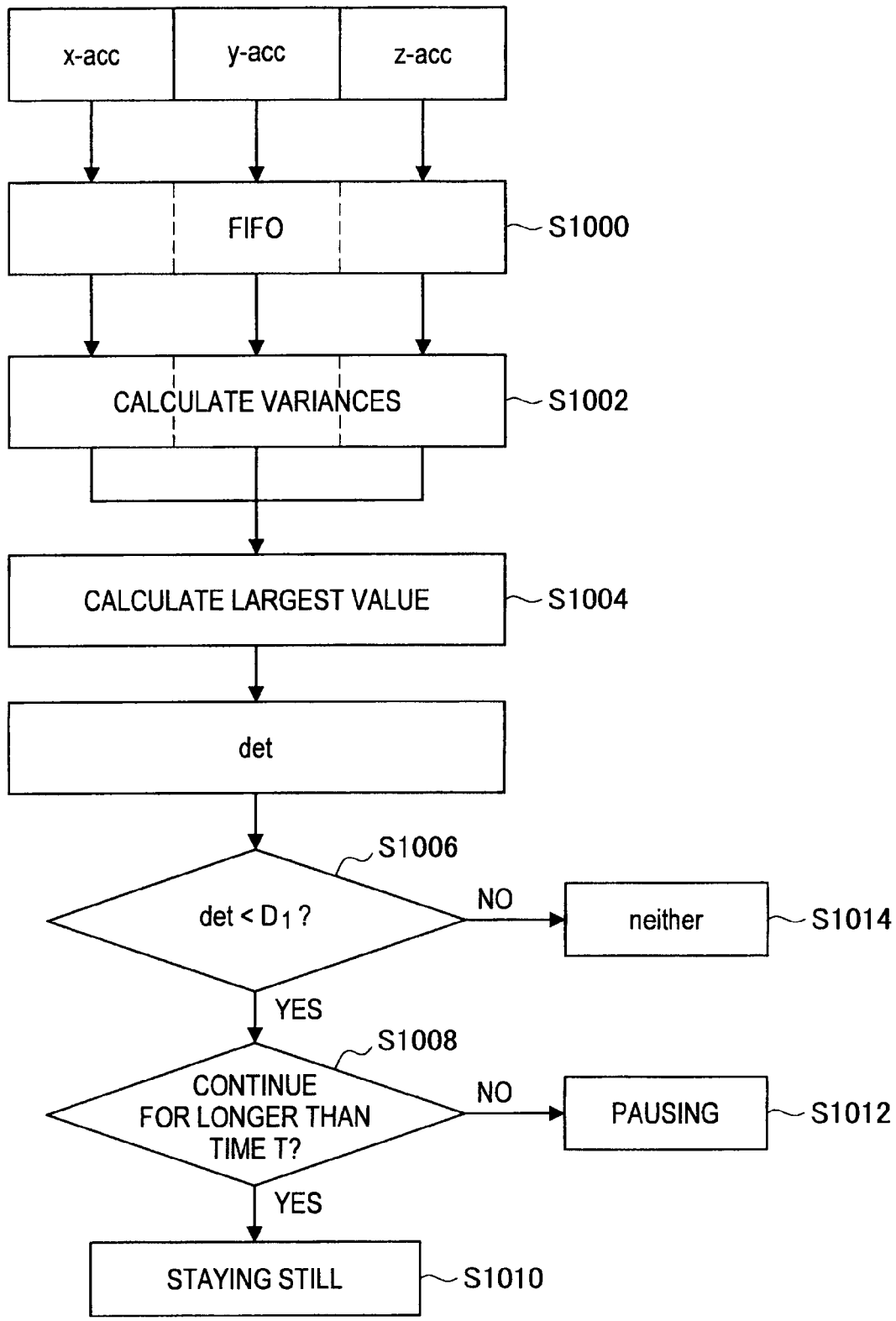
FIG. 9 is an explanatory diagram for explaining a function of the movement/state recognition unit according to the embodiment.

First, a method of recognising whether a user is pausing or staying still will be described with reference to FIG. 9. FIG. 9 is an explanatory diagram showing a method of recognising whether a user is pausing or staying still.

First, when a user performs a behaviour, sensor data is input to the movement/state recognition unit 108. Here, three-axis direction acceleration data (x-acc, y-acc, z-acc) is input. When the sensor data is input, the movement/state recognition unit 108 records the sensor data in FIFO manner (S1000). When a specific amount of data is recorded, the movement/state recognition unit 108 calculates respective variances of x-acc, y-acc and z-acc (S1002). Then, the movement/state recognition unit 108 extracts a largest variance for stillness determination (det) which is the largest variance among the variances (S1004).

When the largest variance for stillness determination is extracted, the movement/state recognition unit 108 determines whether or not the extracted largest variance for stillness determination is smaller than a stillness recognition value D1 indicating a still state (S1006). In a case the largest variance for stillness determination is not smaller than D1, the movement/state recognition unit 108 determines that the user is not staying still. In a case such determination is made, it is assumed that the user is performing some kind of behaviour. Accordingly, the movement/state recognition unit 108 inputs information indicating that the user is not staying still to the behaviour/situation recognition unit 112 (S1014).

On the other hand, in a case the largest variance for stillness determination is smaller than D1, the movement/state recognition unit 108 determines whether or not the state where the largest variance is smaller than D1 continues for a period longer than a stillness recognition time T1 (S1008). The stillness recognition time T1 here indicates the minimum time during which the user is assumed to be staying still. In a case the state where the largest variance is smaller than D1 continues for a period longer than T1, the movement/state recognition unit 108 determines that the user is staying still, and inputs information indicating stillness to the behaviour/situation recognition unit 112 (S1010). In a case the state where the largest variance is smaller than D1 does not continue for a period longer than T1, the movement/state recognition unit 108 determines that the user is pausing, and inputs information indicating pause to the behaviour/situation recognition unit 112 (S1012).

As described, by performing determination processing according to the example of FIG. 9, a still state, a pause state and a non-still state can be distinguished.

(Walking/Running Recognition Method)

Figure 10:
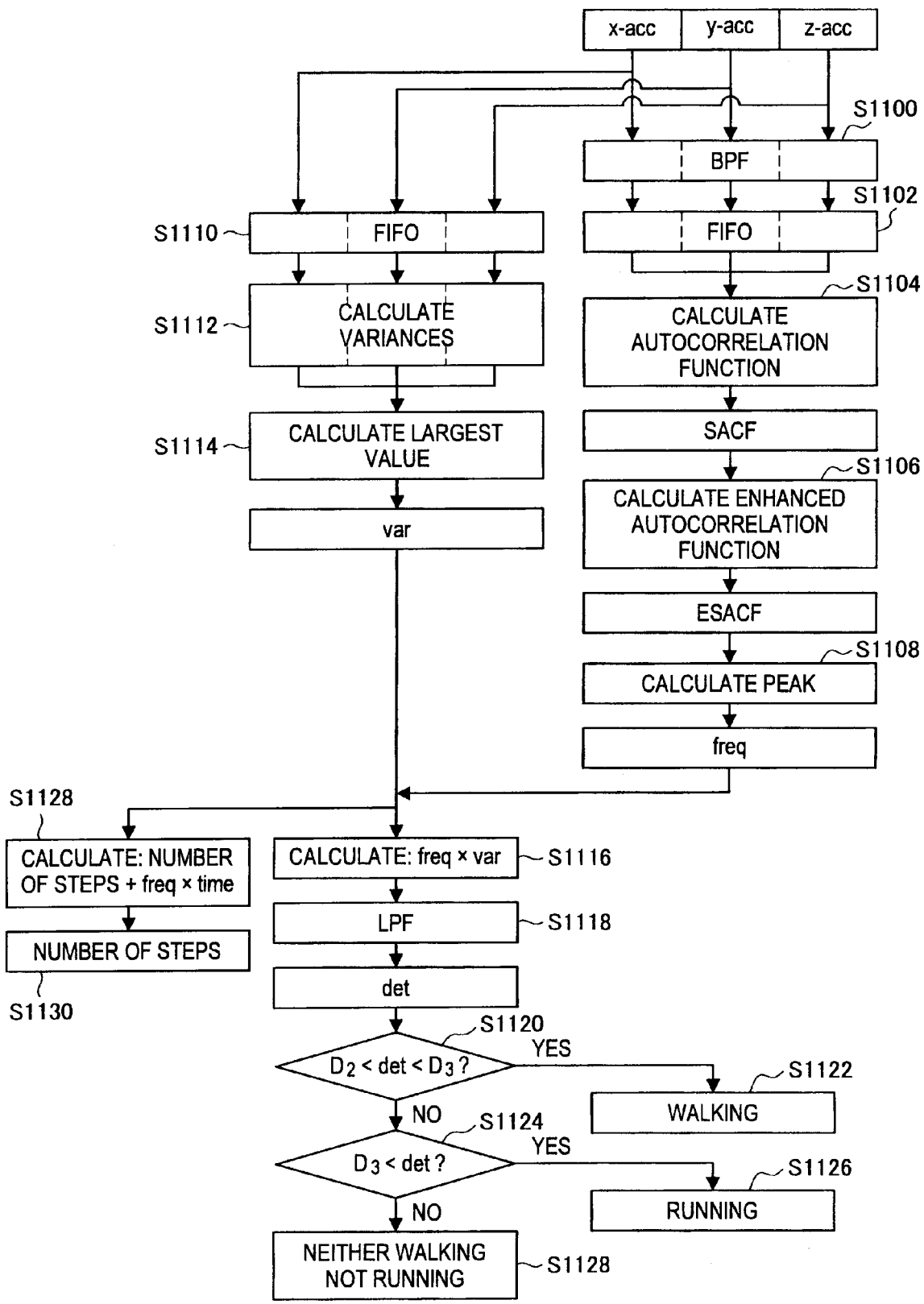
FIG. 10 is an explanatory diagram for explaining a function of the movement/state recognition unit according to the embodiment.

Next, a method of recognising whether a user is walking or running will be described with reference to FIG. 10. FIG. 10 is an explanatory diagram showing a method of recognising whether a user is walking or running.

First, when a user performs a behaviour, sensor data is input to the movement/state recognition unit 108. Here, three-axis direction acceleration data (x-acc, y-acc, z-acc) is input. When the sensor data is input, the movement/state recognition unit 108 removes, from x-acc, y-acc and z-acc, a frequency outside a frequency range at which the user is recognised to be walking or running, by using a band-pass filter (BPF) (S1100). Then, the movement/state recognition unit 108 records x-acc, y-acc and z-acc that passed through the BPF in FIFO manner (S1102).

Then, the movement/state recognition unit 108 reads specific amounts of the x-acc, y-acc and z-acc that are recorded after passing through the BPF, and calculates an autocorrelation function (SACF: summary autocorrelation function) for the read out data. The time-series of SACF peaks corresponds to a periodic movement of a user caused at the time of walking or running. However, the SACF includes a harmonic of a frequency corresponding to walking or running. Accordingly, the movement/state recognition unit 108 calculates an enhanced autocorrelation function (ESACF: enhanced summary autocorrelation function) based on the calculated autocorrelation function (SACF) (S1106). Then, the movement/state recognition unit 108 calculates an autocorrelation peak based on the ESACF (S1108), and obtains a frequency for walking/running determination (freq).

Furthermore, the movement/state recognition unit 108 records, in FIFO manner, x-acc, y-acc and z-acc that are not yet made to pass through the BPF in step S1100 (S1110). Then, the movement/state recognition unit 108 reads specific amounts of the x-acc, y-acc and z-acc, and calculates the respective variances (S1112). Then, the movement/state recognition unit 108 extracts the largest variance from the calculated variances, and outputs the same as a largest variance for walking/running determination (var) (S1114).

Then, the movement/state recognition unit 108 multiplies the frequency for walking/running determination (freq) and the largest variance for walking/running determination (var) (S1116). The number of steps per unit time is expressed by freq. Also, the magnitude of a movement is expressed by var. Furthermore, whether a user is walking or running can be determined based on the number of steps and the magnitude of the movement. Therefore, whether a user is walking or not can be determined by determining whether a product of freq and var is within a specific range or not. First, to increase the accuracy of the determination, the movement/state recognition unit 108 calculates data for walking/running determination det by removing, from the product of freq and var, a frequency range at which walking or running is easily erroneously recognised (S1118).

Then, the movement/state recognition unit 108 determines whether or not the data for walking/running determination is larger than a minimum walking recognition value D2 which is the lower limit for walking to be recognised but smaller than a largest walking recognition value D3 which is the upper limit for walking to be recognised (S1120). In a case it is larger than D2 but smaller than D3, the movement/state recognition unit 108 determines that the user is walking, and inputs information indicating walking to the behaviour/situation recognition unit 112 (S1122). On the other hand, in a case it is not D2<det<D3, the movement/state recognition unit 108 proceeds to the process of step S1124, and determines whether or not the data for walking/running determination det is larger than D3 (S1124).

In a case the data for walking/running determination is larger than D3, the movement/state recognition unit 108 determines that the user is running, and inputs information indicating running to the behaviour/situation recognition unit 112 (S1126). On the other hand, in a case the data for walking/running determination is below D2, the movement/state recognition unit 108 determines that the user is nether walking nor running, and inputs information that the movement/state pattern is not of walking or running to the behaviour/situation recognition unit 112 (S1128). Additionally, by integrating the freq, information on the number of steps walked during a period of time corresponding to an integral interval is obtained. Thus, the movement/state recognition unit 108 calculates the information on the number of steps, and inputs the information to the behaviour/situation recognition unit 112.

As described, by performing the determination processing according to the example of FIG. 10, a walking state, a running state and a non-walking/non-running state can be distinguished.

(Jumping Recognition Method)

Figure 11:
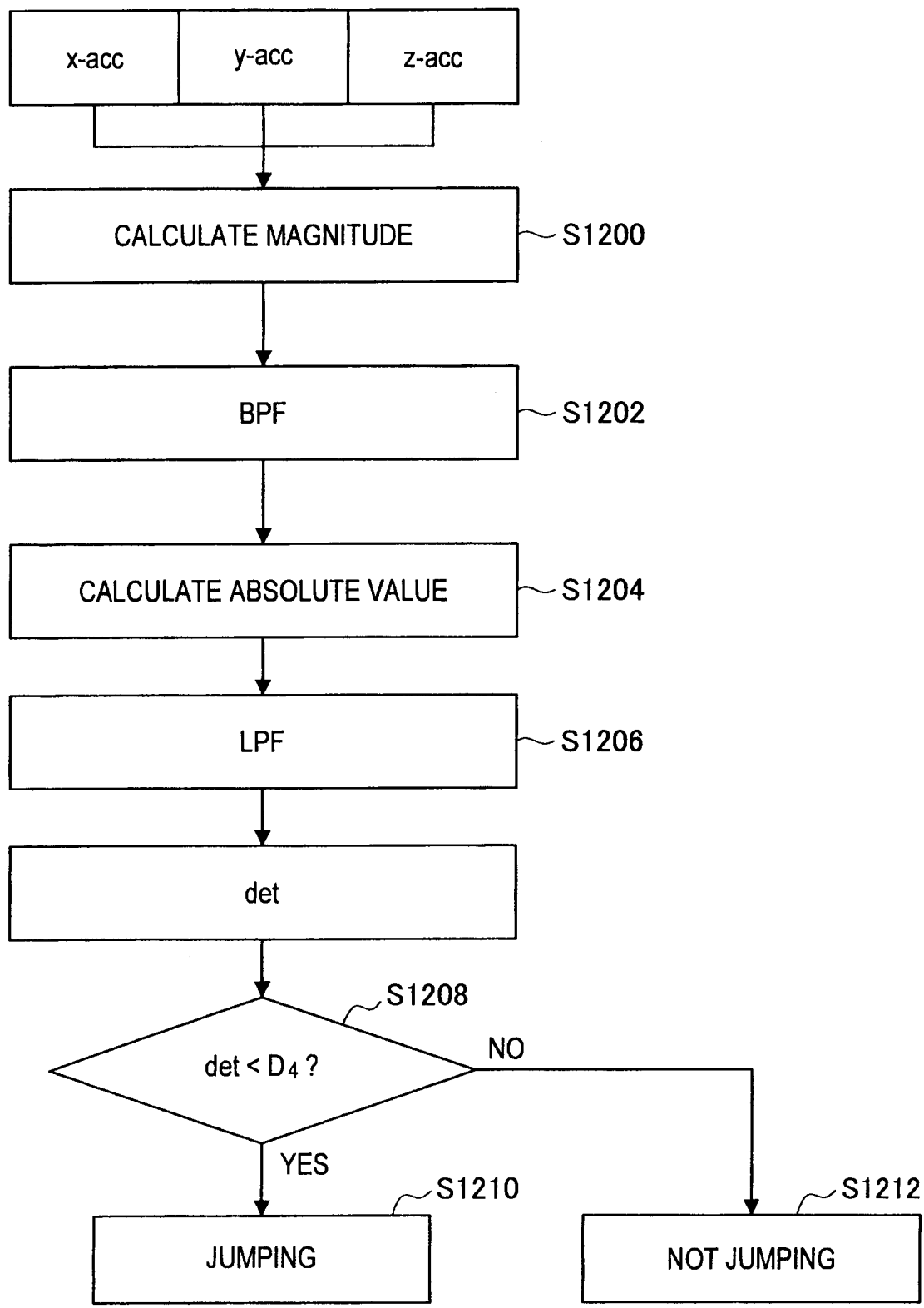
FIG. 11 is an explanatory diagram for explaining a function of the movement/state recognition unit according to the embodiment.

Next, a method of recognising whether a user is jumping or not will be described with reference to FIG. 11. FIG. 11 is an explanatory diagram showing a method of recognising whether a user is jumping or not.

First, when a user performs a behaviour, sensor data is input to the movement/state recognition unit 108. Here, three-axis direction acceleration data (x-acc, y-acc, z-acc) is input. When the sensor data is input, the movement/state recognition unit 108 calculates a jump acceleration expressed by the magnitude of x-acc, y-acc and z-acc (S1200). Then, the movement/state recognition unit 108 removes, by a band-pass filter (BPF), a frequency outside a jumping recognition value range at which a user is recognised to be jumping (S1202). Then, the movement/state recognition unit 108 calculates an absolute value of a value that passed through the BPF, and outputs the same as a compensated jump acceleration (S1204). When an absolute value is obtained in this manner, a noise component caused due to shaking, rocking or the like of a housing occurring at the time of jumping is more removed than for the jump acceleration.

Then, the movement/state recognition unit 108 removes, from the compensated jump acceleration, a frequency range at which jumping is easily erroneously recognised, by using a low-pass filter (LPF) (S1206). Then, the movement/state recognition unit 108 calculates, from the data that passed through the LPF, a jumping-state determination value (det) for determination of whether the user is jumping or not. Next, the movement/state recognition unit 108 determines whether the jumping-state determination value is larger than a minimum jumping recognition value D4 which is the lower limit for jumping to be recognised (S1208). In a case it is larger than the minimum jumping recognition value D4, the movement/state recognition unit 108 determines that the user is jumping, and inputs information indicating jumping to the behaviour/situation recognition unit 112 (S1210). On the other hand, in a case it is smaller than the minimum jumping recognition value D4, the movement/state recognition unit 108 determines that the user is not jumping, and inputs information indicating that the user is not jumping to the behaviour/situation recognition unit 112 (S1212).

As described, by performing the determination processing according to the example of FIG. 11, a jumping state and a non-jumping state can be distinguished.

(Posture Changing Recognition Method)

Figure 12:
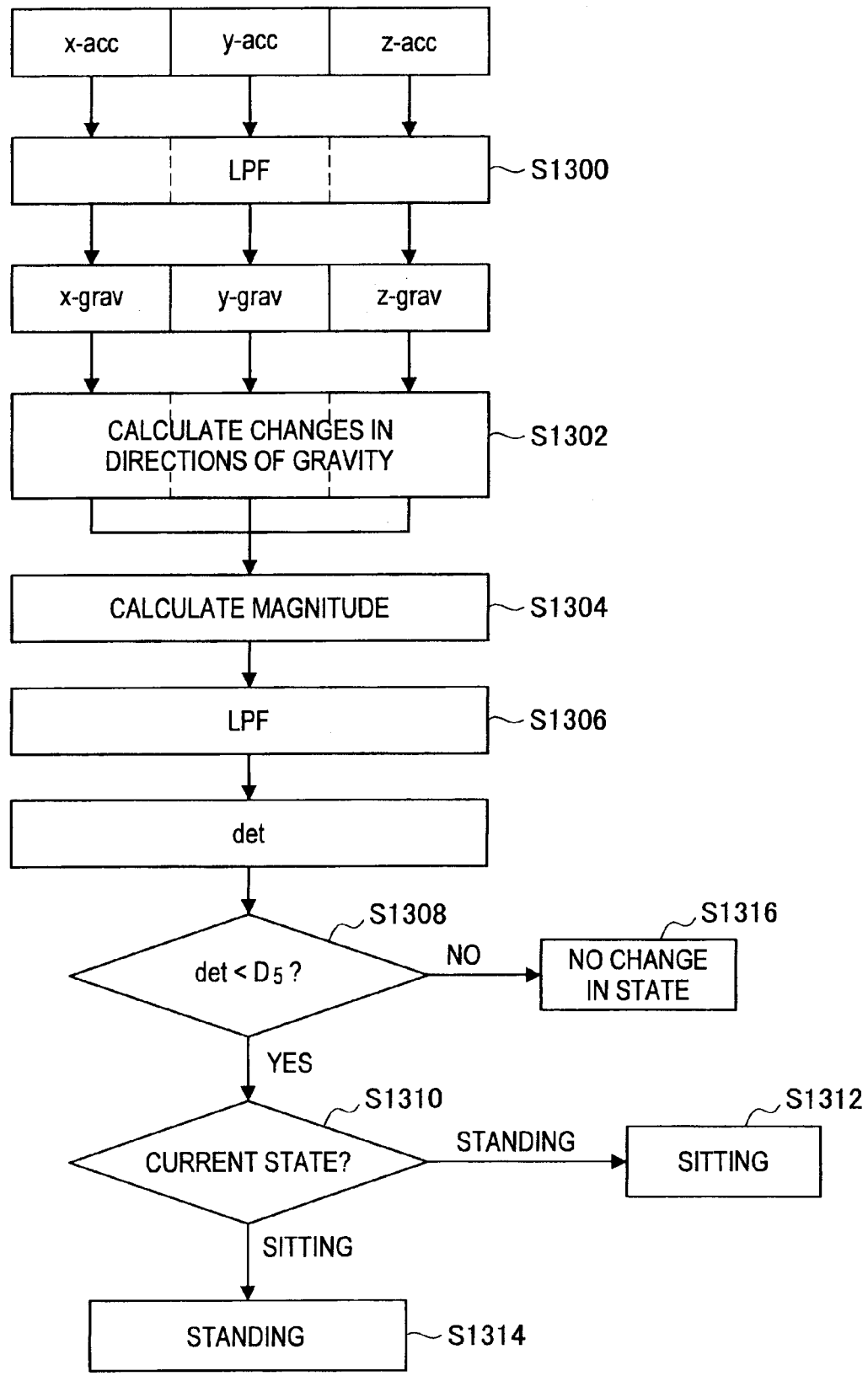
FIG. 12 is an explanatory diagram for explaining a function of the movement/state recognition unit according to the embodiment.

Next, a method of recognising whether a user is sitting or standing will be described with reference to FIG. 12. FIG. 12 is an explanatory diagram showing a method of recognising whether a user is sitting or standing. Additionally, to recognise whether a user is sitting or standing is to recognise standing up of a user who is sitting or sitting down of a user who is standing. That is, it is to recognise a change in a user's posture.

First, when a user performs a behaviour, sensor data is input to the movement/state recognition unit 108. Here, three-axis direction acceleration data (x-acc, y-acc, z-acc) is input. When the sensor data is input, the movement/state recognition unit 108 removes, from the x-acc, y-acc and z-acc, a frequency range at which a change in the user's posture is easily erroneously recognised, by using a low-pass filter (LPF) (S1300). Then, the movement/state recognition unit 108 calculates x-grav, y-grav and z-grav, based respectively on the x-acc, y-acc and z-acc. The x-grav, y-grav and z-grav are pieces of gravity data indicating the direction of gravity.

Next, the movement/state recognition unit 108 calculates values δ(x-grav) indicating a change in the calculated x-grav, δ(y-grav) indicating a change in the calculated y-grav, and δ(z-grav) indicating a change in the calculated z-grav (S1302). Then, the movement/state recognition unit 108 calculates a posture change value indicating the magnitude of the δ(x-grav), δ(y-grav) and δ(z-grav) (S1304). Then, the movement/state recognition unit 108 removes, from the calculated posture change value, a range at which a change in the user's posture is easily erroneously recognised, by using a low-pass filter (LPF) (S1306), and calculates a posture change determination value (det) for determination of whether the posture is changing or not.

Then, the movement/state recognition unit 108 determines whether or not the posture change determination value is larger than a minimum posture change recognition value D5 which is the lower limit for the posture change of a user to be recognised (S1308). In a case the posture change determination value is smaller than D5, the movement/state recognition unit 108 determines that there is no change in the posture, and inputs, to the behaviour/situation recognition unit 112, information indicating that there is no posture change (S1316). On the other hand, in a case the posture change determination value is larger than D5, the movement/state recognition unit 108 proceeds to the process of step S1310, and determines whether the user is sitting or standing (S1310). In a case the user was already standing, the movement/state recognition unit 108 determines that the user sat down, and inputs, to the behaviour/situation recognition unit 112, information indicating the sitting down (S1312). On the other hand, in a case the user was already seated, the movement/state recognition unit 108 determines that the user stood up, and inputs, to the behaviour/situation recognition unit 112, information indicating the standing up (S1314).

As described, by performing the determination processing according to the example of FIG. 12, presence or absence of posture change can be distinguished.

(Recognition Method of Ascending/Descending in Elevator)

Figure 13:
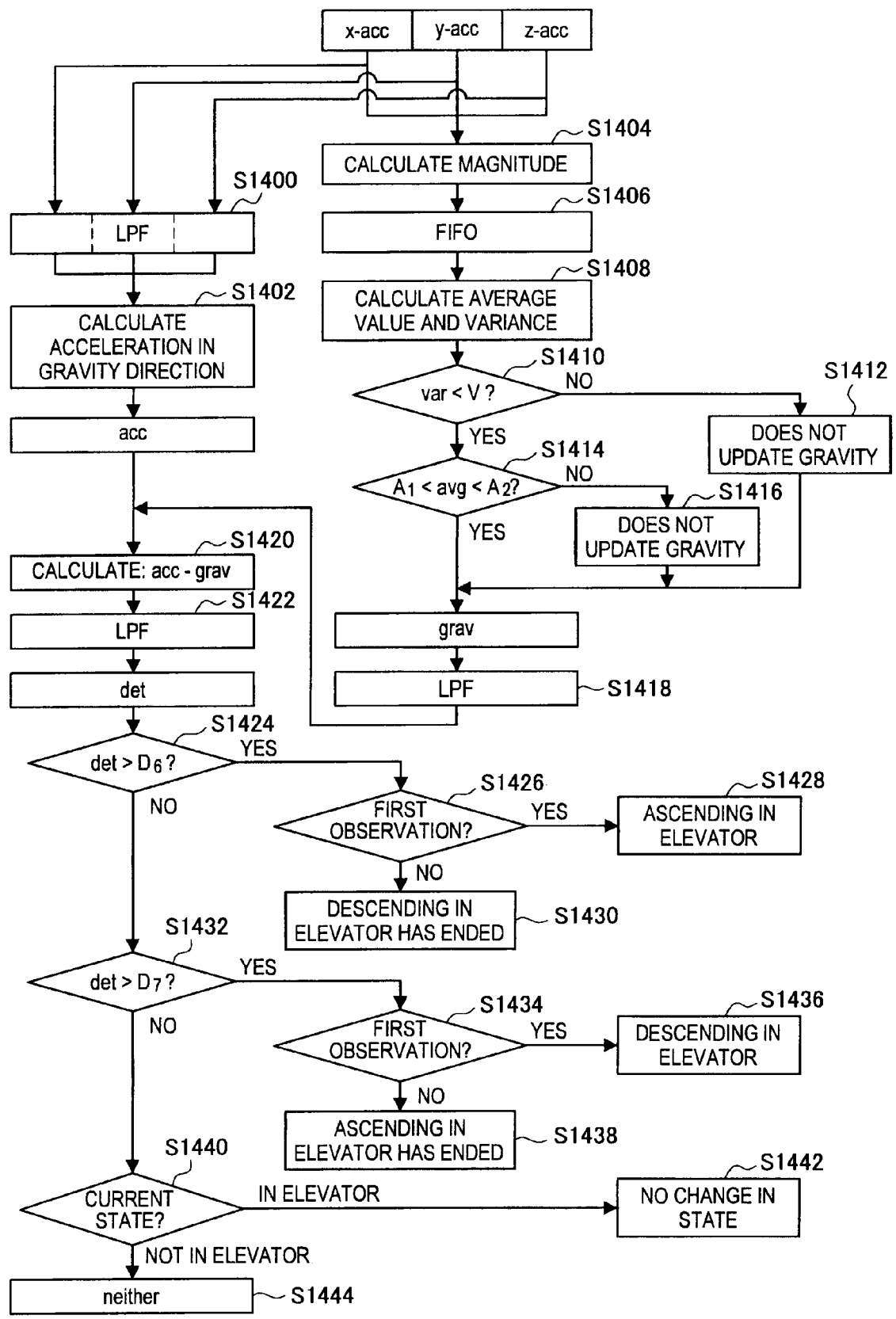
FIG. 13 is an explanatory diagram for explaining a function of the movement/state recognition unit according to the embodiment.

Next, a method of recognising whether a user is in an elevator or not will be described with reference to FIG. 13. FIG. 13 is an explanatory diagram showing a method of recognising whether a user is in an elevator or not.

First, when a user performs a behaviour, sensor data is input to the movement/state recognition unit 108. Here, three-axis direction acceleration data (x-acc, y-acc, z-acc) is input. When the sensor data is input, the movement/state recognition unit 108 removes, from the x-acc, y-acc and z-acc, a frequency range at which acceleration in a gravity direction is easily erroneously recognised, by using a low-pass filter (LPF) (S1400). Then, the movement/state recognition unit 108 calculates gravity direction acceleration sensor data (acc) based on the x-acc, y-acc and z-acc that passed through the LPF (S1402).

Furthermore, the movement/state recognition unit 108 calculates and records gravity adjustment data expressed by the magnitude of the x-acc, y-acc and z-acc to enable adjustment of the value of gravity (S1404, S1406). Then, the movement/state recognition unit 108 reads a specific amount of the gravity adjustment data, and calculates a gravity adjustment variance (var) which is the variance of the gravity adjustment data (S1408). Furthermore, the movement/state recognition unit 108 reads a specific amount of the gravity adjustment data, and calculates gravity adjustment average data which is the average value of the gravity adjustment data (S1408).

Then, the movement/state recognition unit 108 determines whether or not the gravity adjustment variance is smaller than a maximum allowable gravity adjustment variance V1 which is a maximum value that allows adjustment of gravity (S1410). In a case the gravity adjustment variance is larger than V1, the movement/state recognition unit 108 does not update the value of gravity (S1412). On the other hand, in a case the gravity adjustment variance is smaller than the maximum allowable gravity adjustment variance V1, the movement/state recognition unit 108 determines whether or not the gravity adjustment average data is larger than a minimum allowable gravity average value A1 which is a minimum average value that allows adjustment of gravity but smaller than a maximum allowable gravity average value A2 which is a maximum average value that allows adjustment of gravity (S1414).

In a case the gravity adjustment average data is larger than A1 but smaller than A2, the movement/state recognition unit 108 proceeds to the process of step S1418. On the other hand, in other cases, the movement/state recognition unit 108 does not update the value of the gravity (S1416). In a case it proceeded to the process of step S1418, the movement/state recognition unit 108 removes a low frequency range at which gravity is easily erroneously recognised, by using a low-pass filter (LPF) (S1418), and calculates compensated gravity adjustment average data. Next, the movement/state recognition unit 108 calculates a difference between the gravity direction acceleration sensor data and the compensated gravity adjustment average data (S1420). Then, the movement/state recognition unit 108 calculates elevator ascending/descending determination data by removing, from the calculated difference, a frequency range at which a user is easily erroneously recognised to be in an elevator (S1422).

Next, the movement/state recognition unit 108 determines whether or not the elevator ascending/descending determination data is larger than a specific value D6 (S1424). In a case the elevator ascending/descending determination data is larger than D6, the movement/state recognition unit 108 proceeds to the process of step S1426. On the other hand, in a case the elevator ascending/descending determination data is smaller than the specific value D6, the movement/state recognition unit 108 proceeds to the process of step S1432. Here, the specific value D6 is the lower limit at which it is possible to recognise the start of ascending of a user in an elevator.

In a case it proceeded to the process of step S1426, the movement/state recognition unit 108 determines whether or not the elevator ascending/descending determination data has exceeded the specific value D6 for the first time (S1426). In a case it is the first time, the movement/state recognition unit 108 proceeds to the step of S1428 and determines that the elevator is ascending, and inputs information indicating ascending in an elevator to the behaviour/situation recognition unit 112 (S1428). On the other hand, in a case it is not the first time, the movement/state recognition unit 108 proceeds to the process of step S1430 and determines that descending in the elevator has ended, and inputs information indicating the end of descending in an elevator to the behaviour/situation recognition unit 112 (S1430).

In a case it proceeded to the process of step S1432, the movement/state recognition unit 108 determines whether or not the elevator ascending/descending determination data is larger than a specific value D7 (S1432). Here, the specific value D7 is the upper limit at which it is possible to recognise the start of descending of a user in an elevator. In a case the elevator ascending/descending determination data is larger than the specific value D7, the movement/state recognition unit 108 proceeds to the process of step S1434. On the other hand, in a case the elevator ascending/descending determination data is smaller than the specific value D7, the movement/state recognition unit 108 proceeds to the process of step S1440.

In a case it proceeded to the process of step S1434, the movement/state recognition unit 108 determines whether or not the elevator ascending/descending determination data has fallen below the specific value D7 for the first time (S1434). In a case it is the first time, the movement/state recognition unit 108 proceeds to the step of S1436 and determines that the elevator is descending, and inputs information indicating descending in an elevator to the behaviour/situation recognition unit 112 (S1436). On the other hand, in a case it is not the first time, the movement/state recognition unit 108 proceeds to the process of step S1438 and determines that ascending in the elevator has ended, and inputs information indicating the end of ascending in an elevator to the behaviour/situation recognition unit 112 (S1438).

In a case it proceeded to the process of step S1440, the movement/state recognition unit 108 determines whether or not the user is currently in an elevator (S1440). In a case the user is in an elevator, the movement/state recognition unit 108 proceeds to the process of step S1442 and determines that the elevator is not in a state of acceleration or deceleration, and inputs information indicating a state of no acceleration or deceleration of elevator to the behaviour/situation recognition unit 112 (S1442). On the other hand, in a case the user is not in an elevator, the movement/state recognition unit 108 proceeds to the process of step S1444, and inputs information indicating a state where the user is not in an elevator to the behaviour/situation recognition unit 112 (S1444).

As described, by performing the determination processing according to the example of FIG. 13, ascending or descending in an elevator can be distinguished.

(Recognition Method of Riding on Train)

Figure 14:
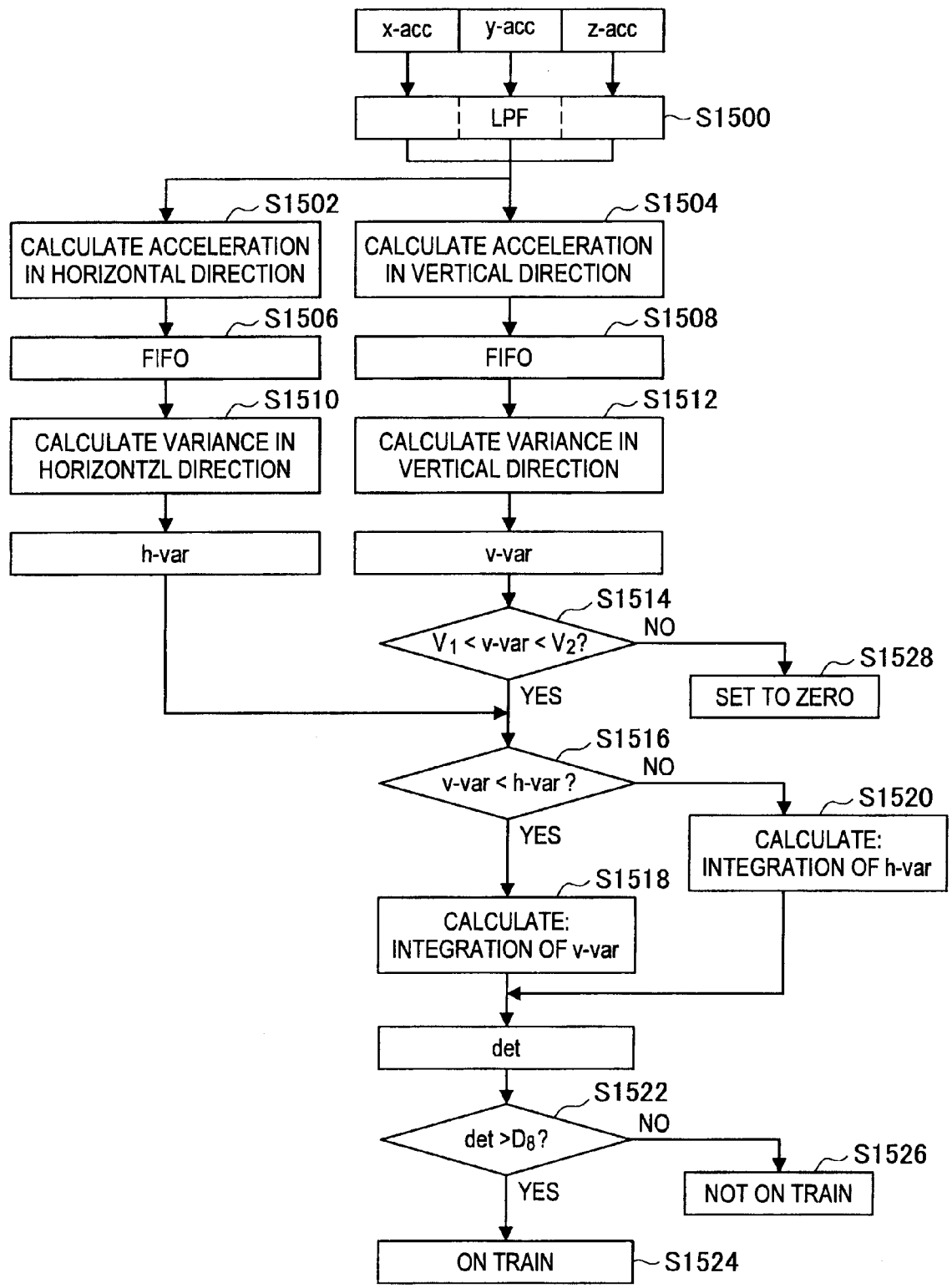
FIG. 14 is an explanatory diagram for explaining a function of the movement/state recognition unit according to the embodiment.

Next, a method of recognising whether a user is riding on a train or not will be described with reference to FIG. 14. FIG. 14 is an explanatory diagram showing a method of recognising whether a user is riding on a train or not.

First, when an user performs a behaviour, sensor data is input to the movement/state recognition unit 108. Here, three-axis direction acceleration data (x-acc, y-acc, z-acc) is input. When the sensor data is input, the movement/state recognition unit 108 removes, from the x-acc, y-acc and z-acc, a frequency range at which a user is easily erroneously recognised to be riding on a train, by using a low-pass filter (LPF) (S1500). Then, the movement/state recognition unit 108 calculates horizontal direction acceleration data and vertical direction acceleration data based on the x-acc, y-acc and z-acc from which the frequency range described above has been removed (S1502, S1504). Here, the horizontal direction and the vertical direction respectively mean a direction horizontal or vertical to the ground on which the train is running.

Next, the movement/state recognition unit 108 records, in FIFO manner, specific amounts of the horizontal direction acceleration data and the vertical direction acceleration data (S1506, S1508). Then, the movement/state recognition unit 108 reads a specific amount of the horizontal direction acceleration data, and calculates a horizontal direction variance (h-var) which is the variance of the horizontal direction acceleration data (S1510). Also, the movement/state recognition unit 108 reads a specific amount of the vertical direction acceleration data, and calculates a vertical direction variance (v-var) which is the variance of the vertical direction acceleration data (S1512). The horizontal direction variance (h-var) indicates the degree of rocking and rolling in the horizontal direction detected at the time of a train running. Also, the vertical direction variance (v-var) indicates the degree of rocking and pitching in the vertical direction detected at the time of the train running.

Then, the movement/state recognition unit 108 determines whether or not the vertical direction variance (v-var) is larger than a minimum allowable vertical variance V1 which is a minimum vertical direction variance that is allowed but smaller than a maximum allowable vertical variance V2 which is a maximum vertical variance that is allowed (S1514). In a case the vertical direction variance (v-var) is V1 or less or V2 or more, the movement/state recognition unit 108 sets train-ride determination data (det) to zero (S1528). On the other hand, in a case the vertical direction variance is larger than V1 but smaller than V2, the movement/recognition unit 108 proceeds to the process of step S1516.

In a case it proceeded to the process of step S1516, the movement/state recognition unit 108 determines which of the vertical direction variance and the horizontal direction variance is smaller (S1516). In a case the vertical direction variance (v-var) is smaller, the movement/state recognition unit 108 integrates the vertical direction variance (v-var) for a specific amount of data, and calculates an integral (S1518). On the other hand, in a case the horizontal direction variance (h-var) is smaller, the movement/state recognition unit 108 integrates the horizontal direction variance (h-var) for a specific amount of data, and calculates an integral (S1520). Then, the integrals obtained by the processes of steps S1518 and S1520 are set as the train-ride determination data (det) which is for determination of whether a user is riding on a train or not.

Then, the movement/state recognition unit 108 determines whether or not the train-ride determination data is larger than a minimum train-ride recognition value D8 which is the lower limit at which a user is recognised to be riding on a train (S1522). In a case the train-ride determination data is larger than D8, the movement/state recognition unit 108 determines that the user is riding on a train, and inputs information indicating a state where the user is riding on a train to the behaviour/situation recognition unit 112 (S1524). On the other hand, in a case the train-ride determination data is smaller than D8, the movement/state recognition unit 108 determines that the user is not riding on a train, and inputs information indicating that the user is not riding on a train to the behaviour/situation recognition unit 112 (S1526).

As described, by performing the determination processing according to the example of FIG. 14, whether or not it is a state where a user is riding on a train can be distinguished. By focusing on the state of a train from acceleration to deceleration, a case where the user is riding on a train stopped at a station, a case where the train stopped at a station, a case where the user got off a train that arrived at a station and started walking, and the like, can also be distinguished. These determination results may be notified to the behaviour/situation recognition unit 112.

(Right-Turn/Left-Turn Recognition Method)

Figure 15:
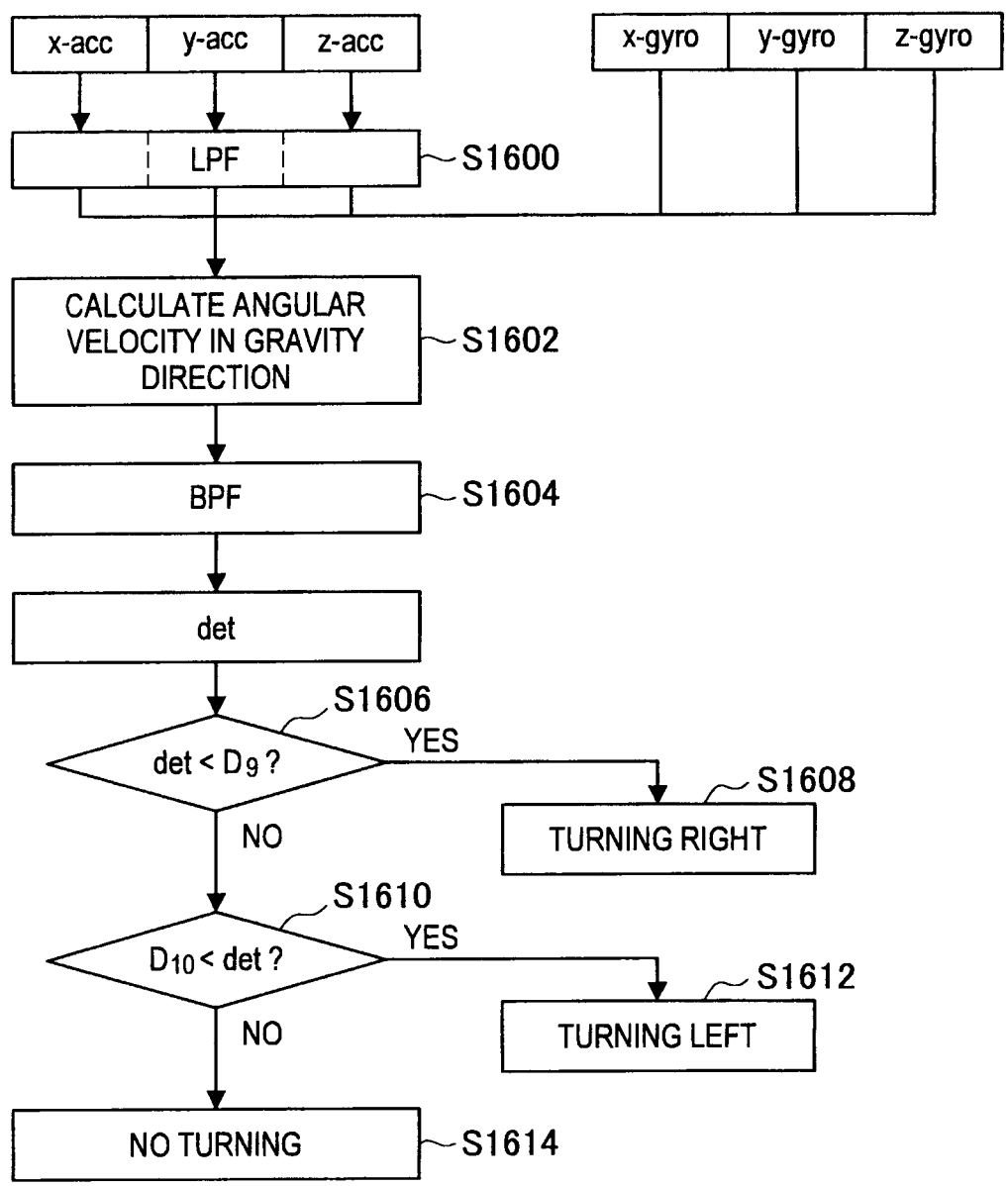
FIG. 15 is an explanatory diagram for explaining a function of the movement/state recognition unit according to the embodiment.

Next, a method of recognising a right turn or a left turn of a user will be described with reference to FIG. 15. FIG. 15 is an explanatory diagram showing a method of recognising a right turn or a left turn of a user.

First, when a user performs a behaviour, sensor data is input to the movement/state recognition unit 108. Here, three-axis direction acceleration data (x-acc, y-acc, z-acc) and gyro data (x-gyro, y-gyro, z-gyro) are input. When the sensor data is input, the movement/state recognition unit 108 removes, from the input sensor data, a frequency range at which a right turn or a left turn is easily erroneously recognised, by using a low-pass filter (LPF) (S1600). Then, the movement/state recognition unit 108 calculates an angular velocity in a gravity direction based on the x-acc, y-acc and z-acc from which the frequency range described above has been removed and the x-gyro, y-gyro and z-gyro (S1602).

Next, the movement/state recognition unit 108 calculates a compensated angular velocity (det) by removing, from the calculated angular velocity by using a band-pass filter (BPF), a value outside a turn recognition range for recognition of a right turn or a left turn (S1604). Then, the movement/state recognition unit 108 determines whether the compensated angular velocity is smaller than a maximum right-turn recognition value D9 which is the upper limit for recognition of a right turn of a user (S1606). In a case the compensated angular velocity is smaller than D9, the movement/state recognition unit 108 determines that the user is turning right, and inputs the determination result to the behaviour/situation recognition unit 112 (S1608). On the other hand, in a case the compensated angular velocity is D9 or more, the movement/state recognition unit 108 proceeds to the process of step S1610.

In a case it proceeded to the process of step S1610, the movement/state recognition unit 108 determines whether or not the compensated angular velocity is larger than a minimum left-turn recognition value D10 which is the lower limit for recognition of a left turn of the user (S1610). In a case the compensated angular velocity is larger than D10, the movement/state recognition unit 108 determines that the user is turning left, and inputs the determination result to the behaviour/situation recognition unit 112 (S1612). On the other hand, in a case the compensated angular velocity is smaller than D10, the movement/state recognition unit 108 determines that the user is turning neither right nor left, and inputs the determination result to the behaviour/situation recognition unit 112 (S1614).

As described, by performing the determination processing according to the example of FIG. 15, a right turn and a left turn of a user can be distinguished.

Heretofore, the function of the movement/state recognition unit 108 has been described in detail. As described above, a movement/state pattern does not indicate a specific daily behaviour of a user. The movement/state pattern can be said to express a state of a user at a certain moment (a short period of time). Thus, even if the records of the movement/state patterns are accumulated and the pieces of information corresponding to one day are lined up, it is difficult to look back on a day's events without resorting to one's memory. For example, even when referring to pieces of information such as "walking" for 10 minutes, "staying still" for 30 seconds, "running" for 3 minutes, "staying still" for 10 seconds, "turning right," "riding on a train" for 15 minutes, "walking" for 10 minutes, "turning right," ..., it is extremely difficult to know what one has done at which place. For this reason, means for detecting a more specific daily behaviour (HC behaviour) is wanted.

<1-3: Function of Geo-Categorisation Unit 110>

Next, a function of the geo-categorisation unit 110 will be described in detail with reference to FIGS. 16 to 19. FIGS. 16 to 19 are explanatory diagrams for describing a function of the geo-categorisation unit 110.

Figure 16:
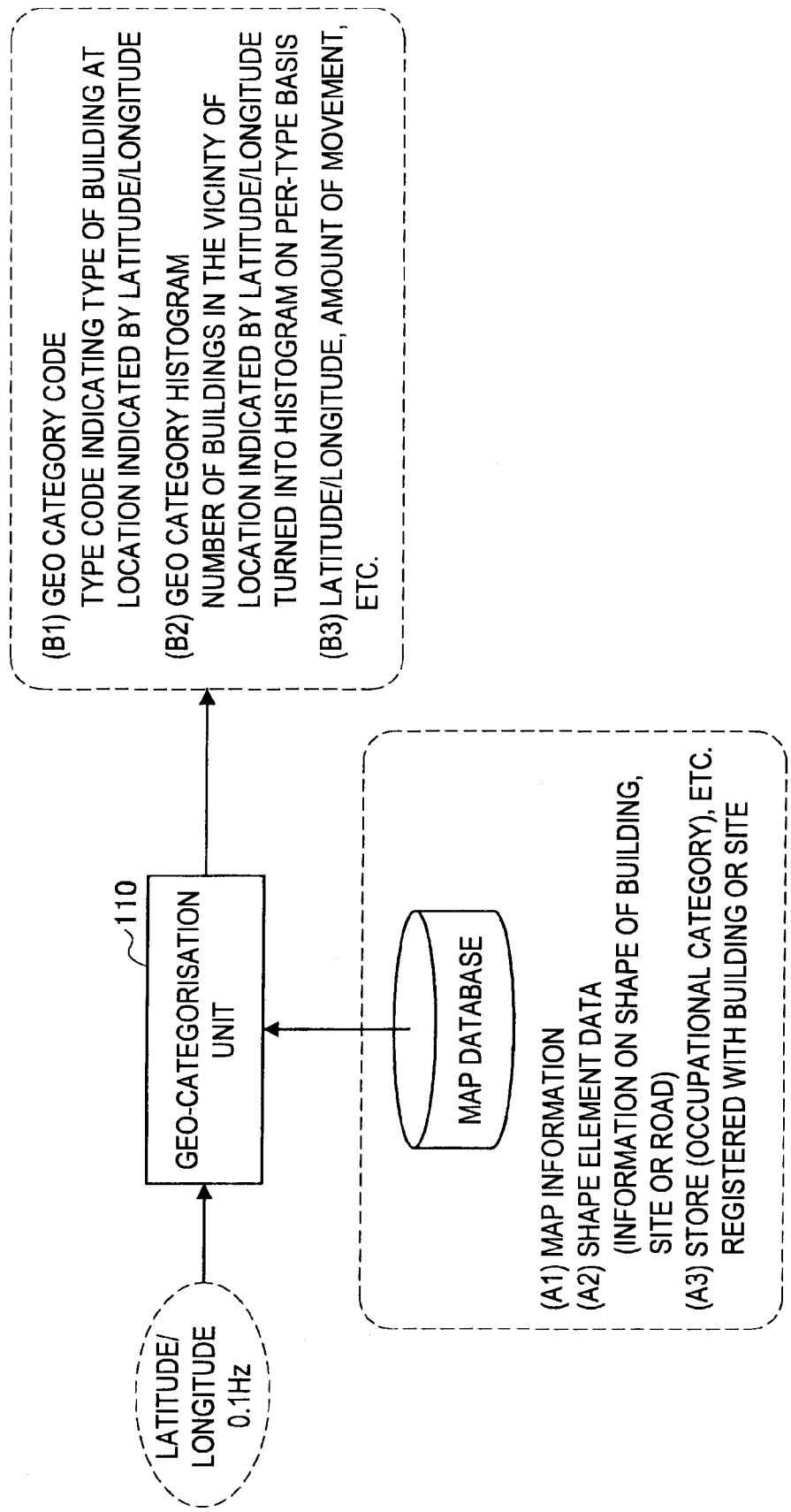
FIG. 16 is an explanatory diagram for explaining a function of a geo-categorisation unit according to the embodiment.

First, reference will be made to FIG. 16. As described above, the geo-categorisation unit 110 selects a geo category code (or information based thereon) corresponding to location information on the current location input from the location sensor 104. At this time, the geo-categorisation unit 110 acquires map information MP and geo category information GC from a map database, and detects an attribute of a building or the like at the current location. The map database is registered with information such as (A1) map information, (A2) shape element data (information on the shape of a building, a site or a road), and (A3) information on a store (an occupational category) or the like registered with the building or the site. The (A1) and (A2) correspond to the map information MP, and (A3) corresponds to the geo category information GC. Additionally, the map database does not have to be included in the behaviour/situation analysis system 10, and a map database published on a Web may be alternatively used, for example.

As shown in FIG. 17, in the geo category information GC, buildings or the like are classified into categories according to specific category types, and each category is assigned with a category code (a geo category code). Also, as shown in FIG. 17, the geo category may be classified into a major category, a middle category and a minor category (not shown). Furthermore, in the example of FIG. 17, the category codes shown in the major category column and the middle category column indicate the geo category codes. For example, in a case a batting centre is detected at the current location by the map information MP, the geo-categorisation unit 110 outputs a geo category code 1305000.

Figure 18:
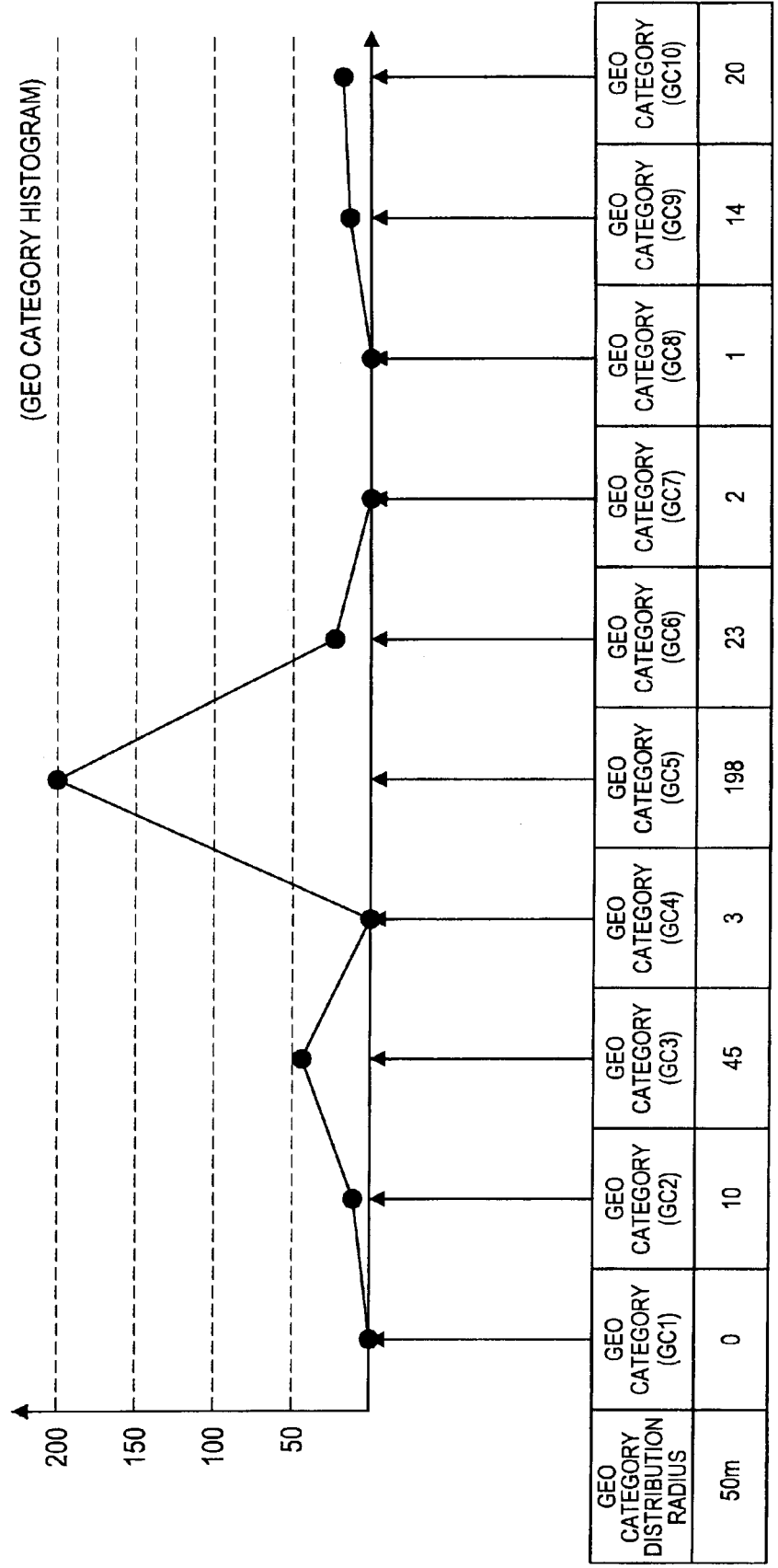
FIG. 18 is an explanatory diagram for explaining a function of the geo-categorisation unit according to the embodiment.

Furthermore, the geo-categorisation unit 110 detects geo category codes of buildings or the like existing in the vicinity of the current location, and creates a histogram. However, in a case the surrounding environment of the current location is not to be taken into consideration in the behaviour/situation pattern detection process, the creation of the histogram can be omitted. In a case the surrounding environment of the current location is to be taken into consideration, the geo-categorisation unit 110 acquires a geo category code group of the buildings or the like existing in the vicinity of the current location by using the map information MP and the geo category information GC. Then, the geo-categorisation unit 110 tallies the number of buildings or the like for each geo category, and creates a histogram of geo categories (hereinafter, geo category histogram) as shown in FIG. 18.

As shown in FIG. 19, the geo category code expresses the environment of the current location in a pinpoint manner, and the geo category histogram expresses the surrounding environment of the current location. For example, in a case the geo category code indicates a train station, the behaviour of a user at the time point of acquisition of the location information on the current location is narrowed down to behaviour that can be performed within a station. On the other hand, in a case the geo category code indicates a public road, it is difficult to narrow down the behaviour of the user based on the geo category code. However, if it is seen from the geo category histogram that the user is in a region where there are many retail stores, the behaviour of the user can be more narrowed down even if the geo category code indicates the same public road.

For this reason, by using the geo category histogram together with the geo category code, the accuracy of behaviour/situation pattern detection described later can be improved. Accordingly, the geo-categorisation unit 110 calculates the geo category histogram (B2) together with the geo category code (B1), and inputs the same to the behaviour/situation recognition unit 112. Furthermore, the geo-categorisation unit 110 also inputs information (B3) on the latitude and longitude indicating the current location, the amount of movement or the like to the behaviour/situation recognition unit 112.

Heretofore, the function of the geo-categorisation unit 110 has been described. Additionally, the location information on the current location may indicate a representative point obtained by clustering multiple pieces of location information.

<1-4: Function of Behaviour/Situation Recognition Unit 112>

Next, a function of the behaviour/situation recognition unit 112 will be described in detail with reference to FIGS. 20 to 30B. FIGS. 20 to 30B are explanatory diagrams for explaining a function of the behaviour/situation recognition unit 112.

(Overview)

First, reference will be made to FIG. 20. As described above, the time/calendar information, the movement/state pattern and the geo category code are input to the behaviour/situation recognition unit 112. Furthermore, information on the movement/state feature quantity used for detection of the movement/state pattern, the sensor data, the geo category histogram obtained from the geo category codes, the amount of movement, the latitude and longitude, movement speed, or the like, is input to the behaviour/situation recognition unit 112. Also, personal profile information or a feedback from a user may be input to the behaviour/situation recognition unit 112. When these pieces of information are input, the behaviour/situation recognition unit 112 detects a behaviour/situation pattern that matches the combination of the input pieces of information. At this time, the behaviour/situation recognition unit 112 detects the behaviour/situation pattern based on the rule-based determination or the learning model determination.

(Rule-Based Determination; Geo Category Code)

First, a behaviour/situation pattern detection method based on the rule-based determination will be described. Additionally, a determination method based on the geo category code will be described here. As described above, the score map SM is used for the rule-based determination. Here, a score map SM as shown in FIG. 21 is assumed.

In the example of FIG. 21, a score is assigned to a combination of a middle-category geo category code and a behaviour/situation pattern. In the example of FIG. 21, the behaviour/situation patterns to be taken into consideration are "sport," "walk," "recreation," "shopping," . . . , "work," "viewing," and "sleeping." However, the types of behaviour/situation patterns are not limited to the above, and various behaviour/situation patterns as shown in FIG. 26 can be taken into consideration, for example. The behaviour/situation patterns to be taken into consideration may be selected in advance by the user, or those appropriate for the user may be automatically selected by a determination model created by using a machine learning algorithm.

Figure 22:
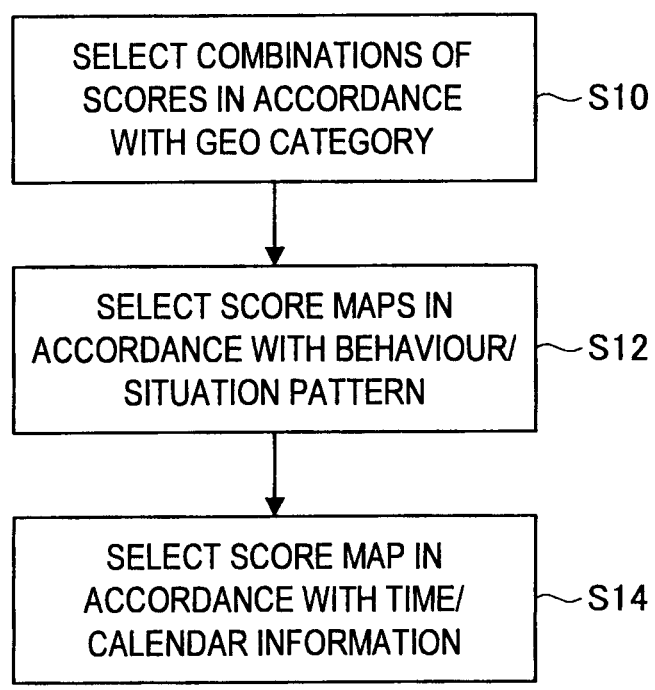
FIG. 22 is an explanatory diagram for explaining a function of the behaviour/situation recognition unit according to the embodiment.

Furthermore, the score map SM as shown in FIG. 21 is provided for each combination of a type of the time/calendar information and a type of the movement/state pattern. Therefore, there are multiple score maps SM. As shown in FIG. 22, first, the behaviour/situation recognition unit 112 selects, from the multiple score maps SM, combinations of scores each corresponding to the input geo category code (S10). In a case a geo category code 1905000 is input to the behaviour/situation recognition unit 112 in the example of FIG. 21, a group of scores "meal=1, study=2, work=4" is selected for each type of the score maps SM. That is, multiple combinations of score groups are selected.

Next, the behaviour/situation recognition unit 112 selects types of score maps SM corresponding to the input movement/state pattern (S12). At this time, the behaviour/situation recognition unit 112 extracts score groups corresponding to the selected types of the score maps SM. Then, the behaviour/situation recognition unit 112 selects, from the types of the score maps SM selected in step S12, a type of the score map SM corresponding to the input time/calendar information (S14). At this time, the behaviour/situation recognition unit 112 extracts a score group corresponding to the selected type of the score map SM. As a result, a score group corresponding to the movement/state pattern, the time/calendar information and the geo category code that have been input is extracted.

Figure 23:
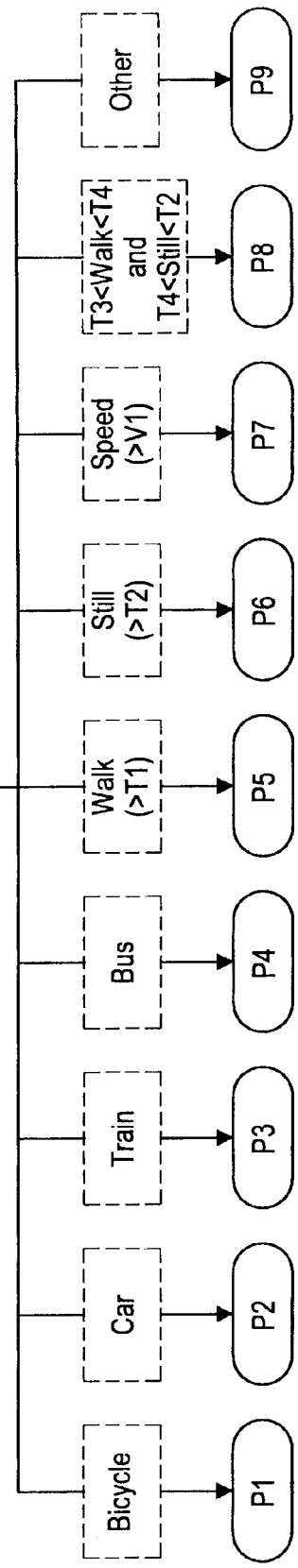
FIG. 23 is an explanatory diagram for explaining a function of the behaviour/situation recognition unit according to the embodiment.

In the process of step S12 described above, score maps SM corresponding to a movement/state pattern is selected. This selection process is realised by the operation described in FIG. 23. As illustrated in FIG. 23, score map groups P1 to P9 each formed from multiple score maps SM are associated with each movement/state pattern. Accordingly, the behaviour/situation recognition unit 112 distinguishes an input movement/state pattern (and movement speed/the amount of movement) based on a specific determination condition, and selects a score map group corresponding to the determination result. For example, in a case the movement/state pattern is "walking continued for more than a time T1," a score map group P5 is selected.

As described above, when a score group corresponding to the combination of the movement/state pattern, the time/calendar information and the geo category code that have been input is extracted, the behaviour/situation recognition unit 112 detects the highest score among the extracted score group. Then, the behaviour/situation recognition unit 112 specifies a behaviour/situation pattern corresponding to the highest score, and outputs the specified behaviour/situation pattern. The behaviour/situation pattern output by the behaviour/situation recognition unit 112 is used for the provision of the recommended service SV or is used by the application AP.

Moreover, the behaviour/situation recognition unit 112 may be configured to use not only the score group corresponding to the current input, but also a score group corresponding to past input, and to specify the behaviour/situation pattern by using HMM or the like.

Heretofore, the behaviour/situation pattern detection method based on the rule-based determination that uses the geo category code has been described.

(Rule-Based Determination; Geo Category Histogram)

Figure 24:
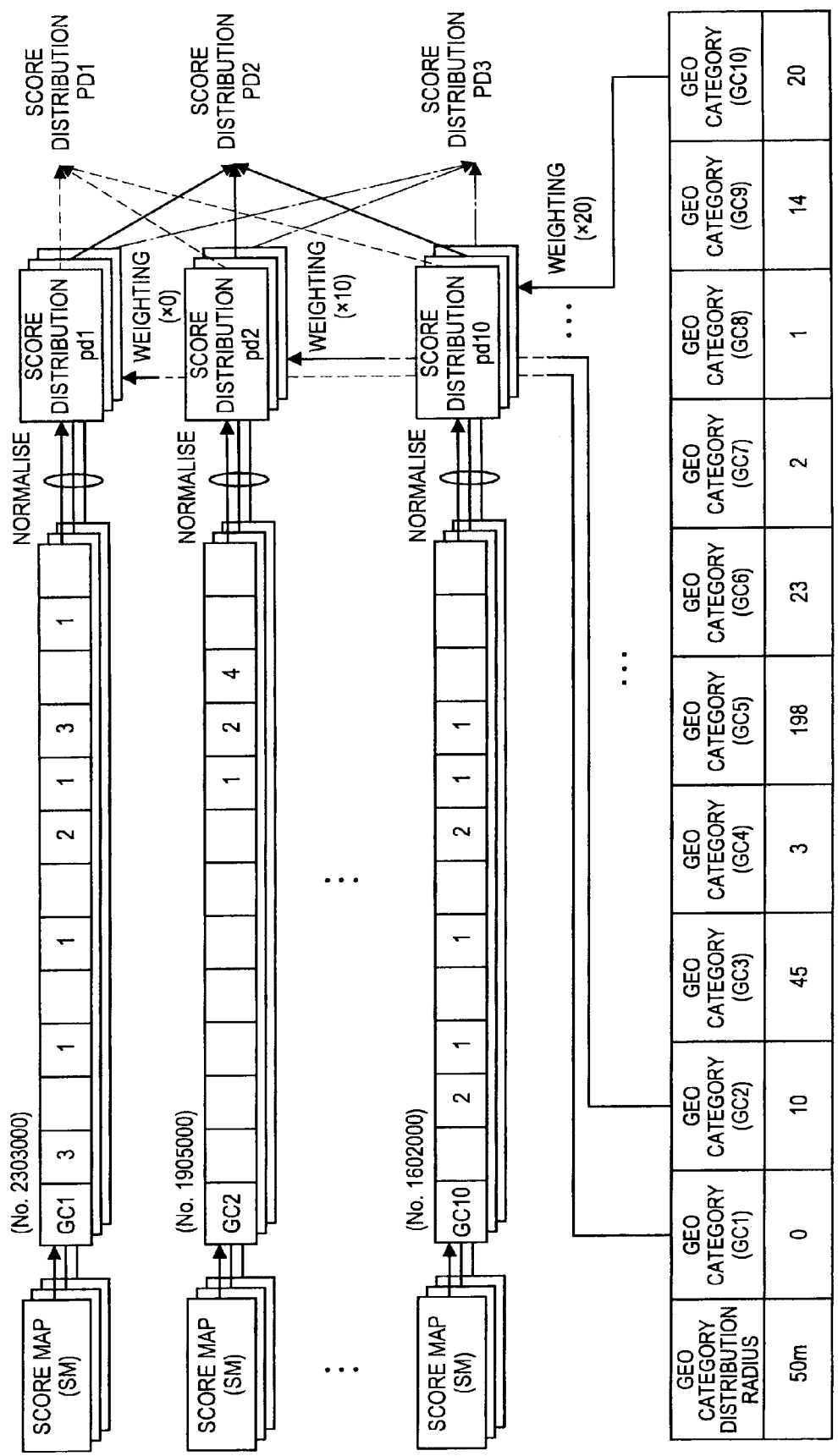
FIG. 24 is an explanatory diagram for explaining a function of the behaviour/situation recognition unit according to the embodiment.

Next, a behaviour/situation pattern detection method based on the rule-based determination that uses the geo category histogram will be described with reference to FIG. 24. In a case of using the geo category histogram, the geo category codes of buildings or the like existing in the vicinity of the current location and the histogram of the geo categories are input to the behaviour/situation recognition unit 112. Here, it is assumed that ten geo categories (GC1, . . . , GC10) are detected in the vicinity of the current location.

When the geo category codes are input, the behaviour/situation recognition unit 112 extracts a score group corresponding to each category code from each score map SM. In the example of FIG. 24, geo category codes 2303000, 1905000, . . . , 1602000 corresponding to the geo categories GC1, GC2, . . . , GC10 are input, and respective corresponding score groups are extracted. When the score groups are extracted, the behaviour/situation recognition unit 112 calculates score distributions pd1, pd2, . . . , pd10 by normalising each of the score groups. This normalisation is performed by using the highest score included in each score group.

Next, the behaviour/situation recognition unit 112 performs multiplication by values of the input geo category histogram on the calculated score distributions pd1, pd2, . . . , pd10. For example, multiplication is performed on the score distribution pd1 by a histogram value 0 of the geo category GC1. Also, multiplication is performed on the score distribution pd2 by a histogram value 10 of the geo category GC2. Similarly, multiplication is performed on the score distributions pd3, . . . , pd10 respectively by histogram values 45, . . . , 20 of the geo categories GC3, . . . , GC10. Next, the behaviour/situation recognition unit 112 totals the score distributions pd1, . . . , pd10 that have been weighted by the histogram values as above for each type of the score maps SM, and calculates score distributions PD1, . . . , PDn for each score map SM. Here, the n indicates the number of combinations of the time/calendar information and the movement/state pattern.

Next, the behaviour/situation recognition unit 112 specifies the type of the score map SM corresponding to the combination of the time/calendar information and the movement/state pattern that has been input (for example, the k-th score map SM), and selects a score distribution PDk corresponding to the specified type. Then, the behaviour/situation recognition unit 112 detects the highest score among the selected score distribution PDk, and outputs a behaviour/situation pattern corresponding to the highest score detected. According to such configuration, detection of a behaviour/situation pattern that takes into consideration the surrounding environment of the current location can be performed. Additionally, a method of selecting a geo category code whose histogram value is the largest and detecting a behaviour/situation pattern by using the selected geo category code can also be conceived. In the case of this method, a behaviour/situation pattern corresponding to "meal" is detected with high probability in an area where there are many restaurants.

Additionally, in the above example, a method of detecting the highest score has been shown, but however, in a case of selecting multiple candidates for the behaviour/situation pattern, for example, instead of the highest score, the behaviour/situation patterns to be the candidates may be detected in order from the highest score. In this case, appropriate behaviour/situation patterns are narrowed down from the detected candidates for the behaviour/situation pattern based on the user's profile information, history of past behaviour/situation pattern detection or the like. This configuration is an example, and such modified example is, of course, included in the technical scope of the present embodiment.

Heretofore, the behaviour/situation pattern detection method based on the rule-based determination that uses the geo category histogram has been described. Additionally, the method that uses the geo category code and the method that uses the geo category histogram may also be used in parallel. By using these in parallel, an appropriate behaviour/situation pattern that takes into consideration the environment of the place the user is at and the surrounding environment (atmosphere) of the place can be detected in a pinpoint manner.

(Learning Model Determination; Geo Category Code)

Next, a behaviour/situation pattern detection method based on the learning model determination will be described with reference to FIG. 25. As described above, according to the learning model determination, a determination model is created by using a machine learning algorithm, and a behaviour/situation pattern is detected by using the created determination model. As the machine learning algorithm, linear regression, nonlinear regression, SVM, Boosting and the like are used. Furthermore, a feature quantity selection process by a genetic search method may be combined with the machine learning algorithm.

Furthermore, a feature vector given as teacher data at the time of creating a determination model includes, for example, the time/calendar information (e.g., date, time, day of the week, or holiday/non-holiday), the movement/state pattern, the movement/state feature quantity, the sensor data (the acceleration data, the gyro data, or the like), the geo category code, the geo category histogram (the number per code), the latitude and longitude, and the like. Furthermore, as the feature vector, any detection data relating to the behaviour of a user and its processed data can be used. Additionally, a response variable given as the teacher data is correct data indicating the correct behaviour/situation pattern. Moreover, by using, as the teacher data, data selectively picked from data of a group of people that may take similar behaviours, for example, "students," "members of society," "males," and "females," a determination model that is optimised for each group can be created.

The mechanism of machine learning is broadly to prepare a large number of feature vectors for which the correct data is known, to apply the feature vectors to pairs of functions selected from a specific function group, and to extract a pair of functions from which the same feature quantity (answer data) can be obtained when multiple feature vectors corresponding to the same correct data are applied to the pair of functions. The specific function group includes any function (algorithm) such as differential operation output, maximum value output, low-pass filtering, unbiased variance output, and Fourier transform output. That is, an algorithm (determination model) capable of combining these functions and outputting correct data with high accuracy is automatically created.

The determination model created in this manner is expected to output a correct or almost correct behaviour/situation pattern for a feature vector of the same format that is arbitrarily input. Thus, the behaviour/situation recognition unit 112 inputs, to the created determination model, a feature vector formed from sensor data or the like actually observed, and detects a behaviour/situation pattern. If sufficient learning has been performed, a behaviour/situation pattern can be detected by this method with high accuracy. However, the process of creating a determination model by a machine learning algorithm is a process for which the amount of computation is extremely large. Therefore, as has been described with reference to FIGS. 2 to 6, a system configuration has to be modified in a case of using the learning model determination. Furthermore, a method of using the rule-based determination and the learning model determination in combination can also be conceived.

Heretofore, the behaviour/situation pattern detection method that uses the learning model determination has been described. As described above, when using the learning model determination, a behaviour/situation pattern can be detected with high accuracy if sufficient learning has been performed. Also, by rebuilding the determination model by taking a feedback from a user into consideration, a determination model capable of detecting a behaviour/situation pattern with further improved accuracy can be created. Accordingly, using the learning model determination is beneficial for improving the accuracy of behaviour/situation pattern detection.

(Operational Flow)

Next, an operational flow of the behaviour/situation recognition unit 112 relating to the behaviour/situation pattern detection method will be described with reference to FIGS. 27 to 30B. Note that FIG. 27 is an explanatory diagram showing an overall operational flow of the behaviour/situation analysis system 10.

(Overall System)

First, an overall operational flow of the behaviour/situation analysis system 10 relating to the behaviour/situation pattern detection method will be described with reference to FIG. 27.

Figure 27:
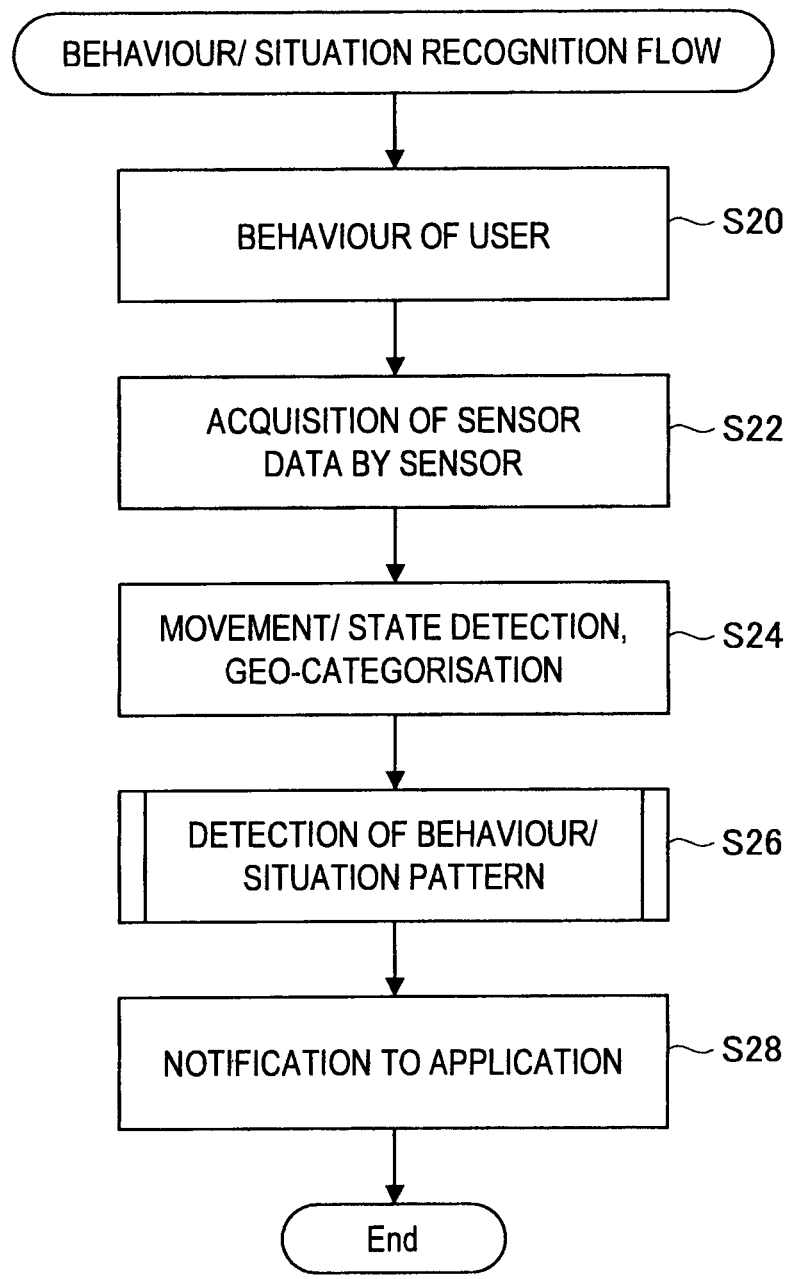
FIG. 27 is an explanatory diagram for explaining a function of the behaviour/situation recognition unit according to the embodiment.

As shown in FIG. 27, when a user performs some behaviour (S20), sensor data is acquired by the motion sensor 102 (S22). Also, the location information on the current location is acquired by the location sensor 104. Then, the sensor data is input to the movement/state recognition unit 108, and the location information on the current location is input to the geo-categorisation unit 110. Next, a movement/state pattern is detected by the movement/state recognition unit 108, and a geo category code (histogram) is extracted by the geo-categorisation unit 110 (S24). Then, information on the movement/state pattern, the geo category code (histogram) and the like are input to the behaviour/situation recognition unit 112.

When the information on the movement/state pattern, the geo category code (histogram) and the like are input, the behaviour/situation recognition unit 112 detects a behaviour/situation pattern by using these pieces of information (S26). Additionally, the process of step S26 will be described later in detail. When a behaviour/situation pattern is detected by the behaviour/situation recognition unit 112, information on the detected behaviour/situation pattern is input to an application or the like (S28). Then, a recommended service SV is provided by using the behaviour/situation pattern, or a function corresponding to the behaviour/situation pattern is provided to the user by the application. In the following, the process flow of step S26 will be described in detail.

(A: Rule-Based Determination)

Here, an operational flow of the behaviour/situation recognition unit 112 relating to the behaviour/situation pattern detection method based on the rule-based determination will be described with reference to FIG. 28.

Figure 28:
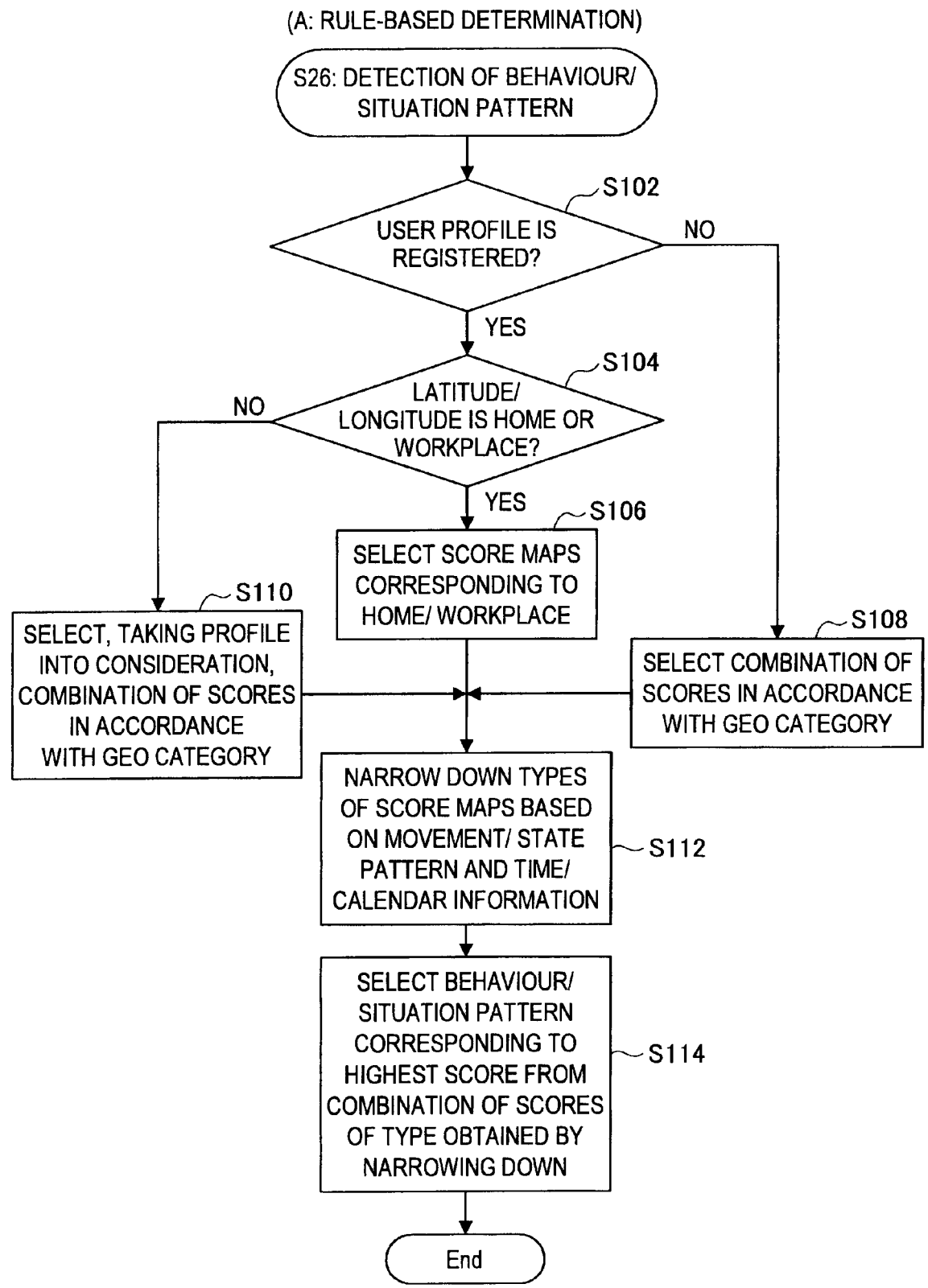
FIG. 28 is an explanatory diagram for explaining a function of the behaviour/situation recognition unit according to the embodiment.

As shown in FIG. 28, first, the behaviour/situation recognition unit 112 determines whether a user profile is registered or not (S102). In a case a user profile is registered, the behaviour/situation recognition unit 112 proceeds to the process of step S104. On the other hand, in a case a user profile is not registered, the behaviour/situation recognition unit 112 proceeds to the process of step S108.

In a case it proceeded to the process of step S104, the behaviour/situation recognition unit 112 determines whether or not the latitude and longitude of the current location that is input is home or workplace (S104). For example, the behaviour/situation recognition unit 112 refers to the user profile that is registered, and determines whether or not the latitude and longitude of the current location match the latitude and longitude of home or workplace described in the user profile. In a case neither home nor workplace exists at the location of the latitude and longitude, the behaviour/situation recognition unit 112 proceeds to the process of step S110. On the other hand, in a case home or workplace exists at the location of the latitude and longitude, the behaviour/situation recognition unit 112 proceeds to the process of step S106.

In a case it proceeded to the process of step S106, the behaviour/situation recognition unit 112 selects score maps SM (score groups) corresponding to home or workplace (S106), and proceeds to the process of step S112. Furthermore, in a case it proceeded to the process of step S108 by the determination process of step S102, the behaviour/situation recognition unit 112 selects a score group based on a geo category code (histogram) that is input (S108), and proceeds to the process of step S112.

Also, in a case it proceeded to the process of step S110 by the determination process of step S104, the behaviour/situation recognition unit 112 selects a score group based on the geo category code (histogram). Furthermore, the behaviour/situation recognition unit 112 performs weighting for the selected score group based on the user profile (S110), and proceeds to the process of step S112. For example, in a case it is described in the user profile that the user likes baseball, the behaviour/situation recognition unit 112 performs weighting in such a way that the score of a behaviour/situation pattern="baseball" becomes high.

In a case it proceeded to the process of step S112, the behaviour/situation recognition unit 112 narrows down the types of the score maps SM based on the movement/state pattern and the time/calendar information (S112). Next, the behaviour/situation recognition unit 112 detects the highest score from a score group corresponding to the type which has been narrowed down by the process of step S112, and selects a behaviour/situation pattern corresponding to the highest score which has been detected (S114). Then, the selected behaviour/situation pattern is input to an application or the like, and the series of operations relating to the detection of a behaviour/situation pattern is ended. Additionally, in a case of using the geo category histogram, a score distribution is calculated in step S114, and a behaviour/situation pattern corresponding to the highest probability is selected.

Heretofore, the behaviour/situation pattern detection method based on the rule-based determination has been described. Moreover, a method of selecting a behaviour/situation pattern corresponding to the highest score is used in the example of FIG. 28, but the behaviour/situation recognition unit 112 may be configured to use not only the score group corresponding to the current input, but also a score group corresponding to past input, and to select the behaviour/situation pattern by using HMM or the like.

(B: Learning Model Determination)

Next, an operational flow of the behaviour/situation recognition unit 112 relating to the behaviour/situation pattern detection method based on the learning model determination will be described with reference to FIG. 29.

Figure 29:
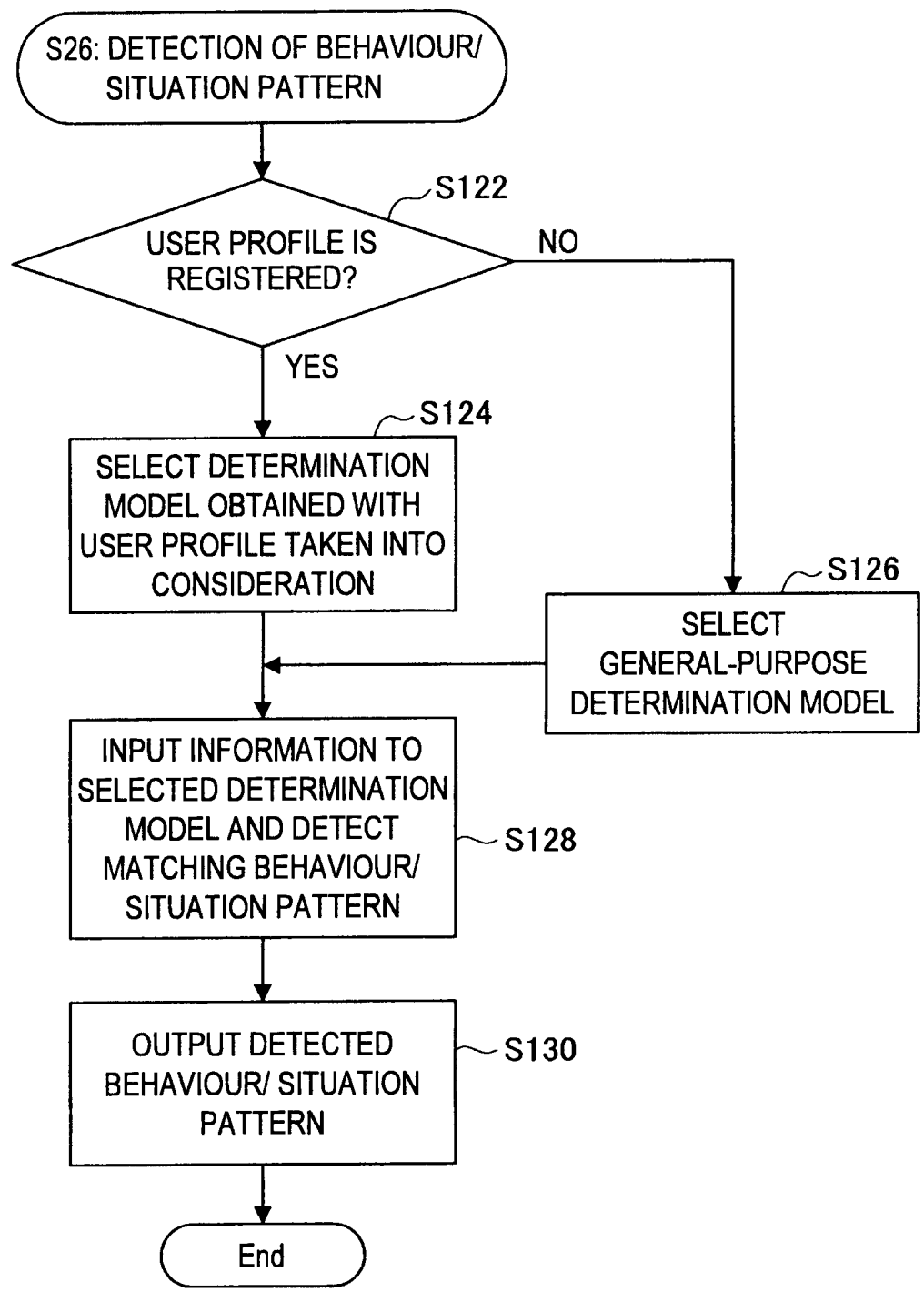
FIG. 29 is an explanatory diagram for explaining a function of the behaviour/situation recognition unit according to the embodiment.

As shown in FIG. 29, first, the behaviour/situation recognition unit 112 determines whether a user profile is registered or not (S122). In a case a user profile is registered, the behaviour/situation recognition unit 112 proceeds to the process of step S124. On the other hand, in a case a user profile is not registered, the behaviour/situation recognition unit 112 proceeds to the process of step S126.

In a case it proceeded to the process of step S124, the behaviour/situation recognition unit 112 selects a determination model created by a machine learning algorithm with the user profile taken into consideration (S124), and proceeds to the process of step S128. On the other hand, in a case it proceeded to the process of step S126, the behaviour/situation recognition unit 112 selects a general-purpose determination model created by a machine learning algorithm without the user profile taken into consideration (S126), and proceeds to the process of step S128.

In a case it proceeded to the process of step S128, the behaviour/situation recognition unit 112 inputs, to the determination model selected in step S124 or step S126, information (a feature vector) which has been input, and detects a behaviour/situation pattern matching the input feature vector (S128). Next, the behaviour/situation recognition unit 112 outputs the behaviour/situation pattern detected by the process of step S128 (S130). Then, the behaviour/situation pattern that is output is input to an application or the like, and the series of operations relating to the detection of a behaviour/situation pattern is ended.

Heretofore, the behaviour/situation pattern detection method based on the learning model determination has been described.

(Combined Usage)

Next, an operational flow of the behaviour/situation recognition unit 112 relating to the behaviour/situation pattern detection method that uses the rule-based determination and the learning model determination in combination will be described with reference to FIGS. 30A and 30B.

Figure 30A:
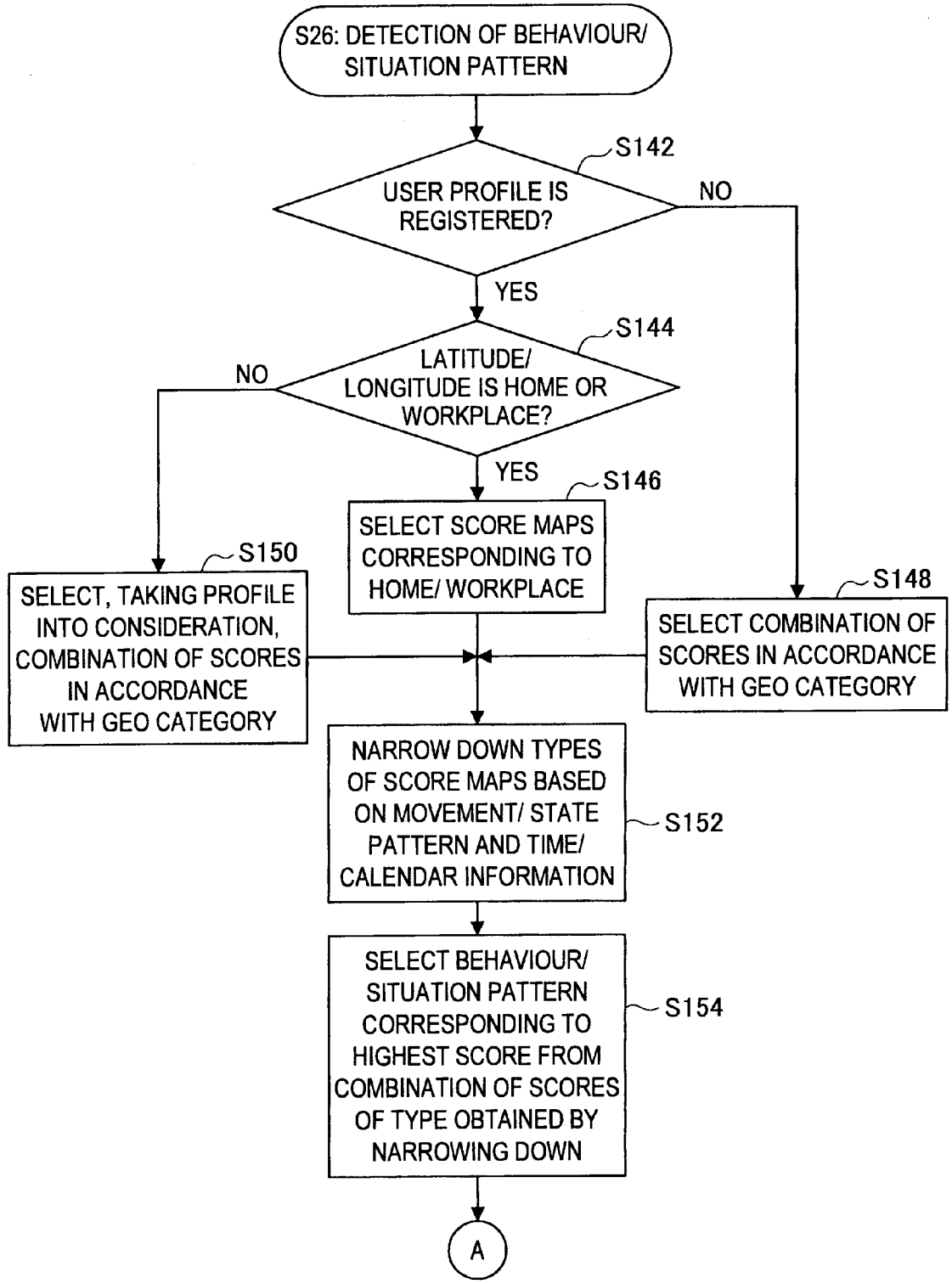
FIG. 30A is an explanatory diagram for explaining a function of the behaviour/situation recognition unit according to the embodiment.

As shown in FIG. 30A, first, the behaviour/situation recognition unit 112 determines whether a user profile is registered or not (S142). In a case a user profile is registered, the behaviour/situation recognition unit 112 proceeds to the process of step S144. On the other hand, in a case a user profile is not registered, the behaviour/situation recognition unit 112 proceeds to the process of step S148.

In a case it proceeded to the process of step S144, the behaviour/situation recognition unit 112 determines whether or not the latitude and longitude of the current location that is input is home or workplace (S144). For example, the behaviour/situation recognition unit 112 refers to the user profile that is registered, and determines whether or not the latitude and longitude of the current location match the latitude and longitude of home or workplace described in the user profile. In a case neither home nor workplace exists at the location of the latitude and longitude, the behaviour/situation recognition unit 112 proceeds to the process of step S150. On the other hand, in a case home or workplace exists at the location of the latitude and longitude, the behaviour/situation recognition unit 112 proceeds to the process of step S146.

In a case it proceeded to the process of step S146, the behaviour/situation recognition unit 112 selects score maps SM (score groups) corresponding to home or workplace (S146), and proceeds to the process of step S152. Furthermore, in a case it proceeded to the process of step S148 by the determination process of step S142, the behaviour/situation recognition unit 112 selects a score group based on a geo category code (histogram) that is input (S148), and proceeds to the process of step S152.

Also, in a case it proceeded to the process of step S150 by the determination process of step S144, the behaviour/situation recognition unit 112 selects a score group based on the geo category code (histogram). Furthermore, the behaviour/situation recognition unit 112 performs weighting for the selected score group based on the user profile (S150), and proceeds to the process of step S152. For example, in a case it is described in the user profile that the user likes hot springs, the behaviour/situation recognition unit 112 performs weighting in such a way that the score of a behaviour/situation pattern="hot spring" becomes high.

In a case it proceeded to the process of step S152, the behaviour/situation recognition unit 112 narrows down the types of the score maps SM based on the movement/state pattern and the time/calendar information (S152). Next, the behaviour/situation recognition unit 112 detects the highest score from a score group corresponding to the type which has been narrowed down by the process of step S152, and selects a behaviour/situation pattern corresponding to the highest score which has been detected (S154). Additionally, in a case of using the geo category histogram, a score distribution is calculated in step S154, and a behaviour/situation pattern corresponding to the highest probability is selected.

Figure 30B:
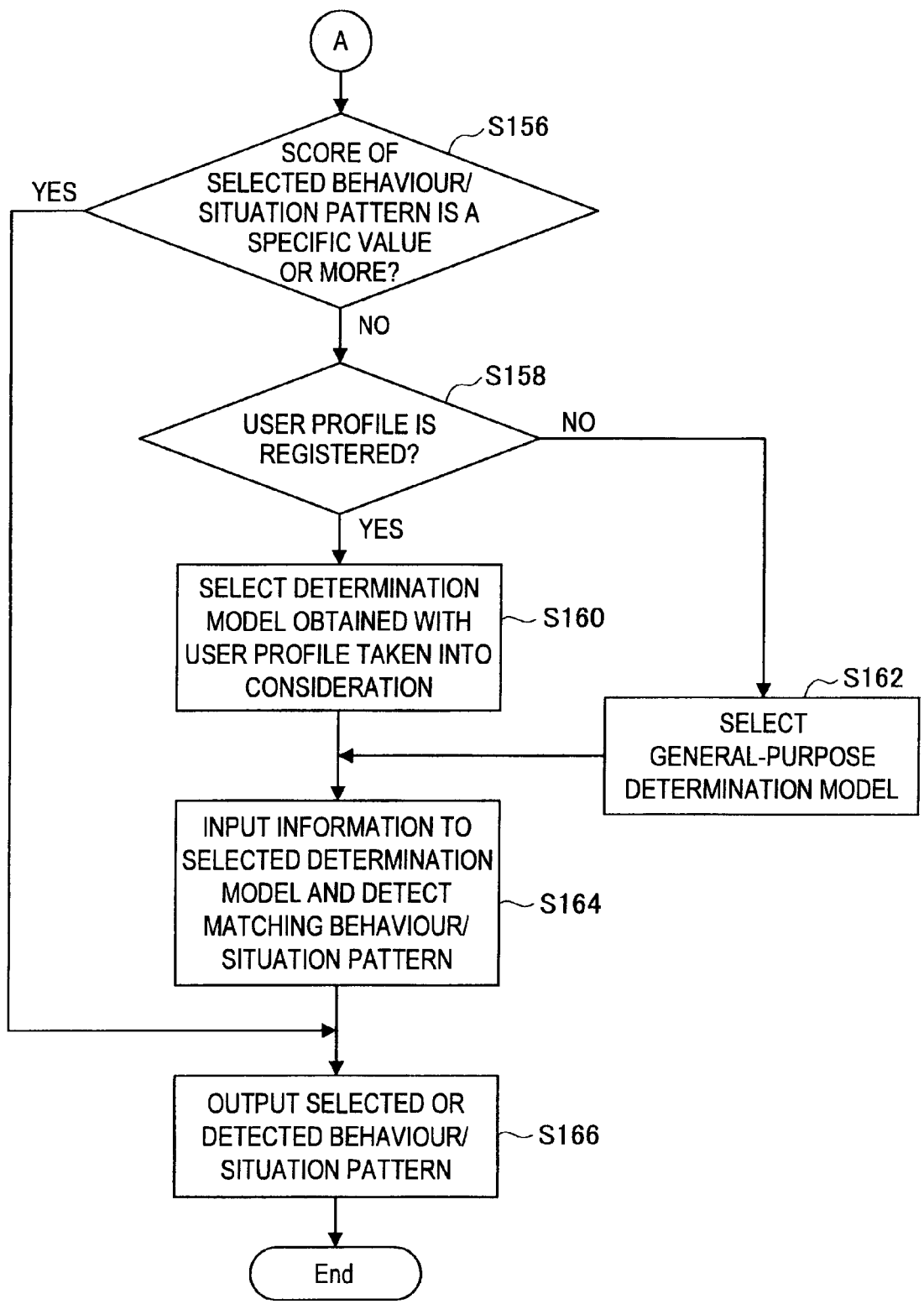
FIG. 30B is an explanatory diagram for explaining a function of the behaviour/situation recognition unit according to the embodiment.

Next, the behaviour/situation recognition unit 112 proceeds to step S156 shown in FIG. 30B, and determines whether or not the highest score detected in step S154 is a specific value or more (S156). In a case the highest score is a specific value or more, the behaviour/situation recognition unit 112 proceeds to the process of step S166. On the other hand, in a case it is not a specific value or more, the behaviour/situation recognition unit 112 proceeds to the process of step S158.

In a case it proceeded to the process of step S158, the behaviour/situation recognition unit 112 determines whether a user profile is registered or not (S158). In a case a user profile is registered, the behaviour/situation recognition unit 112 proceeds to the process of step S160. On the other hand, in a case a user profile is not registered, the behaviour/situation recognition unit 112 proceeds to the process of step S162.

In a case it proceeded to the process of step S160, the behaviour/situation recognition unit 112 selects a determination model created by a machine learning algorithm with the user profile taken into consideration (S160), and proceeds to the process of step S164. On the other hand, in a case it proceeded to the process of step S162, the behaviour/situation recognition unit 112 selects a general-purpose determination model created by a machine learning algorithm without the user profile taken into consideration (S162), and proceeds to the process of step S164.

In a case it proceeded to the process of step S164, the behaviour/situation recognition unit 112 inputs, to the determination model selected in step S160 or step S162, information (a feature vector) which has been input, and detects a behaviour/situation pattern matching the input feature vector (S164). Next, the behaviour/situation recognition unit 112 outputs the behaviour/situation pattern detected by the process of step S164 or the behaviour/situation pattern selected in step S154 in FIG. 30A (S166). Then, the behaviour/situation pattern that is output is input to an application or the like, and the series of operations relating to the detection of a behaviour/situation pattern is ended.

Heretofore, an operational flow of the behaviour/situation recognition unit 112 relating to the behaviour/situation pattern detection method that uses the rule-based determination and the learning model determination in combination has been described. Additionally, a behaviour/situation pattern corresponding to the highest score is selected by the process of step S154 in the example of FIG. 30A, but other method can also be used as the method of selecting a behaviour/situation pattern. For example, a method can be used that uses a score group corresponding to past input in addition to the score group corresponding to the current input, and that selects the behaviour/situation pattern by using HMM or the like.

As has been described, by using the behaviour/situation pattern detection method according to the present embodiment, it becomes possible to detect a behaviour/situation pattern relating to a user's daily behaviour (HC behaviour) as illustrated in FIG. 26. As a result, it becomes possible to use a user's daily behaviour which is hard to predict from a behaviour history expressed by an accumulation of LC behaviours.

<2: Second Embodiment>

Next, the second embodiment of the present invention will be described. The present embodiment relates to a method of using a behaviour/situation pattern obtained by the behaviour/situation pattern detection method described in the first embodiment described above. Particularly, the technology of the present embodiment relates to a method of correlating schedule information registered by a user and a behaviour/situation pattern that is detected with each other, and providing the user with appropriate information in accordance with the situation.

<2-1: Overview of System>

Figure 31:
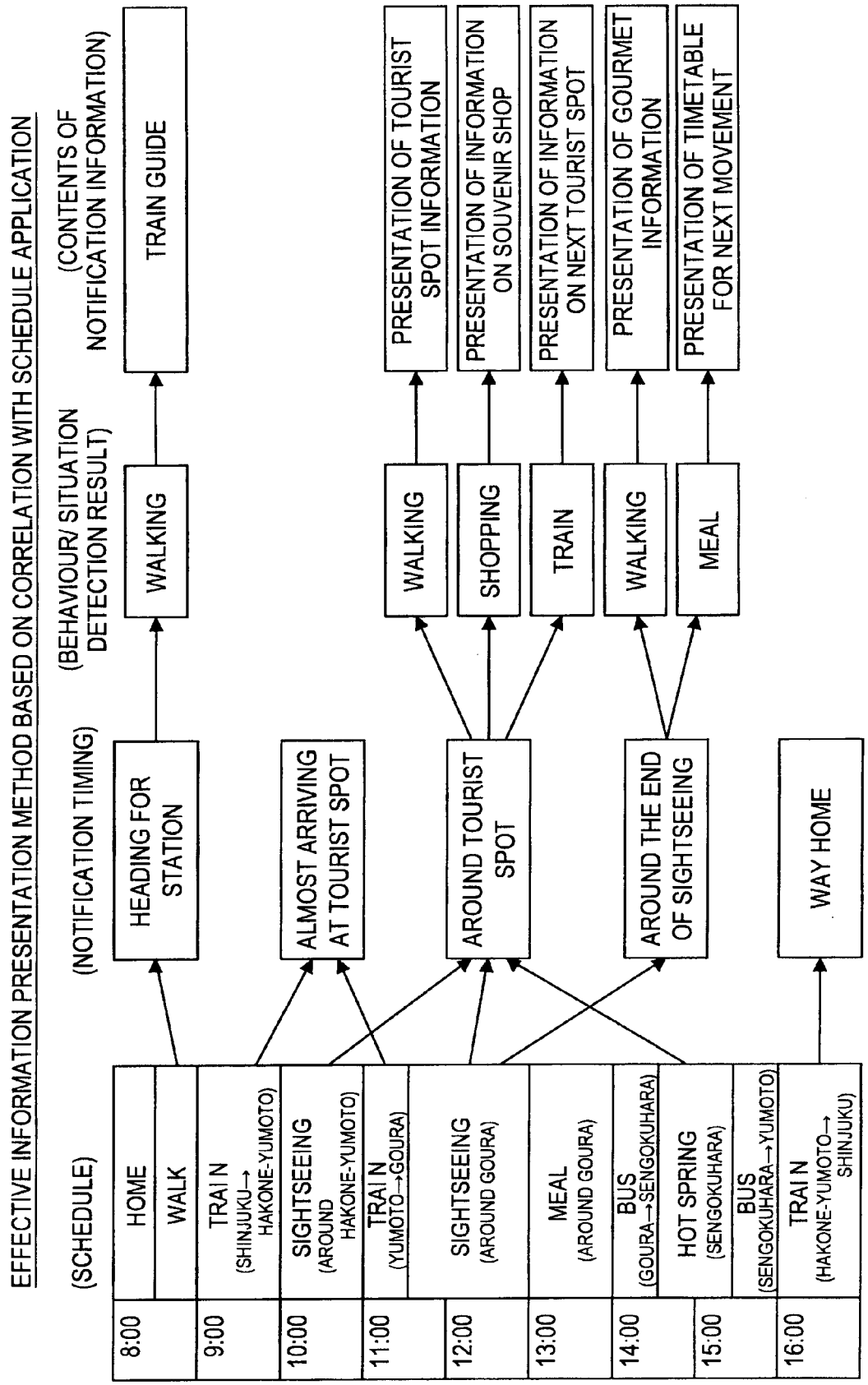
FIG. 31 is an explanatory diagram showing an overview of a function of a behaviour/situation analysis system according to the second embodiment of the present invention.
Figure 32:
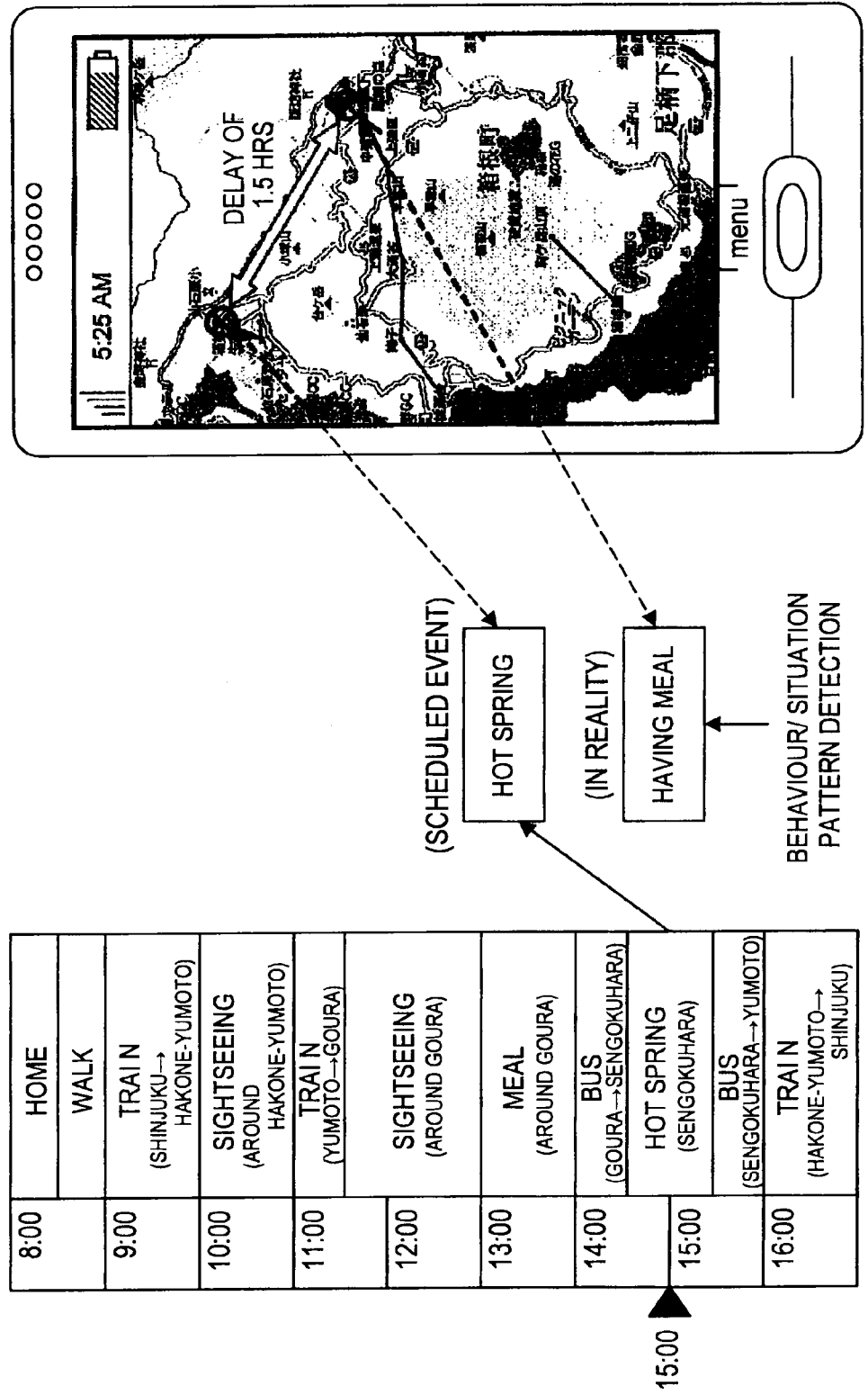
FIG. 32 is an explanatory diagram showing an overview of a function of the behaviour/situation analysis system according to the embodiment.

First, an overview of a function realised by a behaviour/situation analysis system 20 according to the present embodiment will be described with reference to FIGS. 31 and 32. FIGS. 31 and 32 are explanatory diagrams showing an effective method of presenting information based on correlation with a schedule application.

First, reference will be made to FIG. 31. In the example of FIG. 31, schedule information indicating a timetable of a trip is registered in a schedule application, and the contents of notification information is decided by combining the registered information and a result of behaviour/situation detection. For example, consideration will be given to information to be notified at the time point of a user walking to the station in the morning. Additionally, "walking" is described as the schedule information in the example of FIG. 31, but even without the description, a situation where the user is heading for the station in the morning can be detected from the description of "train" and information on the time. Moreover, the schedule information may be acquired via a network.

First, it can be presumed, from the information "train, 9:00-10:00" registered in the schedule information, that a situation will arise where a user heads for the station before 9:00. However, it is difficult to estimate, from the schedule information, the timing of notification of information that is to be notified at the time of the user heading for the station. However, according to the present embodiment, a behaviour/situation pattern of a user can be detected, and thus a notification timing can be decided by using the detected behaviour/situation pattern. For example, train guide may be notified at a timing of detection of a behaviour/situation pattern "moving (walking)."

Similarly, by using a behaviour/situation pattern, a situation where the user is almost arriving at a tourist spot, a situation where the user is doing sightseeing around the tourist spot, a situation where the sightseeing is almost over, a situation where the user is on the way home, and the like, can be recognised. Furthermore, in a case the user is in the vicinity of the tourist spot, it is possible to distinguish whether the user is doing sightseeing on foot, the user is doing shopping, or the user is moving in a train. Accordingly, a method of information presentation such as presentation of tourist spot information in a case of sightseeing on foot, presentation of information on a souvenir shop in a case of shopping, and presentation of information on the next tourist spot in a case of moving in a train can be realised.

Furthermore, even if the user is behind on schedule or moving ahead of schedule, the behaviour of the user can be grasped from the behaviour/situation pattern, and thus appropriate information can be presented by detecting the delay or acceleration. For example, when a behaviour/situation pattern "meal" is actually detected where a behaviour/situation pattern "hot spring" is supposed to be detected based on the schedule information as shown in FIG. 32, the delay may be notified to the user. Also, delay in the schedule may be presented to the user together with the location information on the current location and the location information described in the schedule information.

As described, by being presented with information in accordance with the situation at an appropriate timing, a user is enabled to change transportation means as appropriate based on the presented information, or to change the schedule. Furthermore, a difference to the schedule information can be detected from the behaviour/situation pattern also in a case of the user moving along a route different from that in the schedule information or the user fitting in an event not registered in the schedule information. Accordingly, it becomes possible to present information (for example, presentation of transportation means) that appropriately links the behaviour of the user estimated based on the detected behaviour/situation pattern and the behaviour scheduled next.

Described in the following is a configuration of the behaviour/situation analysis system 20 that is capable of presenting appropriate information to a user at an appropriate time by correlating schedule information and the contents of a detected behaviour/situation pattern with each other as described above <2-2: Overall Configuration of System>

Figure 33:
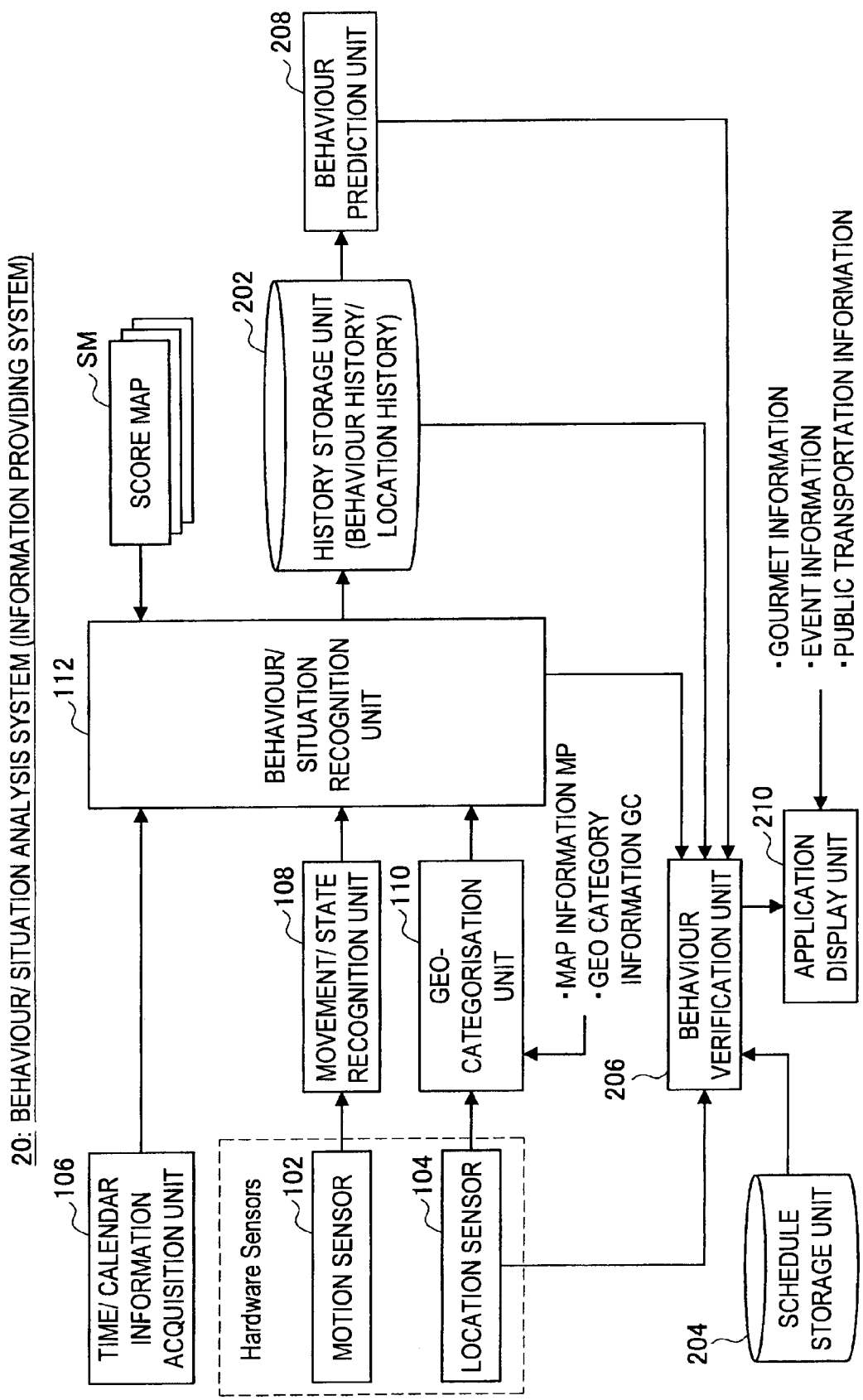
FIG. 33 is an explanatory diagram showing an example of the system configuration of the behaviour/situation analysis system according to the embodiment.

First, an overall system configuration of the behaviour/situation analysis system 20 according to the present embodiment will be described with reference to FIG. 33. FIG. 33 is an explanatory diagram showing an example of the overall system configuration of the behaviour/situation analysis system 20 according to the present embodiment. Note that structural elements that have substantially the same function as those of the behaviour/situation analysis system 10 according to the first embodiment described above are denoted with the same reference numerals, and repeated explanation of these structural elements is omitted.

As shown in FIG. 33, the behaviour/situation analysis system 20 mainly includes a motion sensor 102, a location sensor 104, a time/calendar information acquisition unit 106, a movement/state recognition unit 108, a geo-categorisation unit 110, and a behaviour/situation recognition unit 112. Furthermore, the behaviour/situation analysis system 20 includes a history storage unit 202, a schedule storage unit 204, a behaviour verification unit 206, a behaviour prediction unit 208, and an application display unit 210.

When a user performs a behaviour, first, sensor data is detected by the motion sensor 102. The sensor data detected by the motion sensor 102 is input to the movement/state recognition unit 108. Furthermore, location information indicating the current location is acquired by the location sensor 104. Then, the location information on the current location acquired by the location sensor 104 is input to the geo-categorisation unit 110.

When the sensor data is input, the movement/state recognition unit 108 detects a movement/state pattern by using the sensor data. Then, the movement/state pattern detected by the movement/state recognition unit 108 is input to the behaviour/situation recognition unit 112. Also, when the location information on the current location is input, the geo-categorisation unit 110 acquires map information MP, and selects a geo category code corresponding to the current location by using the acquired map information MP. Furthermore, the geo-categorisation unit 110 calculates a histogram relating to the geo category. The geo category code selected by the geo-categorisation unit 110 is input to the behaviour/situation recognition unit 112.

As described above, the movement/state pattern and the geo category code are input to the behaviour/situation recognition unit 112 respectively from the movement/state recognition unit 108 and the geo-categorisation unit 110. Also, the sensor data is input to the behaviour/situation recognition unit 112 via the movement/state recognition unit 108. Furthermore, the location information on the current location is input to the behaviour/situation recognition unit 112 via the geo-categorisation unit 110. Furthermore, time/calendar information is input to the behaviour/situation recognition unit 112 from the time/calendar information acquisition unit 106.

Thus, the behaviour/situation recognition unit 112 detects a behaviour/situation pattern based on the movement/state pattern, the geo category code (histogram) and the time/calendar information that have been input. Additionally, the behaviour/situation pattern detection method used here may be based on the rule-based determination or on the learning model determination. The behaviour/situation pattern detected by the behaviour/situation recognition unit 112 is recorded in the history storage unit 202 together with the location information on the current location. Moreover, in the following explanation, pieces of history information on the behaviour/situation patterns accumulated in the history storage unit 202 may be referred to as a behaviour history. Similarly, pieces of the location information on the current location accumulated in the history storage unit 202 may be referred to as location history.

The behaviour history and the location history accumulated in the history storage unit 202 are read by the behaviour verification unit 206 or the behaviour prediction unit 208. The behaviour verification unit 206 is means for verifying schedule information against the actual behaviour/situation pattern. The schedule information is recorded in the schedule storage unit 204. Accordingly, the behaviour verification unit 206 compares the contents of the schedule information recorded on the schedule storage unit 204 against the information on the current location detected by the location sensor 104 and the behaviour/situation pattern detected by the behaviour/situation recognition unit 112. In a case the contents of the schedule information match the information of the current location and the behaviour/situation pattern, the behaviour verification unit 206 inputs information indicating match to the application display unit 210.

On the other hand, in a case the contents of the schedule information do not match the information of the current location and the behaviour/situation pattern, the behaviour verification unit 206 determines whether or not contents matching the information on the current location and the behaviour/situation pattern exist in the contents from the past or for the future registered in the schedule information. In a case contents matching the information on the current location and the behaviour/situation pattern exist in the contents from the past or for the future registered in the schedule information, the behaviour verification unit 206 inputs, to the application display unit 210, information indicating match together with the matching contents from the past or for the future. On the other hand, in a case contents matching the information on the current location and the behaviour/situation pattern do not exist in the contents from the past or for the future registered in the schedule information, the behaviour verification unit 206 reads the behaviour history and the location history from the history storage unit 202.

Then, the behaviour verification unit 206 compares the contents registered in the schedule information against the behaviour history and the location history that have been read, and detects a time point at which the behaviour/situation pattern mismatched the contents of behaviour registered in the schedule information. Then, the behaviour verification unit 206 inputs, to the application display unit 210, information indicating the detected time point of occurrence of mismatch and information on the location history and the behaviour history of that time point.

Furthermore, the behaviour verification unit 206 repeats the comparison process described above until the location information input from the location sensor 104 and the behaviour/situation pattern input from the behaviour/situation recognition unit 112 match the contents of the schedule information. Then, the behaviour verification unit 206 inputs to the application display unit 210, at the time point of matching, information indicating match and the location information and the behaviour/situation pattern of that time point.

Furthermore, location information and a result of behaviour/situation pattern prediction are input from the behaviour prediction unit 208 to the behaviour verification unit 206. For example, in a case there is no schedule information registered in the schedule storage unit 204, the behaviour verification unit 206 compares the result of behaviour/situation pattern prediction input by the behaviour prediction unit 208 and the behaviour/situation pattern actually detected by the behaviour/situation recognition unit 112. Then, the behaviour verification unit 206 inputs the result of comparison to the application display unit 210. The result of prediction by the behaviour prediction unit 208 is used, for example, in a case where information on a place a user is likely to visit after the current location or information according to the behaviour/situation pattern at that place is supposed to be presented but no schedule information is registered.

The behaviour prediction unit 208 reads information on the behaviour history and location history accumulated in the history storage unit 202, and predicts the behaviour/situation pattern and the location information for the future based on the pieces of information that have been read. For example, the behaviour prediction unit 208 uses the behaviour history and the like read from the history storage unit 202, and predicts the next behaviour/situation pattern of the user based on a stochastic location transition model. As the stochastic location transition model, a method of estimating a transition probability on the basis of location clustering described later is used, for example. Furthermore, although not shown in FIG. 33, in a case behaviour histories and location histories of other people are recorded in the history storage unit 202, the behaviour prediction unit 208 may also read the behaviour histories and the like of other people and use them for the prediction of the behaviour/situation pattern. By using the behaviour histories of other people, prediction of a behaviour in a place for which there are no behaviour history and the like of the user himself/herself becomes possible (for example, a behaviour that many people are predicted to take is presumed).

As described, the schedule information of the past, present and future and information on the behaviour/situation pattern or the like that is currently detected are verified against each other by the behaviour verification unit 206. Furthermore, the schedule information of the past, present and future and information on the behaviour/situation pattern that was detected in the past or the like are verified against each other by the behaviour verification unit 206. Furthermore, information on a behaviour/situation pattern or the like of the future presumed by the behaviour prediction unit 208 and the information on the behaviour/situation pattern or the like that is currently detected are verified against each other by the behaviour verification unit 206. These verification results are input to the application display unit 210. Furthermore, the prediction result by the behaviour prediction unit 208 is also input to the application display unit 210.

When these pieces of information are input, the application display unit 210 presents to the user appropriate information in accordance with the input information by using an application. Furthermore, the application display unit 210 displays an application used by the user to register schedule information or to manage the schedule information. Furthermore, the application display unit 210 displays an application for displaying a map, or displays, by the application, a result of verification by the behaviour verification unit 206 or the like. For example, as shown in FIG. 32, temporal and spatial differences between a scheduled event registered in the schedule information and a behaviour/situation pattern that is actually detected are displayed. Additionally, such information may be notified by sound.

Heretofore, an overall system configuration of the behaviour/situation analysis system 20 has been described.

<2-3: Function of Behaviour Prediction Unit 208>

Next, a function of the behaviour prediction unit 208 will be described with reference to FIG. 34.

Figure 34:
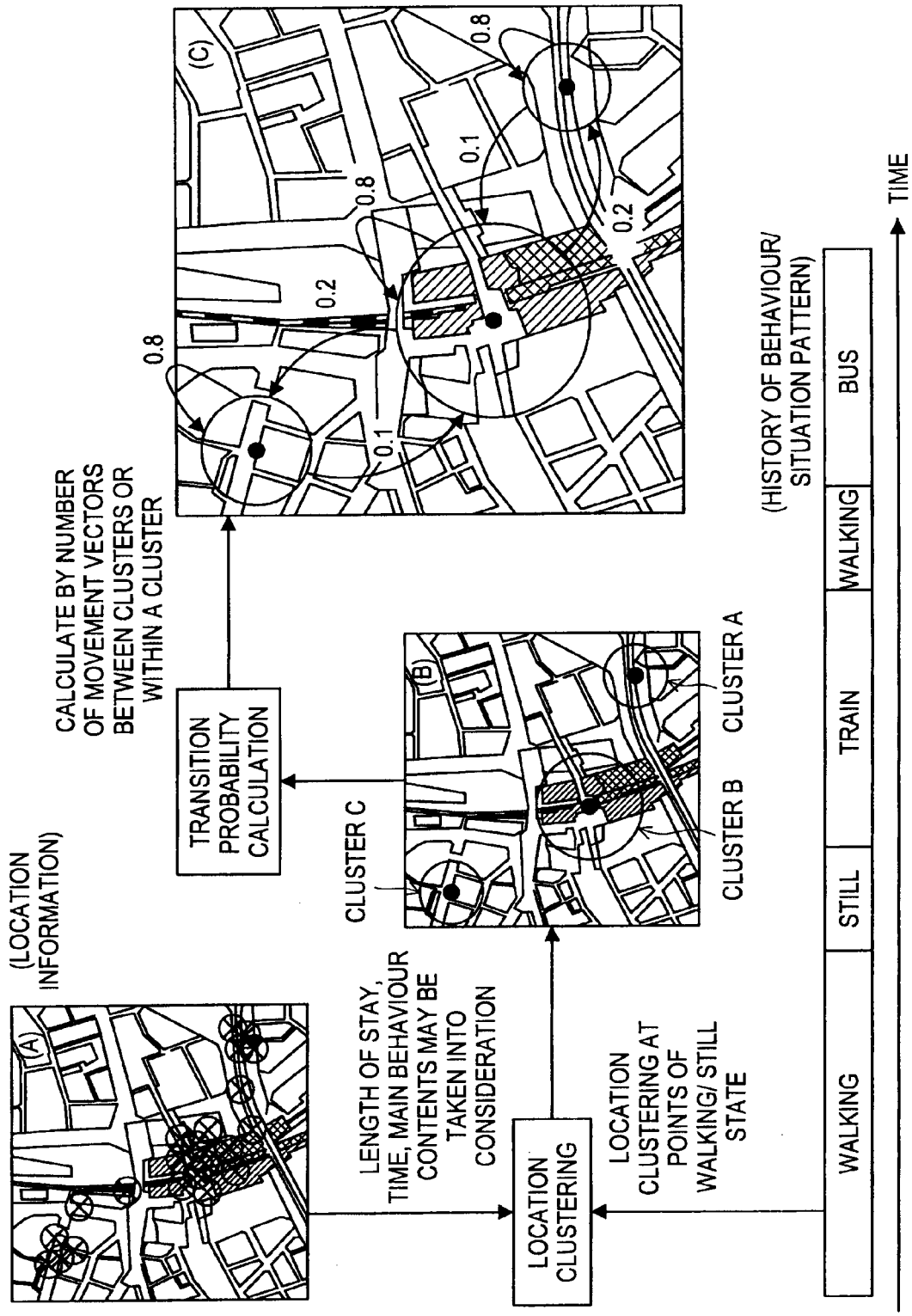
FIG. 34 is an explanatory diagram for explaining a function of a behaviour prediction unit according to the embodiment.

FIG. 34 shows a behaviour prediction method that uses location clustering. The behaviour prediction unit 208 reads a behaviour history and a location history from the history storage unit 202, and narrows down information on the location history based on the behaviour history. The location history includes location information recorded in various scenes, such as location information detected during movement of a user on foot, location information detected during transportation by train or bus and location information detected during the user staying still. Therefore, it is extremely difficult to predict the tendency of behaviour/situation patterns that the user may take when giving equal importance to all the pieces of the location information.

Accordingly, the behaviour prediction unit 208 refers to the behaviour history, and extracts pieces of location information corresponding to behaviour/situation patterns "walking" and "still" from the location history. By narrowing down the location information in this manner, the amount of computation relating to behaviour prediction can be reduced. Also, by extracting the behaviour/situation patterns "walking" and "still," a situation where the user is staying within a certain range can be distinguished. Additionally, in a case histories of the length of stay (or duration), the time/calendar information and the like are included in the behaviour history, these histories may be used, and the behaviour history may be narrowed down to behaviours with long length of stay (or duration) or the behaviour history may be narrowed down based on the time of performance of a predicted behaviour. By narrowing down in the manner described above, the accuracy of behaviour prediction can be improved.

Next, the behaviour prediction unit 208 clusters location information (A) obtained by narrowing down based on the behaviour history. That is, the behaviour prediction unit 208 extracts regions (clusters) where points of the location information concentrate, and groups points included in each of the extracted regions together with deciding a representative point that represents each group. As described, since the behaviour prediction unit 208 has performed narrowing down based on the behaviour/situation patterns "walking" and "still," each cluster is not greatly expanded. Thus, a cluster map (B) that precisely expresses the main stop points of the user can be created. In the example of FIG. 34, three clusters A, B and C are obtained.

Next, the behaviour prediction unit 208 calculates transition probabilities within a cluster and between clusters based on the location history. The behaviour history obtained by narrowing down based on the behaviour/situation patterns "walking" and "still" includes moving processes (time series location information) of the user. Furthermore, the range of each cluster is specified by the clustering described above. Accordingly, by using these pieces of information in combination, the behaviour prediction unit 208 can distinguish which piece of location information constituting a moving process is included in which cluster. Also, the behaviour prediction unit 208 can distinguish from which cluster to which cluster the movement according to a certain moving process is.

For example, the behaviour prediction unit 208 can detect the number of moving processes MAA for movement within the cluster A, the number of moving processes MBB for movement within the cluster B, and the number of moving processes MCC for movement within the cluster C. Also, the behaviour prediction unit 208 can detect the number of moving processes MAB for movement from the cluster A to the cluster B. Furthermore, the behaviour prediction unit 208 can predict the number of moving processes MBA for movement from the cluster B to the cluster A. Furthermore, the behaviour prediction unit 208 can predict the number of moving processes MBC for movement from the cluster B to the cluster C, and the number of moving processes MCB for movement from the cluster C to the cluster B.

The transition probabilities within a cluster or between clusters can be calculated based on the ratio between the MAA, MBB, MCC, MAB, MBA, MAC, MCA, MBC and MCB detected in the manner described above. After calculating the transition probabilities in the manner described above, the behaviour prediction unit 208 predicts a behaviour based on the calculated transition probabilities. For example, transition probabilities as shown in (C) of FIG. 34 are calculated (the number indicates the level of a transition probability), and it is predicted that, in a case a user is in the cluster A and the behaviour/situation pattern is "shopping," the user will keep on shopping and then will move to the cluster B. As described above, even if schedule information is not registered, the behaviour of a user will be predicted by the behaviour prediction unit 208 based on the location history and the behaviour history.

Heretofore, a function of the behaviour prediction unit 208 has been described.

<2-4: Function of Behaviour Verification Unit 206>

Figure 35A:
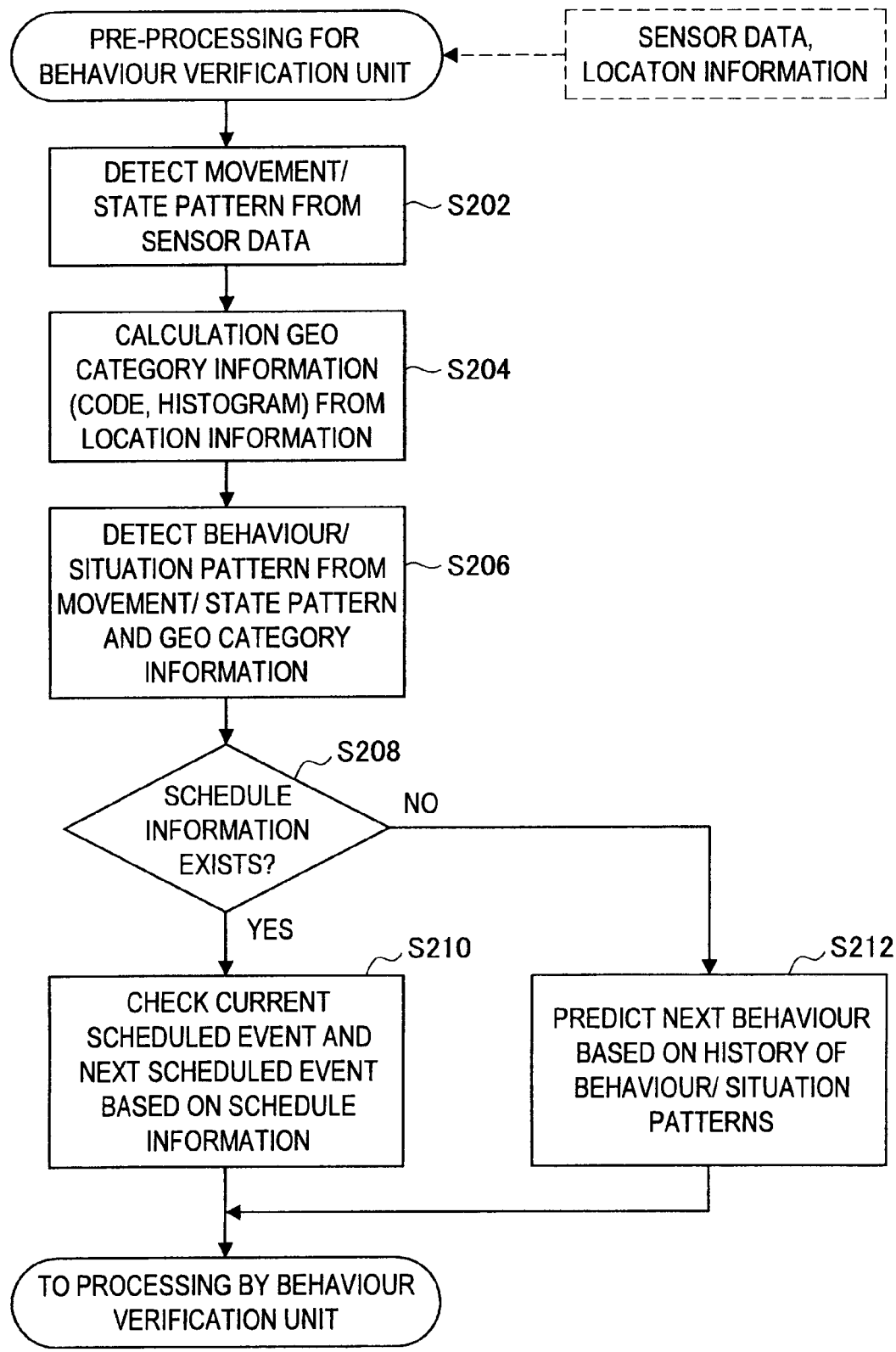
FIG. 35A is an explanatory diagram showing a flow of processing performed prior to processing by a behaviour verification unit according to the embodiment.
Figure 35B:
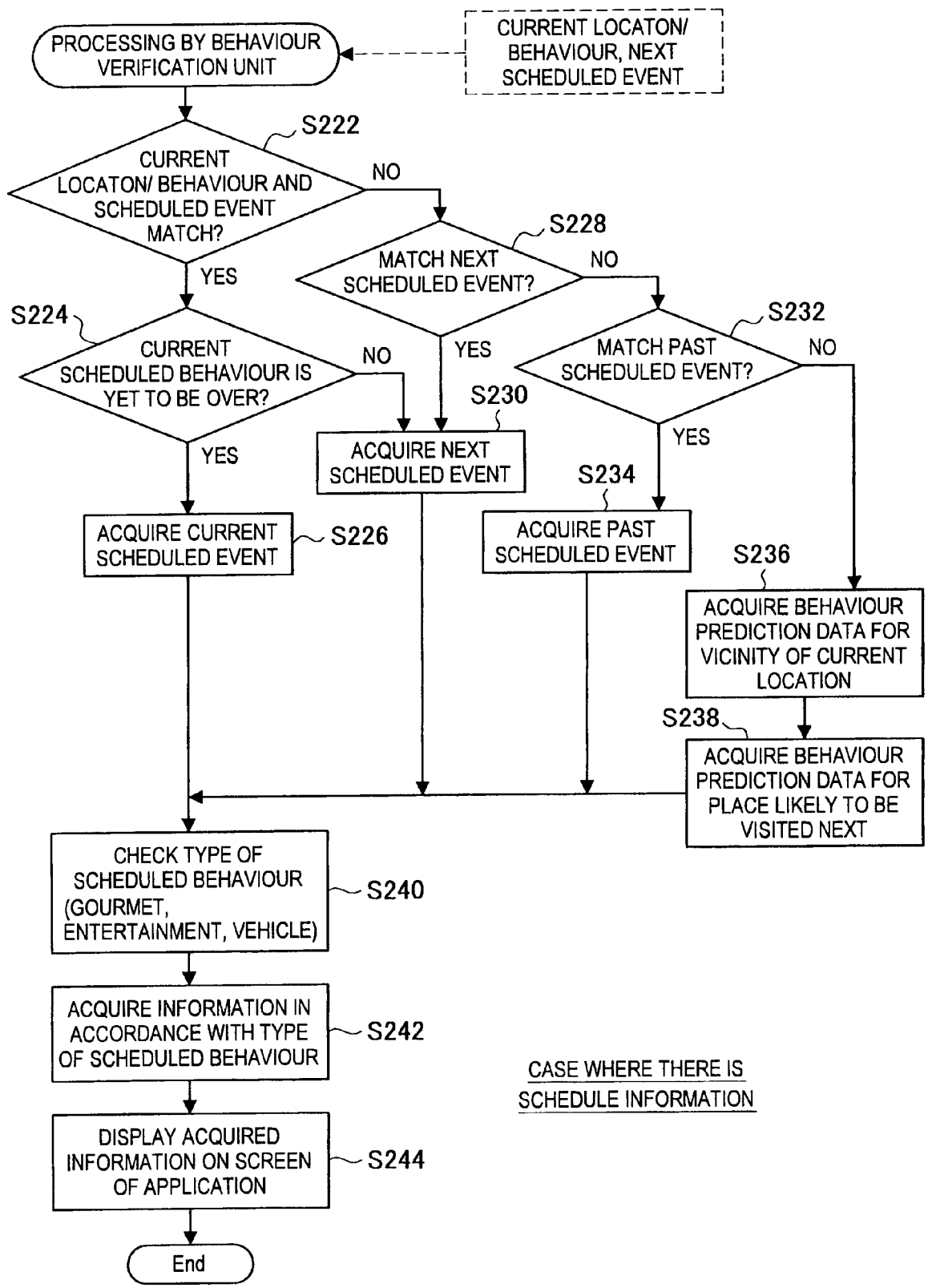
FIG. 35B is an explanatory diagram showing a flow of processing performed by the behaviour verification unit according to the embodiment.
Figure 35C:
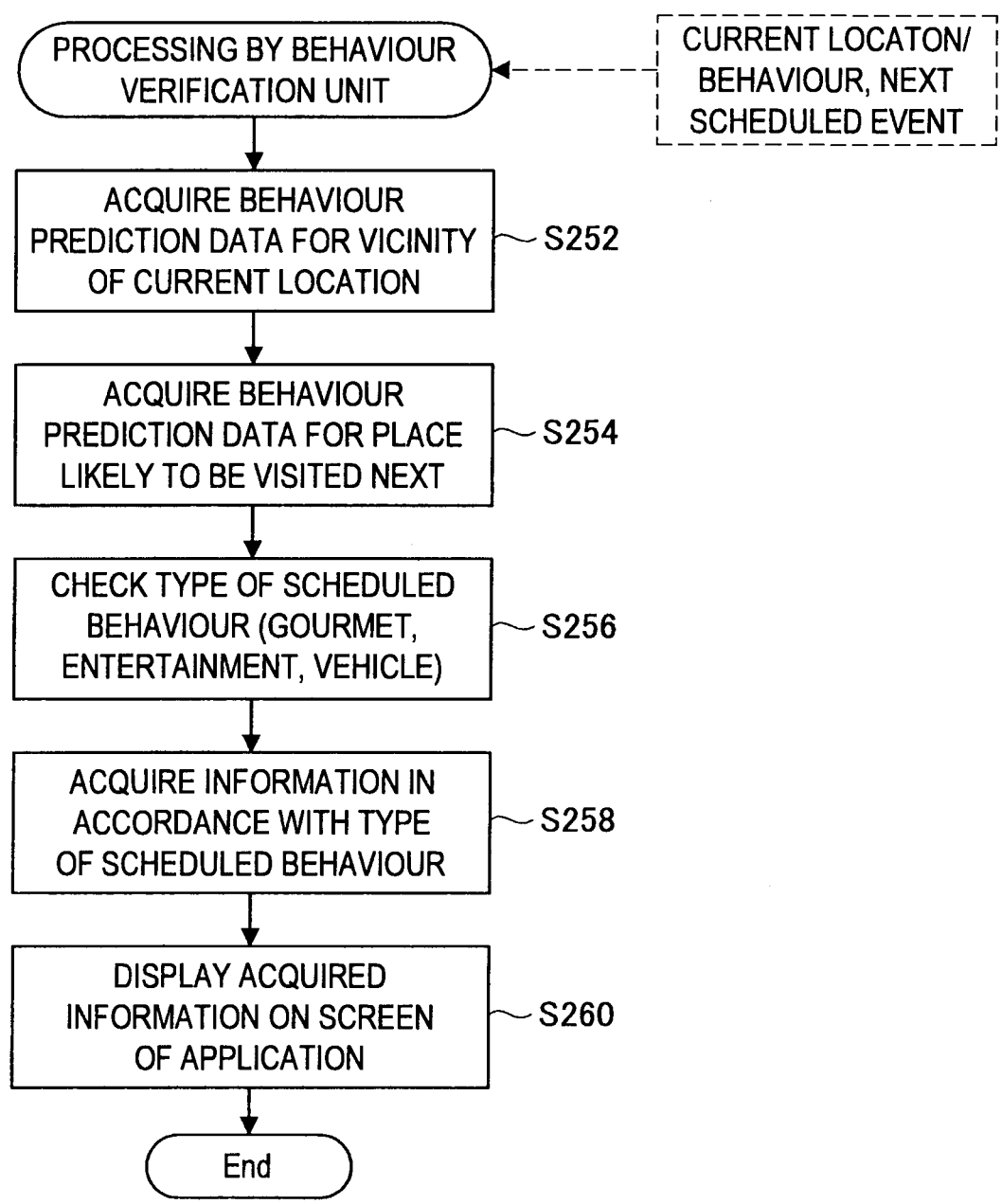
FIG. 35C is an explanatory diagram showing a flow of processing performed by the behaviour verification unit according to the embodiment.

Next, an operational flow of the behaviour verification unit 206 will be described with reference to FIGS. 35A to 35C.

(Pre-Processing)

First, reference will be made to FIG. 35A. FIG. 35A is an explanatory diagram showing a flow of the main processes performed prior to a behaviour verification operation by the behaviour verification unit 206. As shown in FIG. 35A, first, a movement/state pattern is detected based on sensor data by the movement/state recognition unit 108 (S202). Next, geo category information (geo category code, geo category histogram) is detected from location information by the geo-categorisation unit 110 (S204). Then, the behaviour/situation recognition unit 112 detects a behaviour/situation pattern from the movement/state pattern and the geo category information (S206).

Next, whether or not schedule information is registered in the schedule storage unit 204 is determined by the behaviour verification unit 206 (S208). In a case schedule information is registered in the schedule storage unit 204, the behaviour verification unit 206 proceeds to the process of step S210. On the other hand, in a case schedule information is not registered in the schedule storage unit 204, the behaviour verification unit 206 proceeds to the process of step S212. In a case it proceeded to the process of step S210, the behaviour verification unit 206 checks the current scheduled event and the next scheduled event from the schedule information (S210). On the other hand, in a case it proceeded to the process of step S212, the behaviour verification unit 206 acquires information indicating the next behaviour predicted by the behaviour prediction unit 208 based on the history of behaviour/situation patterns (behaviour history/location history) (S212).

(Case where Schedule Information is Registered)

Next, reference will be made to FIG. 35B. In a case schedule information is registered in the schedule storage unit 204, the behaviour verification unit 206 is aware, by the pre-processing of FIG. 35A, of the current scheduled event or the next scheduled event registered in the schedule information. Accordingly, the behaviour verification unit 206 determines whether or not the current location detected by the location sensor 104 and the current behaviour/situation pattern detected by the behaviour/situation recognition unit 112 match the current scheduled event registered in the schedule information (S222). In a case they match the current scheduled event, the behaviour verification unit 206 proceeds to the process of step S224. On the other hand, in a case they do not match the current scheduled event, the behaviour verification unit 206 proceeds to the process of step S228.

In a case it proceeded to the process of step S224, the behaviour verification unit 206 determines whether or not the current scheduled event is already over (S224). In a case the current scheduled event is not over, the behaviour prediction unit 206 proceeds to the process of step S226. On the other hand, in a case the current scheduled event is over, the behaviour verification unit 206 proceeds to the process of step S230. In a case it proceeded to the process of step S226, the behaviour verification unit 206 acquires the current scheduled event registered in the schedule information (S226), and proceeds to the process of step S240.

In a case the behaviour verification unit 206 proceeded to the process of step S228 based on the determination process of step S222, the behaviour verification unit 206 determines whether or not the location information and the behaviour/situation pattern currently detected match the next scheduled event (S228). In a case they match the next scheduled event, the behaviour verification unit 206 proceeds to the process of step S230. On the other hand, in a case they do not match the next scheduled event, the behaviour verification unit 206 proceeds to the process of step S232. In a case it proceeded to the process of step S230, the behaviour verification unit 206 acquires the next scheduled event registered in the schedule information (S230), and proceeds to the process of step S240.

In a case the behaviour verification unit 206 proceeded to the process of step S232 based on the determination process of step S228, the behaviour verification unit 206 determines whether or not the location information and the behaviour/situation pattern currently detected match a past scheduled event (S232). In a case they match the past scheduled event, the behaviour verification unit 206 proceeds to the process of step S234. On the other hand, in a case they do not match the past scheduled event, the behaviour verification unit 206 proceeds to the process of step S236. In a case it proceeded to the process of step S234, the behaviour verification unit 206 acquires the past scheduled event registered in the schedule information (S234), and proceeds to the process of step S240.

In a case the behaviour verification unit 206 proceeded to the process of step S236 based on the determination process of step S232, the behaviour verification unit 206 acquires behaviour prediction data for the vicinity of the current location from the behaviour prediction unit 208 (S236). Then, the behaviour verification unit 206 acquires, from the behaviour prediction unit 208, behaviour prediction data for a place the user is likely to visit next (S238), and proceeds to the process of step S240.

On proceeding to the process of step S240, the behaviour verification unit 206 checks the type of a scheduled behaviour (S240). Examples of the type of the scheduled behaviour includes a gourmet-related behaviour (meal or the like), an entertainment, a vehicle-related behaviour and the like. Next, the behaviour verification unit 206 acquires information according to the type of the scheduled behaviour (S242). Then, the behaviour verification unit 206 inputs the acquired information to the application display unit 210, and displays the information on an application (S244). Then, the behaviour verification unit 206 ends the series of processes relating to presentation of information.

According to such configuration, even if a behaviour of the user is not following the scheduled event registered in the schedule information, appropriate information in accordance with the behaviour/situation pattern of the time point can be provided. Furthermore, even if the behaviour of the user is not registered in the schedule information, appropriate information is presented to the user based on a predicted behaviour/situation pattern.

(Case where Schedule Information is not Registered)

Next, reference will be made to FIG. 35C. In FIG. 35C, behaviour prediction data is created by the behaviour prediction unit 208 in the pre-processing of FIG. 35A in a case schedule information is not registered in the schedule storage unit 204. Thus, the behaviour verification unit 206 acquires behaviour prediction data for the vicinity of the current location from the behaviour prediction unit 208 (S252). Then, the behaviour verification unit 206 acquires behaviour prediction data for a place the user is likely to visit next (S254).

Next, the behaviour verification unit 206 checks the type of a scheduled behaviour based on the pieces of behaviour prediction data (S256). Next, the behaviour verification unit 206 acquires information according to the type of the scheduled behaviour (S258). Then, the behaviour verification unit 206 inputs the acquired information to the application display unit 210, and displays the information on an application (S260). Then, the behaviour verification unit 206 ends the series of processes relating to presentation of information.

According to such configuration, even if schedule information is not registered in the schedule storage unit 204, the behaviour/situation pattern of a user can be predicted, and appropriate information in accordance with the scene can be presented to the user.

Heretofore, the second embodiment of the present invention has been described. The present embodiment proposed a technology of correlating schedule information and a behaviour/situation pattern with each other and providing a user with appropriate information in accordance with the situation. Also proposed is a technology of predicting, efficiently and accurately, a behaviour/situation pattern of a user based on a behaviour history and a location history. By using these technologies, more effective information can be provided to a user according to the scene.

<3: Third Embodiment>

Next, the third embodiment of the present invention will be described. The present embodiment relates to a method of using a behaviour/situation pattern obtained by the behaviour/situation pattern detection method described in the first embodiment described above. Particularly, the technology of the present embodiment relates to a technology of finely controlling a notification timing of ToDo information that is registered as a future scheduled event of a user. The present embodiment further relates to a technology of sharing the ToDo information among multiple users and adequately controlling notification receivers according to the behaviour/situation pattern of each user.

<3-1: Overview of System>

Figure 36:
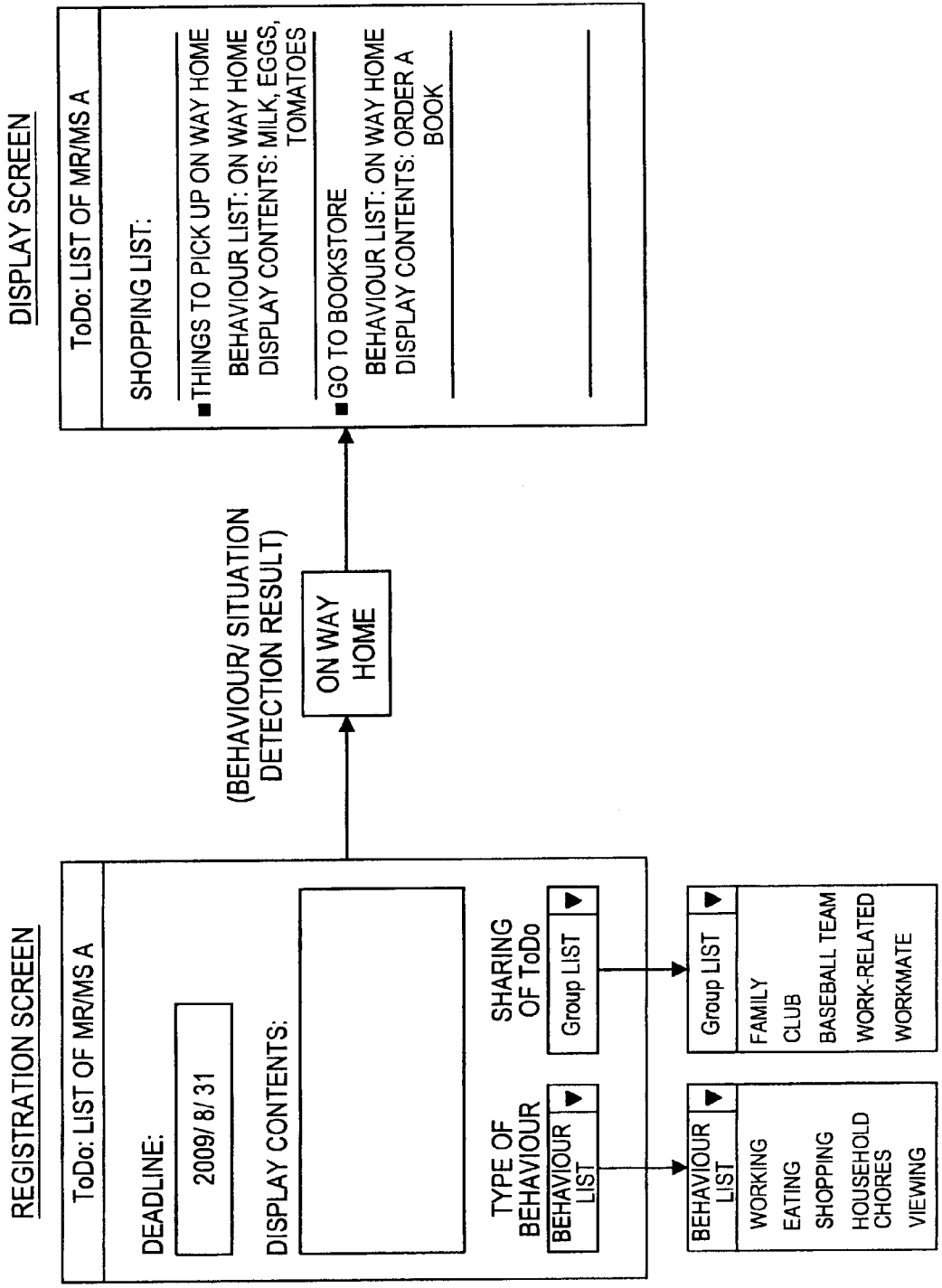
FIG. 36 is an explanatory diagram showing an overview of a function of a behaviour/situation analysis system according to the third embodiment of the present invention.

First, an overview of a function to be realised by a behaviour/situation analysis system 30 according to the present embodiment will be described with reference to FIGS. 36 and 37. FIGS. 36 and 37 are explanatory diagrams showing an effective method of presenting information based on correlation with a registration/notification application for ToDo information.

First, reference will be made to FIG. 36. FIG. 36 illustrates a registration screen of an application for registering ToDo information and a display screen for the registered ToDo information. On the registration screen, "deadline" input box for setting a time period (present to deadline) for notifying registered ToDo information, "display contents" box for registering ToDo information desired to be notified, a timing box ("type of behaviour") for setting a notification timing, and a sharer selection box ("sharing of ToDo?") for setting a sharer are provided.

A behaviour/situation pattern included in a specific behaviour list can be selectively input in the timing box of the registration screen. Also, a group included in a specific Group list can be selectively input in the sharer selection box of the registration screen. The behaviour list includes behaviour/situation patterns such as "working," "eating," shopping," "household chores" and "viewing," for example. Also, the Group list includes groups such as "family," "club," "baseball team," "work related" and "workmate," for example.

When each of the items described above is registered by using the registration screen, ToDo information is displayed on the display screen according to a result of behaviour/situation pattern detection. For example, in a case "on way home" is selected from the behaviour list and is registered, ToDo information is displayed on the display screen at a timing the behaviour/situation pattern detected in accordance with the behaviour of a user is "on way home." In the example of FIG. 36, a shopping list of "things to pick up on way home" is registered as the ToDo information, and the registered shopping list, "things to pick up on way home" and "go to bookstore," is displayed at a timing a behaviour/situation pattern of "on way home" is detected.

As described, by having ToDo information displayed in accordance with a behaviour/situation pattern, appropriate ToDo information is automatically displayed without individually setting the display timing for each piece of ToDo information. Accordingly, a user can be saved the trouble of registering, and also, ToDo information can be automatically displayed at an appropriate timing even if a behaviour/situation pattern of the user is different from that which was scheduled.

For example, if a display timing of ToDo information is set to a normal time of getting home, ToDo information is displayed at a different timing from the actual time of getting home in a case the time of getting home changed. However, with the configuration of FIG. 36, such faulty situation will not occur.

Additionally, a behaviour/situation pattern may be automatically selected from the behaviour list, at the time display contents of ToDo information is input on the registration screen, according to the input contents. Additionally, the behaviour/situation pattern to be automatically selected may be set in advance or may be set by using a determination model automatically built by machine learning.

For example, as shown in FIG. 37, in a case the display contents of ToDo information is "shopping list," behaviour/situation patterns "moving (train, bus, car, bicycle)," "on way home" and "shopping" corresponding to "shopping list" may be automatically selected. Similarly, "moving (on foot)," and "walking" may be automatically selected for "message list," "shopping" and "after shopping" for "household accounts," "meal" and "after meal" for "calorie check," "moving (train, bus)" for "English listening," and "household chores" and "TV viewing" for "recorded program viewing."

As described, with ToDo information being effectively displayed at an appropriate timing in accordance with a behaviour/situation pattern, it becomes possible to use the ToDo information more effectively. Also, with ToDo information being shared among multiple users as will be described later and a notification receiver of the ToDo information being selected by using the behaviour/situation pattern, inappropriate notification of the ToDo information to an unrelated user can be avoided, thereby reducing the irritation of the user, and at the same time, effective provision of the ToDo information can be realised. In the following, a configuration of the behaviour/situation analysis system 30 capable of realising such function will be described in detail.

<3-2: Overall Configuration of System>

Figure 38:
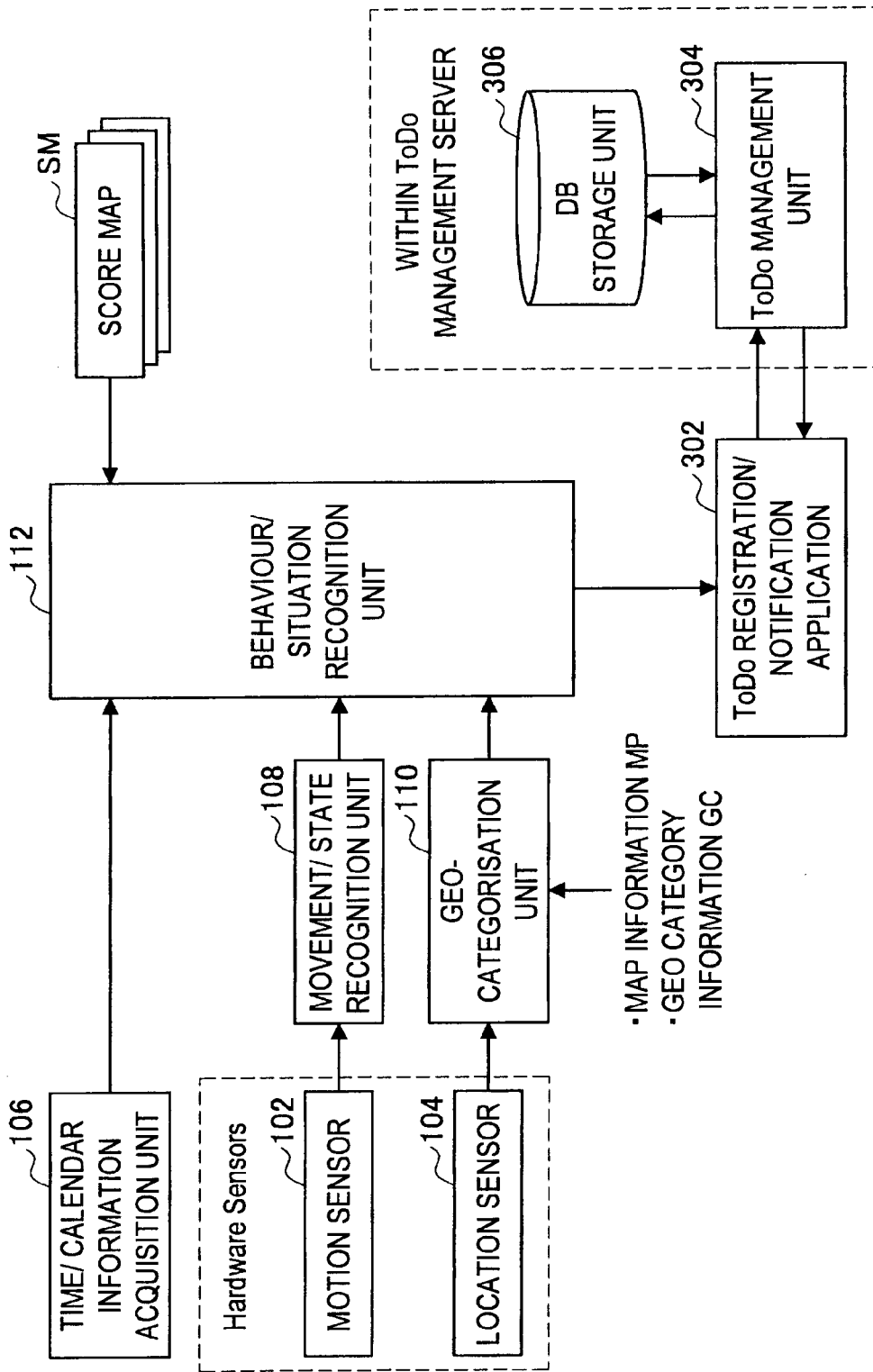
FIG. 38 is an explanatory diagram showing an example of the system configuration of the behaviour/situation analysis system according to the embodiment.

First, an overall system configuration of the behaviour/situation analysis system 30 according to the present embodiment will be described with reference to FIG. 38. FIG. 38 is an explanatory diagram showing an example of the overall system configuration of the behaviour/situation analysis system 30 according to the present embodiment. Note that structural elements that have substantially the same function as those of the behaviour/situation analysis system 10 according to the first embodiment described above are denoted with the same reference numerals, and repeated explanation of these structural elements is omitted.

As shown in FIG. 38, the behaviour/situation analysis system 30 mainly includes a motion sensor 102, a location sensor 104, a time/calendar information acquisition unit 106, a movement/state recognition unit 108, a geo-categorisation unit 110, and a behaviour/situation recognition unit 112. Furthermore, the behaviour/situation analysis system 30 includes a ToDo registration/notification application 302, a ToDo management unit 304, and a database storage unit 306.

When a user performs a behaviour, first, sensor data is detected by the motion sensor 102. The sensor data detected by the motion sensor 102 is input to the movement/state recognition unit 108. Furthermore, location information indicating the current location is acquired by the location sensor 104. Then, the location information on the current location acquired by the location sensor 104 is input to the geo-categorisation unit 110.

When the sensor data is input, the movement/state recognition unit 108 detects a movement/state pattern by using the sensor data. Then, the movement/state pattern detected by the movement/state recognition unit 108 is input to the behaviour/situation recognition unit 112. Also, when the location information on the current location is input, the geo-categorisation unit 110 acquires map information MP, and selects a geo category code corresponding to the current location by using the acquired map information MP. Furthermore, the geo-categorisation unit 110 calculates a histogram relating to the geo category. The geo category code selected by the geo-categorisation unit 110 is input to the behaviour/situation recognition unit 112.

As described, the movement/state pattern and the geo category code are input to the behaviour/situation recognition unit 112 respectively from the movement/state recognition unit 108 and the geo-categorisation unit 110. Also, the sensor data is input to the behaviour/situation recognition unit 112 via the movement/state recognition unit 108. Furthermore, the location information on the current location is input to the behaviour/situation recognition unit 112 via the geo-categorisation unit 110. Furthermore, time/calendar information is input to the behaviour/situation recognition unit 112 from the time/calendar information acquisition unit 106.

Thus, the behaviour/situation recognition unit 112 detects a behaviour/situation pattern based on the movement/state pattern, the geo category code (histogram) and the time/calendar information that have been input. Additionally, the behaviour/situation pattern detection method used here may be based on the rule-based determination or on the learning model determination. The behaviour/situation pattern detected by the behaviour/situation recognition unit 112 is input to the ToDo registration/notification application 302. The ToDo registration/notification application 302 is means for presenting a user with ToDo information (contents on a display screen) together with providing an input interface that is used at the time registration of the ToDo information (contents on a registration screen) by the user.

When a deadline, display contents, the behaviour/situation pattern, a sharing target and the like (hereinafter, registration information) are registered in the ToDo registration/notification application 302, the registration information is input from the ToDo registration/notification application 302 to the ToDo management unit 304. When the registration information is input, the ToDo management unit 304 stores the registration information in the database storage unit 306. Furthermore, the ToDo registration/notification application 302 inputs, to the ToDo management unit 304, the behaviour/situation pattern input from the behaviour/situation recognition unit 112.

When the behaviour/situation pattern is input, the ToDo management unit 304 refers to the registration information stored in the database storage unit 306, and inputs ToDo information matching the input behaviour/situation pattern to the ToDo registration/notification application 302. When the ToDo information is input from the ToDo management unit 304, the ToDo registration/notification application 302 displays the input ToDo information on a display screen.

Additionally, behaviour/situation patterns of multiple users are input to the ToDo management unit 304. Accordingly, the ToDo management unit 304 selects, based on the registration information stored in the database storage unit 306, a provision target of the ToDo information while taking into consideration the multiple behaviour/situation patterns that have been input and information on a group the multiple users belong to. Then, the ToDo management unit 304 inputs the ToDo information in the ToDo registration/notification applications 302 of the selected provision targets. When the ToDo information is input from the ToDo management unit 304, each ToDo registration/notification application 302 displays the input ToDo information on a display screen.

According to such configuration, ToDo information is provided to an appropriate user at an appropriate timing in accordance with a behaviour/situation pattern.

<3-3: Function of ToDo Management Unit 304>

Next, a function of the ToDo management unit 304 will be described with reference to FIGS. 39 to 44.

(Overview)

First, an overview of operations of registration and notification of ToDo information by the ToDo management unit 304 will be described with reference to FIGS. 39 and 40.

Figure 39:
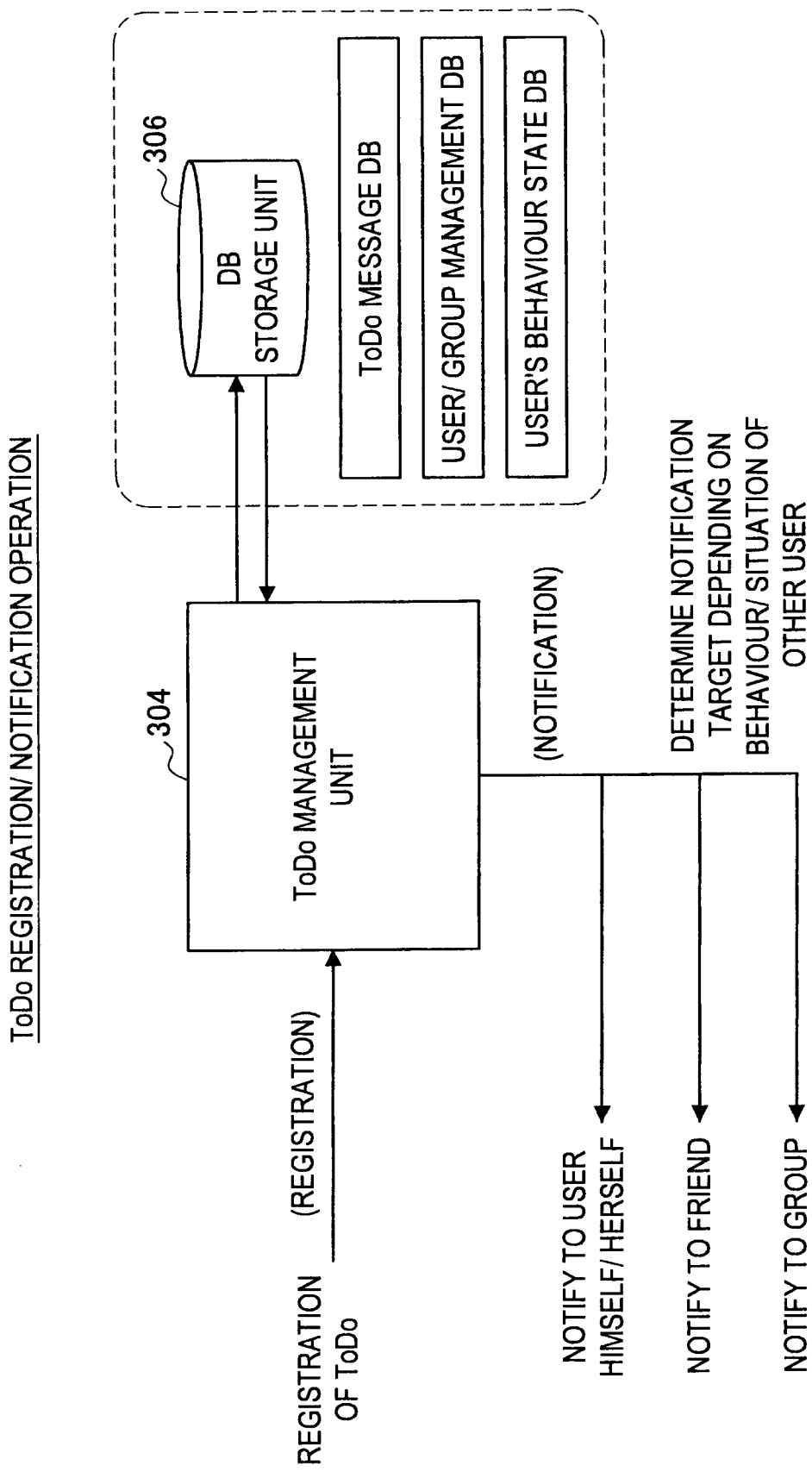
FIG. 39 is an explanatory diagram for explaining a function of a ToDo management unit according to the embodiment.

As shown in FIG. 39, when registration information is input from the ToDo registration/notification application 302, the ToDo management unit 304 stores the registration information in the database storage unit 306. A ToDo message DB, a user/group management DB and a user's behaviour state DB are provided in the database storage unit 306. The ToDo message DB is a database storing ToDo information input as the registration information. The user/group management DB is a database storing information on a user and a group input as the registration information. The user's behaviour state DB is a database storing a behaviour/situation pattern of a user stored in the user/group management DB. The ToDo management unit 304 stores the registration information in these databases.

As described above, a behaviour/situation pattern is input to the ToDo management unit 304 from each user. Accordingly, the ToDo management unit 304 extracts, from the ToDo message DB, ToDo information matching a behaviour/situation pattern that has been input, and provides the ToDo information to a user who has input the behaviour/situation pattern. At this time, if a group is linked to the ToDo information, a belonging group of a user with a matching behaviour/situation pattern is searched in the user/group management DB and the ToDo information is provided also to users belonging to the group linked to the ToDo information.

According to such configuration, a notification timing of ToDo information and a notification target of the ToDo information are decided according to a behaviour/situation pattern, and the ToDo information is notified to the notification target at a timing according to the behaviour/situation pattern.

Figure 40:
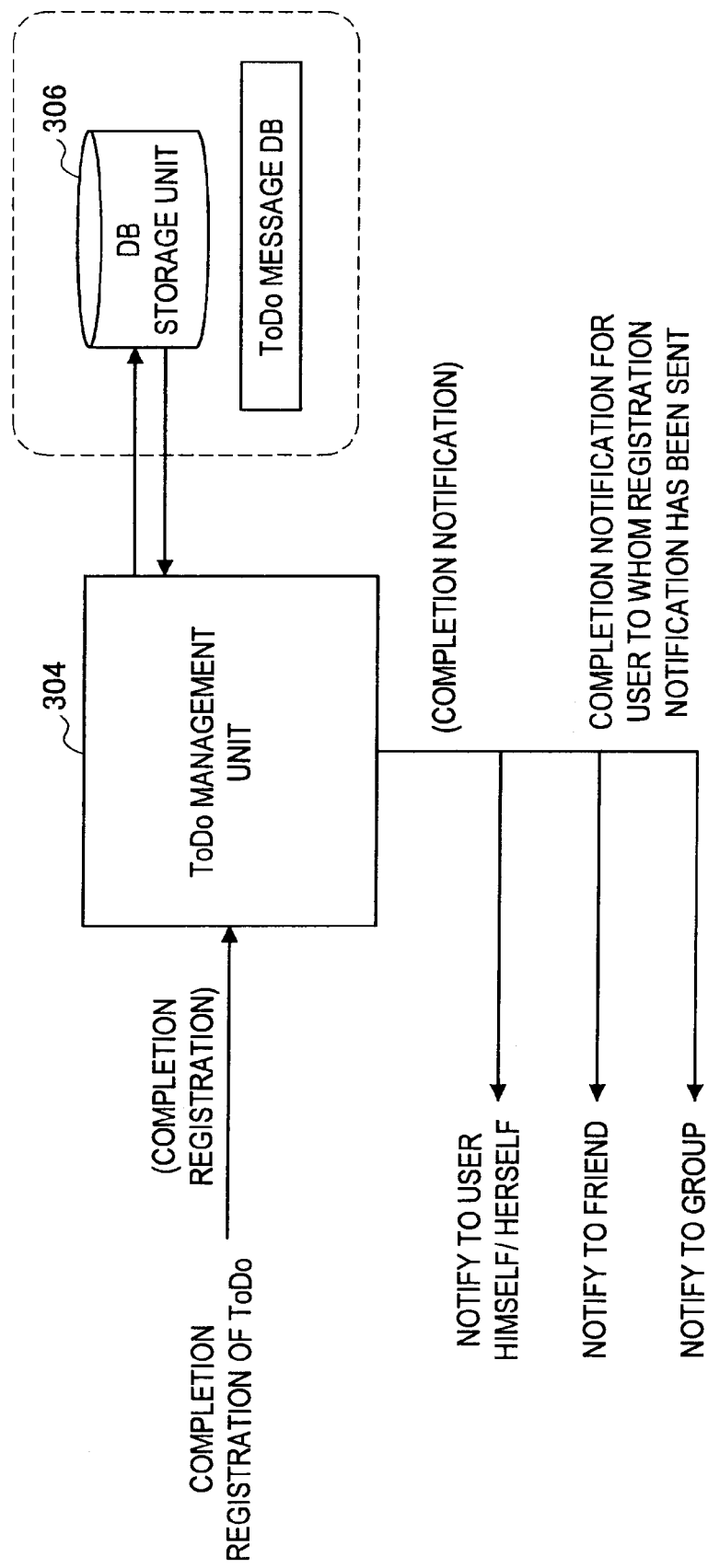
FIG. 40 is an explanatory diagram for explaining a function of the ToDo management unit according to the embodiment.

As shown in FIG. 40, when the ToDo information is notified and a user completes the behaviour of ToDo, the user inputs a ToDo completion notification to the ToDo management unit 304. When the completion notification is input, the ToDo management unit 304 deletes the ToDo information corresponding to the completion notification from the ToDo message DB included in the database storage unit 306. Then, the ToDo management unit 304 sends a completion notification to users to whom the ToDo information has been notified.

With the completion notification sent to each user, each user can know the completion of the ToDo. For example, in a case a ToDo that has only to be performed by one member of the group is notified, each user of the group can know the completion of the ToDo by being notified, by the completion notification, of the completion of the ToDo by a user.

The registration, notification, completion registration and completion notification of a ToDo are performed in the manner described above. A detailed functional configuration of the ToDo management unit 304 for realising these functions will be described in the following.

(Detailed Configuration, Operational Flow)

Figure 41:
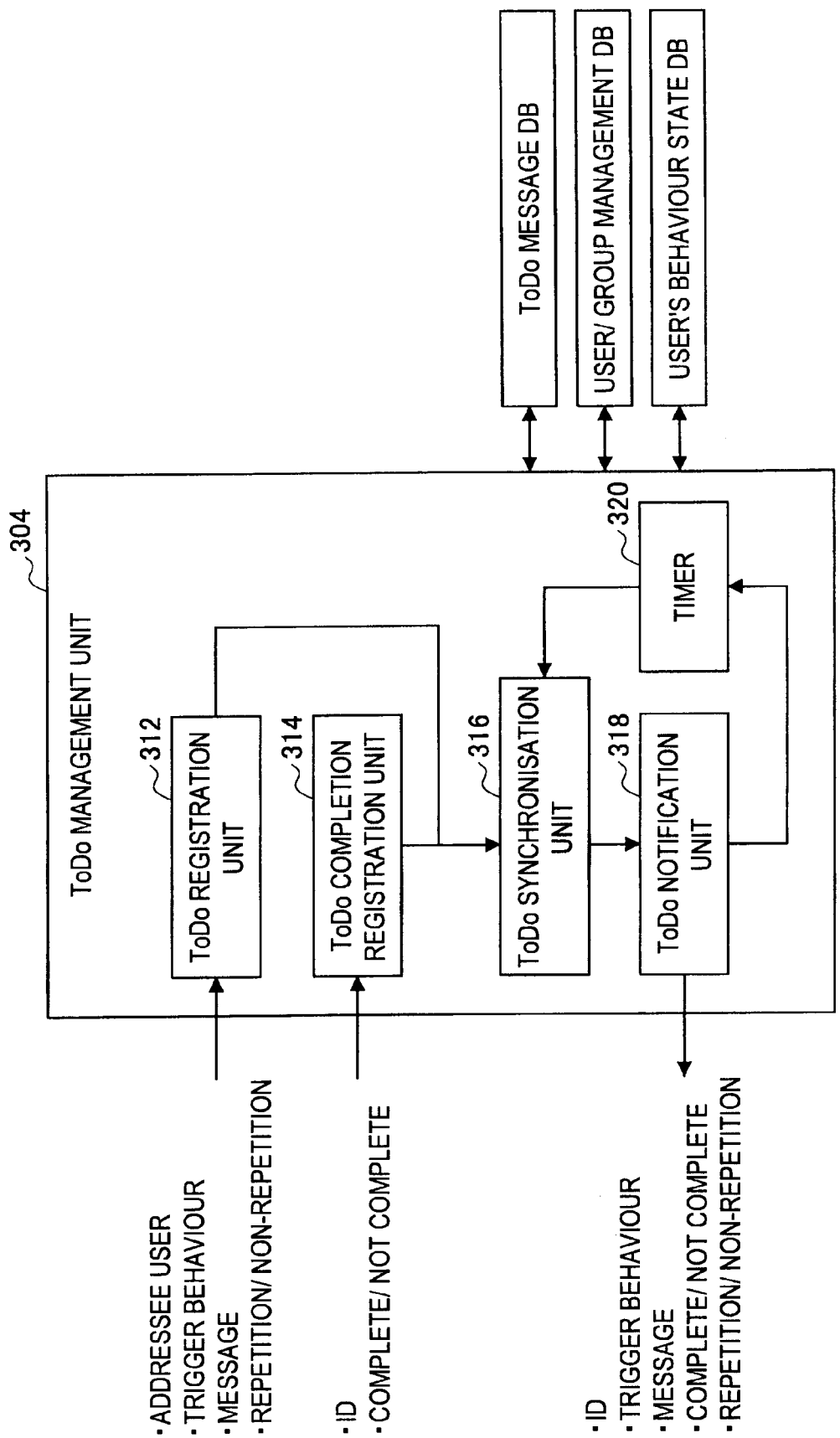
FIG. 41 is an explanatory diagram for explaining a function of the ToDo management unit according to the embodiment.

Next, a detailed functional configuration of the ToDo management unit 304 and an operational flow of the ToDo management unit 304 will be described with reference to FIG. 41 and FIGS. 42A to 42D. FIG. 41 is an explanatory diagram showing an example of a detailed functional configuration of the ToDo management unit 304. FIGS. 42A to 42D are explanatory diagrams showing operational flows of the ToDo management unit 304.

As shown in FIG. 41, the ToDo management unit 304 is configured from a ToDo registration unit 312, a ToDo completion registration unit 314, a ToDo synchronisation unit 316, a ToDo notification unit 318, and a timer 320.

(Configuration and Operation of Todo Registration Unit 312)

Registration information is input to the ToDo registration unit 312 at the time of registration. The registration information input at this time includes information such as an addressee user, a range of notification receivers, the type of a trigger behaviour (a behaviour/situation pattern included in a behaviour list), a message (ToDo information) and repetition/non-repetition. When these pieces of registration information are input, the ToDo registration unit 312 stores these pieces of information in the database storage unit 306.

Figure 42A:
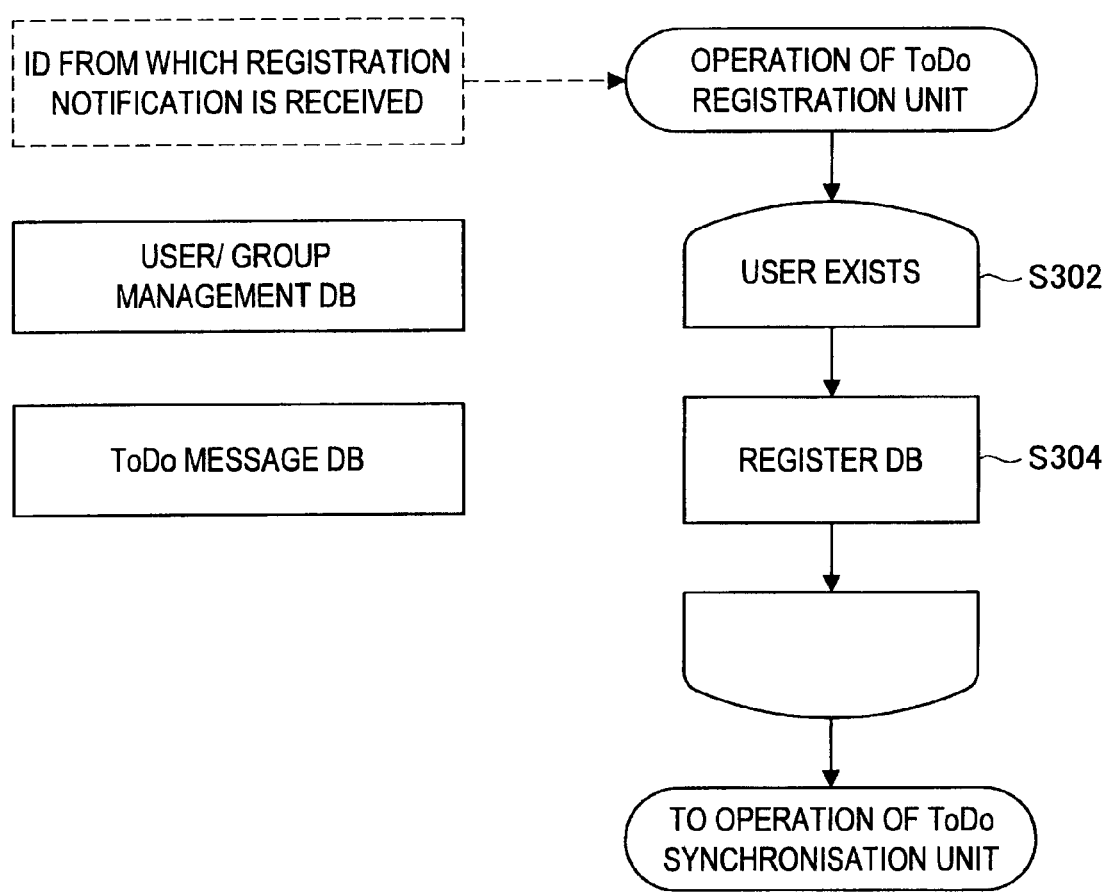
FIG. 42A is an explanatory diagram for explaining a function of the ToDo management unit according to the embodiment.

Specifically, an operation shown in FIG. 42A is performed. As shown in FIG. 42A, when registration information and information (ID) or the like on a user who has input the registration information are input, the ToDo registration unit 312 refers to the user/group management DB, and determines whether a user corresponding to the input registration information exists or not (S302). In a case a corresponding user exists in the user/group management DB, the ToDo registration unit 312 registers a message included in the registration information in the ToDo message DB (S304). In a case there are multiple corresponding users in the user/group management DB, the process of step S304 are performed for each of all the corresponding users.

(Configuration and Operation of Todo Completion Registration Unit 314)

Figure 42B:
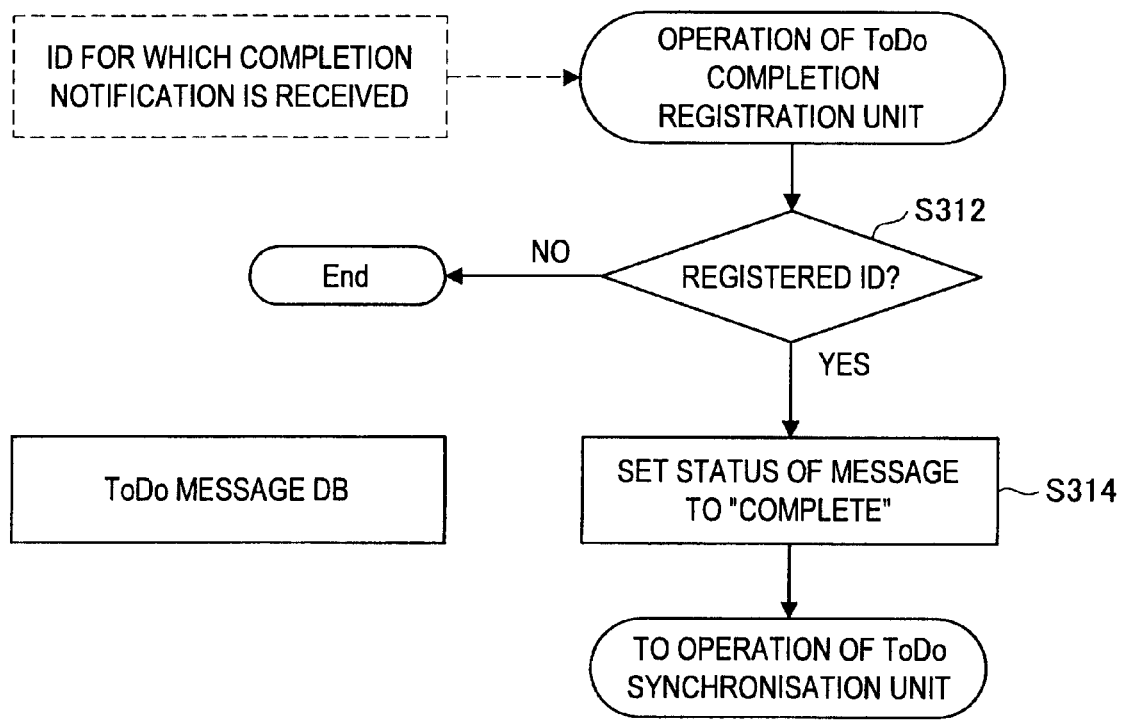
FIG. 42B is an explanatory diagram for explaining a function of the ToDo management unit according to the embodiment.

An ID of a completed ToDo is input to the ToDo completion registration unit 314. As shown in FIG. 42B, when an ID is input, the ToDo completion registration unit 314 determines whether or not there is ToDo information corresponding to the input ID (S312). Then, the ToDo completion registration unit 314 ends the series of processes in a case corresponding ToDo information is not registered, and proceeds to the process of step S314 in a case corresponding ToDo information is registered. In a case the ToDo completion registration unit 314 proceeded to the process of step S314, the ToDo completion registration unit 314 sets the status of the corresponding ToDo information registered in the ToDo message DB to "complete" (S314). Moreover, in a case of ToDo information with no possibility of being repeatedly used, such ToDo information may be deleted.

(Configuration and Operation of Todo Synchronisation Unit 316)

Figure 42C:
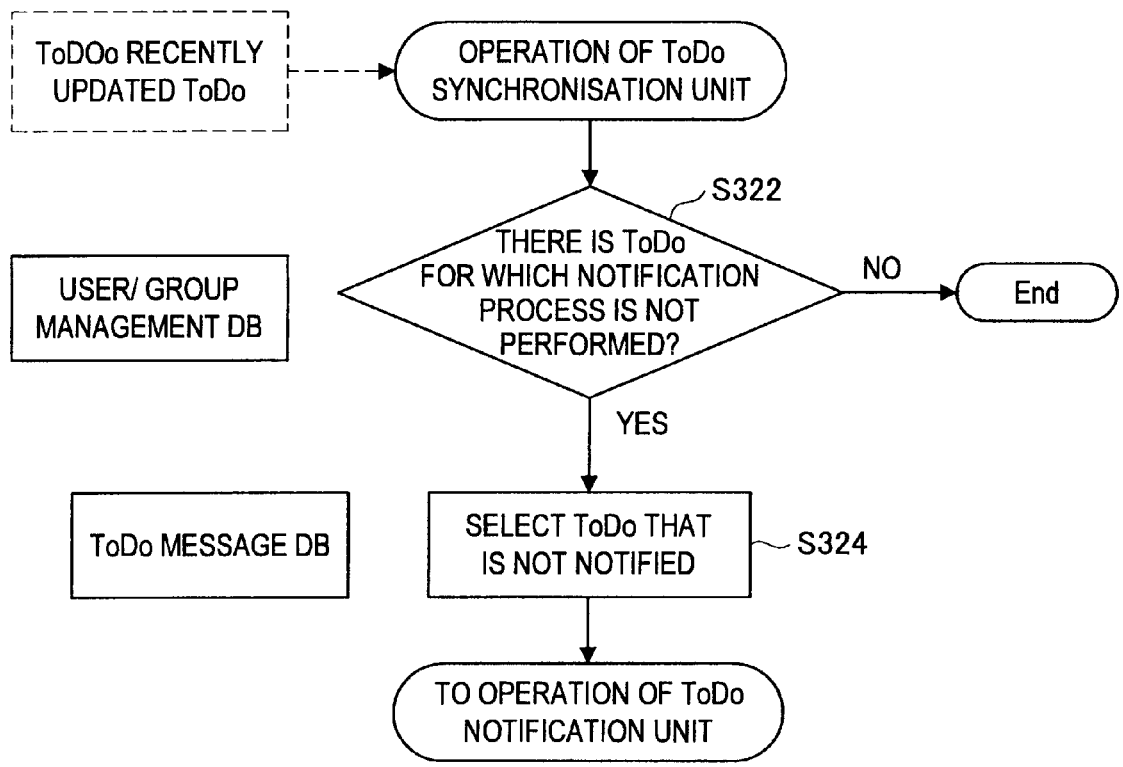
FIG. 42C is an explanatory diagram for explaining a function of the ToDo management unit according to the embodiment.

A notification of ToDo information update performed by the ToDo registration unit 312 and the ToDo completion registration unit 314 is input to the ToDo synchronisation unit 316. As shown in FIG. 42C, the ToDo synchronisation unit 316 first determines whether or not there is a ToDo in relation to which a notification process (registration notification, completion notification) is not performed (S322), and ends the series of processes in a case there is no ToDo that is not notified. On the other hand, in a case there is a ToDo that is not notified, the ToDo synchronisation unit 316 selects the ToDo that is not notified (S324), and inputs the result of selection to the ToDo notification unit 318.

(Configuration and Operation of Todo Notification Unit 318)

Figure 42D:
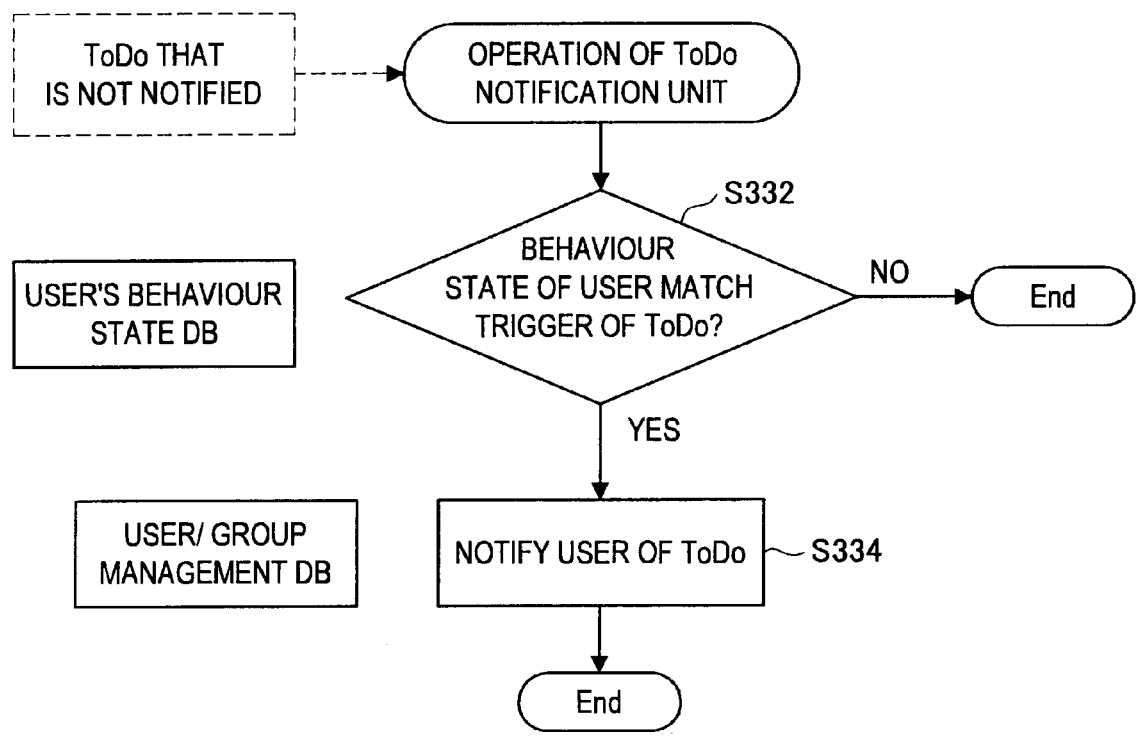
FIG. 42D is an explanatory diagram for explaining a function of the ToDo management unit according to the embodiment.

Information indicating a ToDo that is not notified is input to the ToDo notification unit 318 from the ToDo synchronisation unit 316. As shown in FIG. 42D, the ToDo notification unit 318 first determines whether a behaviour/situation pattern of a user registered in the user's behaviour state DB and a trigger of the ToDo that is not notified match each other (S332), and, in a case they do not match each other, ends the series of processes. On the other hand, in a case they match each other, the ToDo notification unit 318 proceeds to the process of step S334, and notifies a user of the ToDo that is not notified (S334).

Heretofore, the detailed configuration and operation of the ToDo management unit 304 have been described. Additionally, a member list, a group, a user, a ToDo list, a ToDo item and a behaviour/situation pattern are registered, being linked to each other, in the database storage unit 306 in a database format. By using such linked database, ToDo information can be provided to an appropriate provision target at an appropriate timing while taking into consideration the relationship between a behaviour/situation pattern, a group and the like.

For example, by linking and registering a ToDo and a behaviour/situation pattern in advance, a user can be presented, at a time a behaviour/situation pattern that is registered is detected, ToDo information linked to the behaviour/situation pattern. Also, ToDo information can be provided, for example, at the starting point or ending point of a behaviour/situation pattern, by taking time/calendar information into consideration. For example, in relation to a behaviour/situation pattern "meal," a ToDo "take a picture of a meal" may be presented at "meal, start" and a ToDo "calorie check" may be presented at "meal, end."

Moreover, a registration screen may be displayed instead of ToDo display at a timing according to a behaviour/situation pattern. According to this configuration, ToDo registration can be prompted at an appropriate timing. Furthermore, a method can also be conceived of detecting the cycle or timing of a ToDo by using a registration history of the user himself/ herself or of another user and optimising, by using the result of detection, a timing or provision target.

Furthermore, a method can also be conceived of optimising the timing of notification of a ToDo or a notification target by using, in addition to a behaviour/situation pattern, location information detected by the location sensor 104 or a geo category code (regional characteristics and the like) detected by the geo-categorisation unit 110. For example, an application mode of displaying "list of gifts to be purchased" during "shopping" in a commercial area or a department store may be conceived.

(Selection of Notification Target)

In the explanation above, a configuration of sharing ToDo information by multiple users has been indicated. Here, an explanation will be given with reference to FIGS. 43 and 44 on a method of appropriately selecting, according to a behaviour/situation pattern, a notification target of ToDo information with sharing of a ToDo taken as a premise. Additionally, the method which will be described here relates to a technology that, in a case of notifying a ToDo to other people, automatically selects a notification target by taking into consideration the situations of the people, or automatically determines, according to the number of notification targets who are related to the contents of a ToDo, whether or not the ToDo is to be notified to the entire group.

(Method of Notifying ToDo to User with Matching Behaviour/Situation Pattern)

First, reference will be made to FIG. 43. FIG. 43 schematically shows a configuration of automatically selecting a user with matching behaviour/situation patterns and notifying a ToDo to the selected user. In the example of FIG. 43, a case is assumed where ToDo information "reservation at a restaurant" is notified to a user whose behaviour/situation pattern is "moving." The ToDo information "reservation at a restaurant" is an action that has only to be performed by one member of the group.

Also, it is something that is preferably requested to a user whose is not in a busy situation. In the example of FIG. 43, of the three users in the group, two are "working" and one is "moving." It would be inconsiderate to ask a user whose behaviour/situation pattern is "working" to perform the ToDo of "reservation at a restaurant." Also, if "reservation at a restaurant" is notified during "working," the user who has received the notification may feel irritated by the user who has sent the ToDo. Furthermore, it would be bothersome to confirm the situation of a user who is far away by telephone or the like and to ask him the "reservation at a restaurant."

However, when using the technology of the present embodiment, the ToDo information "reservation at a restaurant" can be automatically sent only to a user whose behaviour/situation pattern is "moving." To realise such function, first, the ToDo management unit 304 monitors the behaviour/ situation pattern input by each user in a group, and selects a user corresponding to a behaviour/situation pattern "moving." In a case one user is selected, the ToDo management unit 304 sends the ToDo information to the user. Also, in a case multiple users are selected, the ToDo management unit 304 may send the ToDo information to the multiple users, or may send the ToDo information to one user selected among the multiple users.

For example, in a case of selecting one user among the multiple users, the ToDo management unit 304 may refer to location information, a geo category code (histogram) or the like, in addition to the behaviour/situation pattern. For example, in a case where there are three users whose behaviour/situation patterns are "moving" who are respectively "moving (train)," "moving (car)" and "moving (on foot)," it is desirable that the ToDo information is preferentially notified to the user who is "moving (on foot)."

Furthermore, in a case there are three users who are respectively in a "shopping area," a "mountainous area" and a "business district" according to geo category codes (histogram), it is desirable that the ToDo information is preferentially notified to the user who is in the "shopping area." As described, by narrowing down the notification targets of ToDo information by using information such as a behaviour/situation pattern, a geo category code and the like, a more appropriate notification target can be selected.

(Method of Selecting Notification Targets according to Number of Users with Matching Behaviour/Situation Patterns)

Next, reference will be made to FIG. 44. FIG. 44 schematically shows a configuration of automatically determining, according to the number of users with matching behaviour/ situation patterns, whether or not to notify all the users in a group of ToDo information. In the example of FIG. 44, the number of users in the same group with matching behaviour/ situation patterns is counted, and in a case more than half the group members are of the matching behaviour/situation pattern, the ToDo information is notified to all the users in the group. In this example, a behaviour/situation pattern "moving" and ToDo information "let's go out for dinner" are set.

In a case of making a proposal "let's go out for dinner" to users in a group, one may wish to know beforehand the number of users who will be accepting the proposal. Also, one might think to make such proposal if the number of users who will accept the proposal is large. However, normally, the number of users who will be accepting a proposal is not known until a proposal is made. However, depending on the contents of a proposal, it is possible to predict the number of users who will be accepting the proposal from the behaviour/ situation patterns.

As shown in the example of FIG. 44, it is highly possible that a user who is in a situation "working" will not accept the proposal "let's go out for dinner." On the other hand, it is highly possible that a user who is, for example, "moving" will accept the proposal. Therefore, by specifying a behaviour/ situation pattern and counting the number of users who match the specified behaviour/situation pattern, the number of people who will be accepting the proposal can be estimated. Accordingly, by determining, based on the result of estimation, whether or not to make a proposal (send ToDo information), it becomes possible to avoid sending out a fruitless proposal. Moreover, the condition can be changed depending on the contents of a ToDo; for example, the condition can be the matching of the behaviour/situation patterns of more than half the users, the matching of the behaviour/situation pattern of at least one user, or the matching of the behaviour/situation patterns of all the users.

By using such method, a proposal which no one will accept can be prevented from being made, and effective ToDo information can be sent to the entire group. Although a configuration is shown in the example of FIG. 44 where ToDo information is sent to the entire group, the transmission target of ToDo information is not limited to such. Also, an explanation has been made here taking ToDo information as an example, but the method of FIG. 44 can be applied to any information distribution technology. For example, this method can be applied to mail/news delivery, software distribution, delivery of video content, delivery of music content, or the like.

(Input Aid)

Next, a method of aiding input on a registration screen will be described. As illustrated in FIG. 36, at the time of registration of ToDo information, an operation of selecting from a behaviour list and an operation of selecting from a Group list have to be performed, besides operations of inputting deadline information and display contents. As illustrated in FIG. 26, types of behaviour/situation patterns that can be described in the behaviour list are various. Thus, it is bothersome to search for a desired behaviour/situation pattern in the behaviour list. Accordingly, the inventors of the present invention have devised a method of appropriately narrowing down the behaviour list to be displayed.

(Narrowing Down of Behaviour List According to Input Contents)

First, a method can be conceived of narrowing down to a behaviour list from which a selection is likely to be made, according to the contents of text input by a user in a display contents section. For example, groups of words related to respective behaviour/situation patterns are prepared, and a score indicating a degree of association is assigned to each word. The ToDo registration/notification application 302 extracts a word included in the group of words from an input text, and calculates, based on the score of the extracted word, a degree of association between the text and a behaviour/situation pattern. Also, the ToDo registration/notification application 302 arranges, in order from the highest, behaviour/situation patterns for which calculated degrees of association are greater than a specific value, and displays the behaviour/situation patterns as the behaviour list.

By preferentially displaying behaviour/situation patterns with high degrees of association in this manner, a desired behaviour/situation pattern can be efficiently selected from the behaviour/situation list. Additionally, a method of morphological analysis or the like can be used for the method of extracting a word. Also, the score indicating the degree of association between a behaviour/situation pattern and a word may be set in advance or may be calculated by a statistical method.

For example, a method can be conceived of accumulating, as history information, the type of a word used at the time of selection of a certain behaviour/situation pattern and its appearance frequency and setting a frequently used word as a word with high degree of association (score). Also, a method can be conceived of setting a high degree of association to a word included in the expression of a behaviour/situation pattern. For example, in a case of "moving (train)," high degrees of association are set for "movement" and "train." Additionally, a score can be weighted by the appearance frequency of each word appearing in a text.

(Narrowing Down based on Behaviour/Situation Pattern or the Like)

Next, a method of presenting a candidate for an input character based on the current behaviour/situation pattern or the like, and a method of narrowing down a behaviour list or a sharing list will be introduced. For example, there can be conceived a method of preferentially presenting, as an input candidate, a word relating to the latitude and longitude of the current location, the regional characteristics (geo category code) or a behaviour/situation pattern (HC behaviour). Similarly, there can be conceived a method of narrowing down candidates for the behaviour list or the sharing list based on a word relating to the latitude and longitude of the current location, the regional characteristics (geo category code) or a behaviour/situation pattern (HC behaviour).

For example, there is a method of predicting, based on the past registration history, a word that is highly probable to be input under the current situation and presenting the predicted word. Also, there is a method of rearranging the behaviour list so that behaviours are listed in order from a behaviour that is most probable to be registered under the current situation. Similarly, there is a method of rearranging the sharing list (Group list) so that groups are listed in order from a group that is most probable to be registered according to the past registration history. Note that levels of importance are preferably set in the order of "HC behaviour>regional characteristics>latitude/longitude," and a probability is preferably calculated from each element and weighting is preferably performed according to the level of importance.

(Correlation Between Behaviour List and Sharing List)

In a case a behaviour/situation pattern is selected from a behaviour list before the input of contents of a ToDo, a method can be conceived of presenting a candidate of a word having a high degree of association with the selected behaviour/situation pattern, thereby aiding the input of contents. There is also conceived a method of predicting, based on the past registration history, a word that is highly probable to be input when a certain behaviour/situation pattern is selected, and presenting the word as an input candidate. Furthermore, there is also conceived a method of arranging, based on the past registration history, sharing groups that are highly possible to be selected in order in a Group list. Additionally, besides the registration history, information on the regional characteristics or the latitude/longitude may be used, or those that are newly registered may be preferentially used.

Heretofore, the third embodiment of the present invention has been described. According to the present embodiment, a technology has been proposed of correlating a ToDo application and a behaviour/situation pattern with each other, and notifying a ToDo to an appropriate provision target at an appropriate timing according to the situations of notification targets. By using this technology, ToDo information can be provided to a user at an effective timing.

<4: Fourth Embodiment>

Next, the fourth embodiment of the present invention will be described. The present embodiment relates to a method of using a behaviour/situation pattern obtained by the behaviour/situation pattern detection method described in the first embodiment described above. Particularly, the technology of the present embodiment relates to a technology of displaying on a screen, according to a behaviour/situation pattern of a user, an application that is highly possible to be used by the user, and aiding an operation of application selection by the user. Also, by switching setting information, such as operation settings, according to the behaviour/situation pattern, the user can be saved the trouble of calling up a setting screen and changing the settings every time the environment changes.

<4-1: Overview of System>

Figure 45:
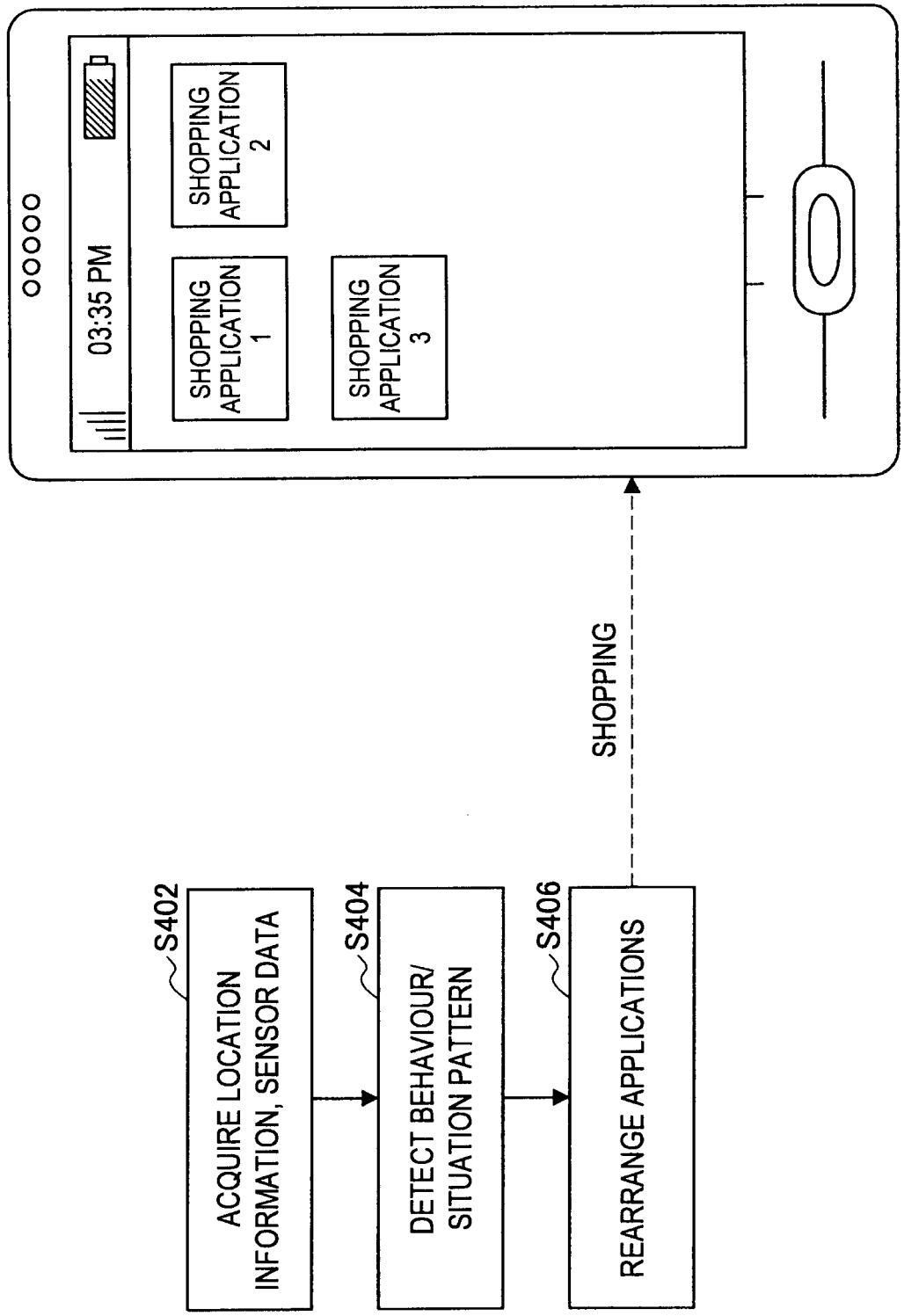
FIG. 45 is an explanatory diagram showing an overview of a function of a behaviour/situation analysis system according to the fourth embodiment of the present invention.

First, an overview of a function realised by a behaviour/situation analysis system 40 according to the present embodiment will be described with reference to FIG. 45. FIG. 45 is an explanatory diagram showing examples of an operation of the behaviour/situation analysis system 40 and a display configuration realised by the operation.

As shown in FIG. 45, in the behaviour/situation analysis system 40, first, location information and sensor data are acquired (S402). Then, a behaviour/situation pattern is detected based on the location information, the sensor data and the like that have been acquired (S404). Next, applications are rearranged based on the detected behaviour/situation pattern (S406). For example, if a behaviour/situation pattern "shopping" is detected, applications relating to shopping are preferentially displayed, as illustrated in FIG. 45. According to such configuration, a user is enabled to instantly find an appropriate application that is in accordance with the situation even at the time of using a client device installed with a large variety of applications, and the convenience is greatly enhanced.

Additionally, each application is associated with a behaviour/situation pattern in advance. However, whether the application itself uses the behaviour/situation pattern or not is of no matter. Furthermore, also with respect to an application to which a behaviour/situation pattern is not associated, the application and a behaviour/situation pattern can be associated based on a relationship in a case a relationship between a use history of a user and a history of behaviour/situation patterns is statistically calculated. Furthermore, different operation settings may be set for one application depending on the behaviour/situation pattern. According to such configuration, a user interface in accordance with a behaviour/situation pattern can be provided.

<4-2: Overall Configuration of System>

Figure 46:
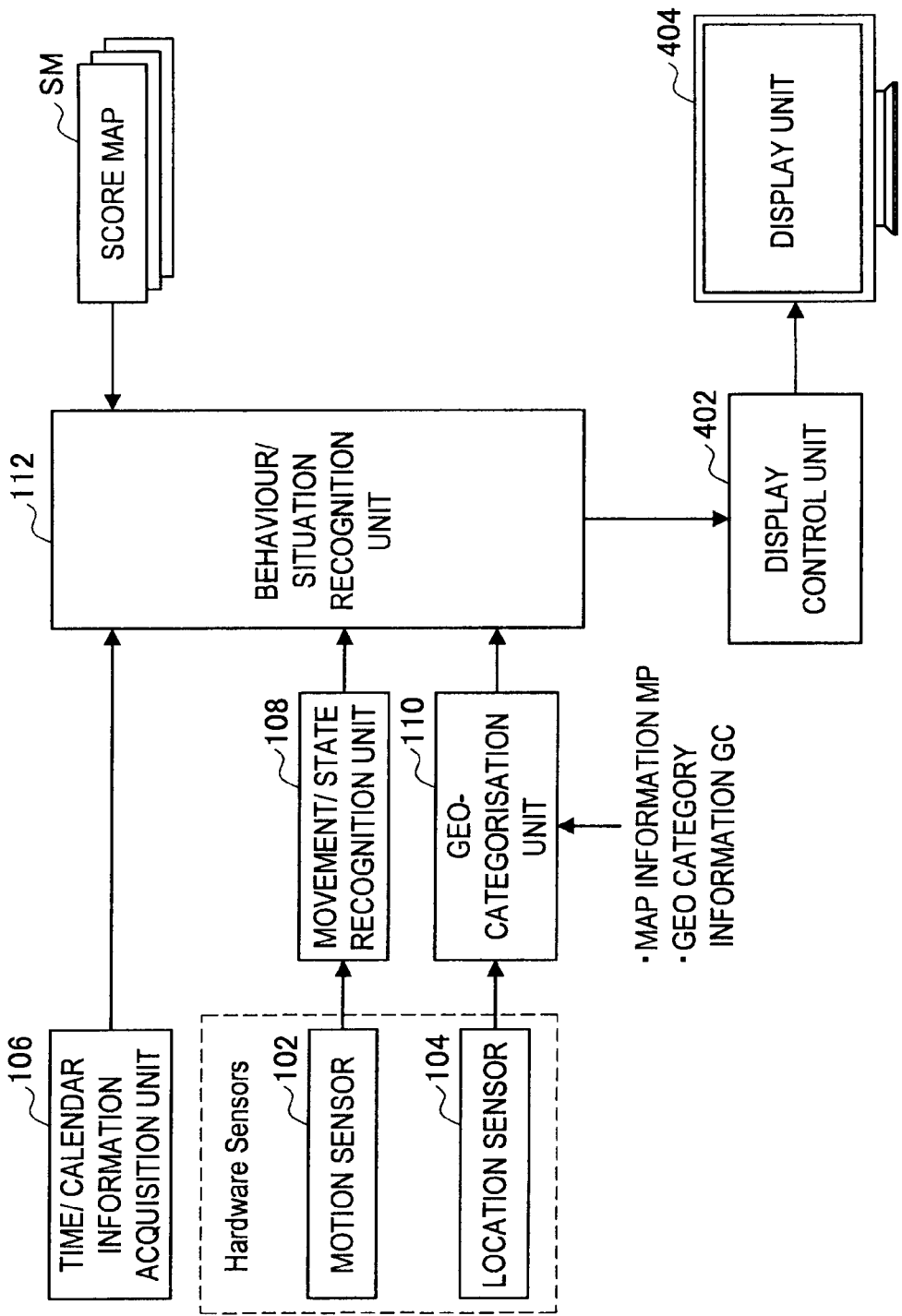
FIG. 46 is an explanatory diagram showing an example of the system configuration of the behaviour/situation analysis system according to the embodiment.

Next, an overall system configuration of the behaviour/situation analysis system 40 according to the present embodiment will be described with reference to FIG. 46. FIG. 46 is an explanatory diagram showing an example of an overall system configuration of the behaviour/situation analysis system 40 according to the present embodiment. Note that structural elements that have substantially the same function as those of the behaviour/situation analysis system 10 according to the first embodiment described above are denoted with the same reference numerals, and repeated explanation of these structural elements is omitted.

As shown in FIG. 46, the behaviour/situation analysis system 40 mainly includes a motion sensor 102, a location sensor 104, a time/calendar information acquisition unit 106, a movement/state recognition unit 108, a geo-categorisation unit 110, and a behaviour/situation recognition unit 112. Furthermore, the behaviour/situation analysis system 40 includes a display control unit 402, and a display unit 404.

When a user performs a behaviour, first, sensor data is detected by the motion sensor 102. The sensor data detected by the motion sensor 102 is input to the movement/state recognition unit 108. Furthermore, location information indicating the current location is acquired by the location sensor 104. Then, the location information on the current location acquired by the location sensor 104 is input to the geo-categorisation unit 110.

When the sensor data is input, the movement/state recognition unit 108 detects a movement/state pattern by using the sensor data. Then, the movement/state pattern detected by the movement/state recognition unit 108 is input to the behaviour/situation recognition unit 112. Also, when the location information on the current location is input, the geo-categorisation unit 110 acquires map information MP, and selects a geo category code corresponding to the current location by using the acquired map information MP. Furthermore, the geo-categorisation unit 110 calculates a histogram relating to the geo category. The geo category code selected by the geo-categorisation unit 110 is input to the behaviour/situation recognition unit 112.

As described above, the movement/state pattern and the geo category code are input to the behaviour/situation recognition unit 112 respectively from the movement/state recognition unit 108 and the geo-categorisation unit 110. Also, the sensor data is input to the behaviour/situation recognition unit 112 via the movement/state recognition unit 108. Furthermore, the location information on the current location is input to the behaviour/situation recognition unit 112 via the geo-categorisation unit 110. Furthermore, time/calendar information is input to the behaviour/situation recognition unit 112 from the time/calendar information acquisition unit 106.

Thus, the behaviour/situation recognition unit 112 detects a behaviour/situation pattern based on the movement/state pattern, the geo category code (histogram) and the time/calendar information that have been input. Additionally, the behaviour/situation pattern detection method used here may be based on the rule-based determination or on the learning model determination. The behaviour/situation pattern detected by the behaviour/situation recognition unit 112 is input to the display control unit 402. Besides the behaviour/situation pattern, the location information detected b the location sensor 104 and the geo category code selected by the geo-categorisation unit 110 may be input to the display control unit 402.

When these pieces of information are input, the display control unit 402 changes, according to the input information, the arrangement of applications displayed on the display unit 404. For example, the display control unit 402 displays, on the display unit 404, only the applications associated with behaviour/situation pattern. Furthermore, the display control unit 402 calculates, based on a behaviour history of the user and a history of application use, the degree of association between the behaviour/situation pattern and each application, and displays, on the display unit 404, only the application for which the degree of association is greater than a specific value. The degree of association used here can be calculated by using a statistical method. Furthermore, the display control unit 402 changes the operation settings of an application according to the behaviour/situation pattern.

Heretofore, the fourth embodiment of the present invention has been described. By using the technology of the present embodiment, a desired application can be found easily at the time of using a client device installed with a large variety of applications, and the convenience of a user is greatly enhanced. Also, with the operation settings of an application being automatically reset according to a behaviour/situation pattern, a comfortable operating environment can be obtained without a user performing a special setting operation. Moreover, the technology of the present embodiment can be applied to, besides the operation settings of an application, setting items such as a backlight setting, a volume setting and a power control setting.

<5: Hardware Configuration>

The functions of the server and the client described above can be realised by using the hardware configuration of the information processing apparatus shown in FIG. 47, for example. That is, the function of each of the structural elements is realised by controlling the hardware shown in FIG. 47 by using a computer program. Additionally, the mode of this hardware is arbitrary, and may be a personal computer, a mobile information terminal such as a mobile phone, a PHS or a PDA, a game machine, or various types of information appliances. Moreover, the PHS is an abbreviation for Personal Handy-phone System. Also, the PDA is an abbreviation for Personal Digital Assistant.

As shown in FIG. 47, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an electronic device or an IC card on which a non-contact IC chip is mounted. The IC is an abbreviation for Integrated Circuit.

The connection port 924 is a port such as an USB port, an IEEE 1394 port, a SCSI, an RS-232 C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or various communication modems. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-230579 filed in the Japan Patent Office on Oct. 2, 2009, the entire content of which is hereby incorporated by reference.

What is claimed is:

1. A behaviour pattern analysis system comprising:
a mobile terminal including
a movement sensor that detects a movement of a user and outputs movement information,
a current location information acquisition unit that acquires information on a current location,
a building information acquisition unit that acquires information on a building existing at a location indicated by the information acquired by the current location information acquisition unit or information on buildings existing at the current location and in a vicinity of the current location,
a first behaviour pattern detection unit that analyses the movement information output from the movement sensor, and detects a first behaviour pattern corresponding to the movement information from multiple first behaviour patterns obtained by classifying behaviours performed by the user over a short period of time,
a time information acquisition unit that acquires information on a time of a time point of acquisition of the information on a current location by the current location information acquisition unit, and
a transmission unit that transmits, to a server, the information on a building or buildings acquired by the building information acquisition unit and the first behaviour pattern detected by the first behaviour pattern detection unit and the information on a time acquired by the time information acquisition unit; and
a server including
a reception unit that receives, from the mobile terminal, the information on a building or buildings and the first behaviour pattern, and
a second behaviour pattern detection unit that analyses the information on a building or buildings and the first behaviour pattern received by the reception unit, and detects a second behaviour pattern corresponding to the information on a building or buildings and the first behaviour pattern from multiple second behaviour patterns obtained by classifying behaviours performed by the user over a long period of time
wherein the server holds, for each combination of the first behaviour pattern and the information on a time, a score map assigning a score to each combination of the information on a building or buildings and the second behaviour pattern,
wherein, in a case the score map is selected based on the first behaviour pattern detected by the first behaviour pattern detection unit and the information on a time acquired by the time information acquisition unit, a combination of scores corresponding to the information on a building existing at the current location acquired by the building information acquisition unit is extracted from the selected score map and a highest score in the extracted combination of scores is a threshold value or less, the second behaviour pattern detection unit creates, by using a machine learning algorithm, a detection model for detecting the second behaviour pattern from the information on a building or buildings and the first behaviour pattern, and detects, by using the created detection model, the second behaviour pattern corresponding to the information on a building or buildings and the first behaviour pattern received by the reception unit.

2. The behaviour pattern analysis system according to claim 1, wherein the mobile terminal further includes a storage unit in which schedule information recording, in a time-series manner, a behaviour of a user capable of being expressed by a combination of the second behaviour patterns is stored, a matching determination unit that reads the schedule information stored in the storage unit, and determines whether a present behaviour, a past behaviour and a future behaviour of the user recorded in the schedule information and the second behaviour pattern detected by the second behaviour pattern detection unit match or not, and a display unit that displays, according to a result of determination by the matching determination unit, whether an actual behaviour matches a schedule recorded in the schedule information, is behind the schedule, or is ahead of the schedule.

3. The behaviour pattern analysis system according to claim 2, wherein the server further includes a behaviour prediction unit that predicts, by using a history of the second behaviour patterns detected by the second behaviour pattern detection unit, a second behaviour to be performed by the user next, wherein, in a case of determining that a behaviour of the user matching the second behaviour pattern is not recorded in the schedule information, the matching determination unit acquires, from the server, the second behaviour pattern predicted by the behaviour prediction unit and extracts, from the schedule information, a behaviour of the user matching the acquired second behaviour pattern, and wherein the display unit displays information relating to the behaviour of the user extracted by the matching determination unit.

4. The behaviour pattern analysis system according to claim 3, wherein the server includes a location information accumulation unit that receives, by the reception unit, the information on a current location acquired by the current location information acquisition unit and the first behaviour pattern detected by the first behaviour pattern detection unit, and stores the information on a current location and a history of the first behaviour patterns in the storage unit, and a clustering unit that clusters places where the user stays for a long period of time, by using the information on a current location and the history of the first behaviour patterns accumulated in the storage unit by the location information accumulation unit, and calculates a staying probability of staying at each of the places and a movement probability of moving between the places, and wherein the behaviour prediction unit predicts the second behaviour pattern to be performed by the user next, based on the staying probability and the movement probability calculated by the clustering unit.

5. The behaviour pattern analysis system according to claim 1, wherein the behaviour pattern analysis system includes multiple mobile terminals, and wherein the server further includes a notification information storage unit that stores, in association with each other, notification information to be notified at a specific time and a specific second behaviour pattern, and an information notification unit that, at the specific time, refers to the second behaviour pattern detected by the second behaviour pattern detection unit based on the information on a building or buildings and the first behaviour pattern received by the reception unit from each of the mobile terminals, and notifies a mobile terminal corresponding to a second behaviour pattern same as the specific second behaviour pattern of the notification information.

6. The behaviour pattern analysis system according to claim 5, wherein the information notification unit counts the number of mobile terminals corresponding to a second behaviour pattern same as the specific second behaviour pattern, and in a case the number of the mobile terminals is a specific number or more, notifies all of the multiple mobile terminals of the notification information.

7. A mobile terminal comprising:

a movement sensor that detects a movement of a user and outputs movement information;

a current location information acquisition unit that acquires information on a current location;

a building information acquisition unit that acquires information on a building existing at a location indicated by the information acquired by the current location information acquisition unit or information on buildings existing at the current location and in a vicinity of the current location;

a first behaviour pattern detection unit that analyses the movement information output from the movement sensor, and detects a first behaviour pattern corresponding to the movement information from multiple first behaviour patterns obtained by classifying behaviours performed by the user over a short period of time;

a time information acquisition unit that acquires information on a time of a time point of acquisition of the information on a current location by the current location information acquisition unit; and a second behaviour pattern detection unit that analyses the information on a building or buildings acquired by the building information acquisition unit and the first behaviour pattern detected by the first behaviour pattern detection unit, and detects a second behaviour pattern corresponding to the information on a building or buildings and the first behaviour pattern from multiple second behaviour patterns obtained by classifying behaviours performed by the user over a long period of time, wherein a score map assigning a score to each combination of the information on a building or buildings and the second behaviour pattern is provided for each combination of the first behaviour pattern and the information on a time, wherein, in a case the score map is selected based on the first behaviour pattern detected by the first behaviour pattern detection unit and the information on a time acquired by the time information acquisition unit, a combination of scores corresponding to the information on a building existing at the current location acquired by the building information acquisition unit is extracted from the selected score map and a highest score in the extracted combination of scores is a threshold value or less, the second behaviour pattern detection unit creates, by using a machine learning algorithm, a detection model for detecting the second behaviour pattern from the information on a building or buildings and the first behaviour pattern, and detects, by using the created detection model, the second behaviour pattern corresponding to the information on a building or buildings and the first behaviour pattern received by the reception unit.

8. The mobile terminal according to claim 7, further comprising:

wherein the building information acquisition unit acquires, as the information on buildings existing at the current location and in a vicinity of the current location, category types of the buildings and the number of buildings for each category type, and wherein the second behaviour pattern detection unit
selects the score map based on the first behaviour pattern detected by the first behaviour pattern detection unit and the information on a time acquired by the time information acquisition unit,
extracts, from the selected score map, combinations of scores corresponding to respective category types acquired by the building information acquisition unit,
normalises, by respective highest scores, each score included in the combinations of scores corresponding to respective category types,
performs weighting on the normalised combinations of scores corresponding to respective category types according to the number of buildings for each category type acquired by the building information acquisition unit, and
adds, for each second behaviour pattern, the weighted scores corresponding to the respective category types, and detects the second behaviour pattern for which a result of addition is greatest.

9. The mobile terminal according to claim 7, further comprising:

a display unit on which a display object for starting an application associated with the second behaviour pattern is displayed; and a display control unit that makes the display unit preferentially display, according to the second behaviour pattern detected by the second behaviour pattern detection unit, the display object associated with the second behaviour pattern.

10. A behaviour pattern analysis server comprising:

a reception unit that receives, from a mobile terminal including a movement sensor that detects a movement of a user and outputs movement information and a current location information acquisition unit that acquires information on a current location, the movement information and the information on a current location;

a building information acquisition unit that acquires information on a building existing at a location indicated by the information on a current location received by the reception unit or information on buildings existing at the current location and in a vicinity of the current location;

a first behaviour pattern detection unit that analyses the movement information received by the reception unit, and detects a first behaviour pattern corresponding to the movement information from multiple first behaviour patterns obtained by classifying behaviours performed by the user over a short period of time; and a time information acquisition unit that acquires information on a time of a time point of acquisition of the information on a current location by the current location information acquisition unit;

a second behaviour pattern detection unit that analyses the information on a building or buildings acquired by the building information acquisition unit and the first behaviour pattern detected by the first behaviour pattern detection unit, and detects a second behaviour pattern corresponding to the information on a building or buildings and the first behaviour pattern from multiple second behaviour patterns obtained by classifying behaviours performed by the user over a long period of time wherein a score map assigning a score to each combination of the information on a building or buildings and the second behaviour pattern is provided for each combination of the first behaviour pattern and the information on a time, wherein, in a case the score map is selected based on the first behaviour pattern detected by the first behaviour pattern detection unit and the information on a time acquired by the time information acquisition unit, a combination of scores corresponding to the information on a building existing at the current location acquired by the building information acquisition unit is extracted from the selected score map and a highest score in the extracted combination of scores is a threshold value or less, the second behaviour pattern detection unit creates, by using a machine learning algorithm, a detection model for detecting the second behaviour pattern from the information on a building or buildings and the first behaviour pattern, and detects, by using the created detection model, the second behaviour pattern corresponding to the information on a building or buildings and the first behaviour pattern received by the reception unit.

11. A behaviour pattern analysis method comprising the steps of:

acquiring movement information indicating a result of detection by a movement sensor for detecting a movement of a user;

acquiring information on a current location;

acquiring information on a building existing at a location indicated by the information on a current location acquired in the step of acquiring information on a current location or information on buildings existing at the current location and in a vicinity of the current location;

analysing the movement information acquired in the step of acquiring movement information, and detecting a first behaviour pattern corresponding to the movement information from multiple first behaviour patterns obtained by classifying behaviours performed by the user over a short period of time;

acquiring information on a time of a time point of acquisition of the information on a current location by the current location information acquisition unit; and analysing the information on a building or buildings acquired in the step of acquiring information on a building or buildings and the first behaviour pattern detected in the step of analysing the movement information and detecting a first behaviour pattern, and detecting a second behaviour pattern corresponding to the information on a building or buildings and the first behaviour pattern from multiple second behaviour patterns obtained by classifying behaviours performed by the user over a long period of time wherein a score map assigning a score to each combination of the information on a building or buildings and the second behaviour pattern is provided for each combination of the first behaviour pattern and the information on a time, wherein, in a case the score map is selected based on the first behaviour pattern detected by the first behaviour pattern detection unit and the information on a time acquired by the time information acquisition unit, a combination of scores corresponding to the information on a building existing at the current location acquired by the building information acquisition unit is extracted from the selected score map and a highest score in the extracted combination of scores is a threshold value or less, the second behaviour pattern detection unit creates, by using a machine learning algorithm, a detection model for detecting the second behaviour pattern from the information on a building or buildings and the first behaviour pattern, and detects, by using the created detection model, the second behaviour pattern corresponding to the information on a building or buildings and the first behaviour pattern received by the reception unit.

12. A non-transitory computer-readable medium for causing a computer to realise:
- a movement information acquisition function of acquiring movement information indicating a result of detection by a movement sensor for detecting a movement of a user;
- a current location information acquisition function of acquiring information on a current location;
- a building information acquisition function of acquiring information on a building existing at the current location indicated by the information acquired by the current location information acquisition function or information on buildings existing at the current location and in a vicinity of the current location;
- a first behaviour pattern detection function of analysing the movement information acquired by the movement information acquisition function, and detecting a first behaviour pattern corresponding to the movement information from multiple first behaviour patterns obtained by classifying behaviours performed by the user over a short period of time;
- a time information acquisition function of acquiring information on a time of a time point of acquisition of the information on a current location by the current location information acquisition unit; and
- a second behaviour pattern detection function of analysing the information on a building or buildings acquired by the building information acquisition function and the first behaviour pattern detected by the first behaviour pattern detection function, and detecting a second behaviour pattern corresponding to the information on a building or buildings and the first behaviour pattern from multiple second behaviour patterns obtained by classifying behaviours performed by the user over a long period of time wherein a score map assigning a score to each combination of the information on a building or buildings and the second behaviour pattern is provided for each combination of the first behaviour pattern and the information on a time, wherein, in a case the score map is selected based on the first behaviour pattern detected by the first behaviour pattern detection unit and the information on a time acquired by the time information acquisition unit, a combination of scores corresponding to the information on a building existing at the current location acquired by the building information acquisition unit is extracted from the selected score map and a highest score in the extracted combination of scores is a threshold value or less, the second behaviour pattern detection unit creates, by using a machine learning algorithm, a detection model for detecting the second behaviour pattern from the information on a building or buildings and the first behaviour pattern, and detects, by using the created detection model, the second behaviour pattern corresponding to the information on a building or buildings and the first behaviour pattern received by the reception unit.

* * * * *